US007208035B2

(12) United States Patent
Ogawa et al.

(10) Patent No.: US 7,208,035 B2
(45) Date of Patent: Apr. 24, 2007

(54) INK SET AND INK JET RECORDING METHOD

(75) Inventors: Manabu Ogawa, Shizuoka (JP); Toshiki Taguchi, Shizuoka (JP)

(73) Assignee: FujiFilm Corporation, Tokyo (JP)

( * ) Notice: Subject to any disclaimer, the term of this patent is extended or adjusted under 35 U.S.C. 154(b) by 194 days.

(21) Appl. No.: 10/809,955

(22) Filed: Mar. 26, 2004

(65) Prior Publication Data

US 2004/0187733 A1 Sep. 30, 2004

(30) Foreign Application Priority Data

Mar. 31, 2003 (JP) .......................... P.2003-096389
Feb. 18, 2004 (JP) .......................... P.2004-041207

(51) Int. Cl.
*C09D 11/02* (2006.01)

(52) U.S. Cl. .............................. 106/31.58; 106/31.48; 106/31.49; 106/31.5

(58) Field of Classification Search ............. 106/31.13, 106/31.27, 31.48, 31.49, 31.5, 31.58
See application file for complete search history.

(56) References Cited

U.S. PATENT DOCUMENTS

| | | | | |
|---|---|---|---|---|
| 5,482,546 | A | 1/1996 | Eida | |
| 5,980,623 | A | 11/1999 | Hiraoka et al. | |
| 6,874,882 | B2 * | 4/2005 | Taguchi et al. | 347/100 |
| 6,939,399 | B2 * | 9/2005 | Yabuki | 106/31.27 |
| 2004/0154496 | A1 * | 8/2004 | Taguchi | 106/31.48 |
| 2005/0174409 | A1 * | 8/2005 | Taguchi | 347/100 |

FOREIGN PATENT DOCUMENTS

| | | | |
|---|---|---|---|
| EP | 0 802 246 | A1 | 10/1997 |
| EP | 0 985 716 | A1 | 3/2000 |
| EP | 1 081 198 | A2 | 3/2001 |
| EP | 1 384 762 | A1 | 1/2004 |
| JP | 55-161856 | A | 12/1980 |
| JP | 61-36362 | A | 2/1986 |
| JP | 2-212566 | A | 8/1990 |
| JP | 11-504958 | A | 5/1999 |
| JP | 2002-371213 | A | 12/2002 |
| JP | 2003-231850 | A | 8/2003 |
| JP | WO 03/082994 | * | 10/2003 |
| WO | WO 02/064679 | A1 | 8/2002 |
| WO | WO 03/068139 | A2 | 8/2003 |

* cited by examiner

*Primary Examiner*—Helene Klemanski
(74) *Attorney, Agent, or Firm*—Sughrue Mion, PLLC

(57) ABSTRACT

An ink set comprising: at least two kinds of inks, each of the at least two kinds of inks having a common hue and different densities, and containing an aqueous medium and a dye, wherein each of the at least two kinds of inks has a corresponding discoloration velocity constant (k) for an image printed with each one of the at least two kinds of inks, and a ratio defined by a minimum value ($k_{min}$) selected from among said corresponding constants divided by a maximum value ($k_{max}$) selected from among the corresponding constants, is within a range of 0.7 to 1.0.

9 Claims, No Drawings

INK SET AND INK JET RECORDING METHOD

BACKGROUND OF THE INVENTION

1. Field of the Invention

The present invention relates to an ink set excellent in discoloration balance in image preservation and also relaters to an ink jet recording method.

2. Description of the Related Art

With the spread of the computer in recent years, ink jet printers are widely used not only in offices but also in homes for printing on papers, films and cloths.

As ink jet recording methods, a method of ejecting ink droplets by applying pressure by piezo-elements, a method of ejecting ink droplets by generating bubbles in ink by heat, a method of using ultrasonic waves, and a method of suction-ejecting ink droplets by electrostatic force. As the ink compositions for the ink jet recording methods, water ink, oil ink and solid ink (a melting type) are used. Of these inks, water ink is mainly used for easiness of manufacture and handling, odor and safety.

Colorants used in inks for ink jet recording are required to have high solubility in a solvent, to be capable of high density recording, to be good in hue, to be excellent in fastness to light, heat, air, water and chemicals, to have good fixing property to an image-receiving material and to hardly blot, to be excellent in preservation property as ink, to be free of toxicity, to be high in purity, and to be available inexpensively. However, it is extremely difficult to search for colorants that satisfy these requirements in high level.

Various dyes and pigments have been already proposed for ink jet recording and practically used but colorants satisfying all of these requirements have not been discovered yet. It is difficult for conventionally well-known dyes and pigments having Color Index Nos. (C.I.) to reconcile the hue and fastness required of the inks for ink jet recording.

As the dyes that improve the fastness, azo dyes derived from aromatic amine and 5-membered heterocyclic amine are proposed in JP-A-55-161856. However, since these dyes have undesirable hues in yellow and cyan regions, there is a problem of the deterioration of color reproduction.

Inks for ink jet recording aiming at the compatibility of hue and light fastness are proposed in JP-A-61-36362 and JP-A-2-212566. However, the dyes used in these patents are insufficient in water-solubility when used as water-soluble inks. In addition, when these inks are used as water-soluble inks for ink jet recording, there also arises a problem in the fastness to humidity and heat.

As the means for solving these problems, the compounds and ink compositions disclosed in JP-T-11-504958 (The term “JP-T” as used herein means a published Japanese translation of a PCT patent application.) are proposed. In addition, ink for ink jet recording using a pyrazolyl aniline azo dye for improving hue and fastness is disclosed in JP-A-2003-231850. However, these inks for ink jet recording are not sufficient both in color reproduction and the fastness of outputted images.

Further, it was found that the preservation property of the image recorded on special purpose glossy paper of photographic quality for ink jet recording and stuck in a room was conspicuously bad in some cases. The present inventors conceive that this phenomenon must be due to any oxidizing gas in the air, e.g., ozone. Although the phenomenon is difficult to occur by shielding the flow of air by, e.g., putting the image in a frame with glass, by which the use condition is limited.

The phenomenon is especially conspicuous with special purpose glossy paper of photographic quality for ink jet recording, therefore, this is a great problem to the present ink jet recording where the photographic quality is an important characteristic.

The present inventors have examined dyes having good hue and fastness and advanced the development of excellent colorants for ink jet recording.

In the ink set comprising a plurality of inks for ink jet recording in combination, a technique of using two or more kinds of inks having the same hue and different densities has been developed for further increasing image quality.

For instance, methods of improving discoloration balance by using a set of dyes fast to discoloration are disclosed in JP-A-2002-371213 (the term “JP-A” as used herein means an “unexamined published Japanese patent application”). However, in these methods, the discussion on the compositions of light ink and dark ink is insufficient, and the methods simply varied the concentrations of dyes. In light ink, the ratio of a water-soluble organic solvent to a dye in the ink is high, so that light ink is inferior to dark ink in fastness, as a result the color balance of the image comes to be lost.

SUMMARY OF THE INVENTION

An object of the present invention is to provide an ink set, particularly preferably an ink set for ink jet recording, excellent in the durability of an image inclusive of image quality and excellent in color balance with the lapse of time, and another object is to provide an ink jet recording method using the ink set.

The above objects of the present invention have been achieved by the following ink set, particularly preferably ink set for ink jet recording, and ink jet recording method.

1) An ink set comprising: at least two kinds of inks, each of the at least two kinds of inks having a common hue and different densities, and containing an aqueous medium and a dye, wherein each of the at least two kinds of inks has a corresponding discoloration velocity constant (k) for an image printed with each one of the at least two kinds of inks, and a ratio defined by a minimum value ($k_{min}$) selected from among said corresponding constants divided by a maximum value ($k_{max}$) selected from among the corresponding constants, is within a range of 0.7 to 1.0.

2) The ink set as described in the above item 1), wherein each of the inks having a common hue and different densities includes at least one kind of dye having an oxidation potential nobler than 1.0 V (Vs SCE).

3) The ink set as described in the above 1) or 2), wherein the dye is at least one of an azo dye and a phthalocyanine dye each having a heterocyclic group.

4) The ink set as described in any of the above items 1) to 3), wherein the aqueous medium contains at least a water-soluble glycol derivative.

5) The ink set as described in any of the above items 1) to 4) is an ink set for ink jet recording.

6) An ink jet recording method of performing image-recording by an ink jet printer with the ink set as described in any of the above items 1) to 5).

DETAILED DESCRIPTION OF THE INVENTION

The present invention is described in detail below.

Inks for use in an ink set according to the invention, particularly preferably an ink set for ink jet recording, contain at least an aqueous medium and a dye.

And the present invention is characterized in that when the densities of characters to be printed are made the same, the discoloration velocities between the inks having different densities and the same hue do not greatly differ.

In the present invention, ink is manufactured by mixing a dye with an aqueous medium, and for maintaining the balance of discoloration of inks of a single color and a mixed color constant, inks satisfying the following relationship are selected concerning the discoloration velocity constants. That is, inks manufactured so as to satisfy the following condition are used in an ink set in the present invention: of the values of discoloration velocity constant (k) of the images printed with individual inks of the inks having the same hue and different densities, the value obtained by dividing the minimum value $k_{min}$ by the maximum value $k_{max}$ ($k_{min}/k_{max}$) is from 0.7 to 1.0. Herein, with respect to n-pieces of inks having the same hue and different densities, n-pieces of k are present such as $k_1, k_2 \ldots k_n$ (wherein n is an integer of 2 or more), and the minimum value of the n-pieces of k is $k_{min}$ and the maximum value is $k_{max}$. $k_{min}$ and $k_{max}$ may be the same.

For manufacturing an ink set that satisfies the above condition, it is preferred to use at least one dye having oxidation potential of nobler than 1.0 V (Vs SCE) in each of the inks having the same hue and different densities. Oxidation potential is preferably the nobler. Oxidation potential is more preferably nobler than 1.10V (Vs SCE), and most preferably nobler than 1.15 V (Vs SCE). When every dye contained in dark and light inks has such oxidation potential, discoloration with the lapse of time can be reduced, and image fastness, e.g., aging stability, resistance to gas, light fastness and waterproofing property are improved. In this case, each constitutional ink contains two or more dyes and even if dyes not satisfying the above condition of oxidation potential are contained, the influence by such dyes is less than is anticipated, and the effect of the invention is effectively exhibited. The mechanism is unknown: but this is presumably because the contribution of at least one dye having oxidation potential of nobler than 1.0 V contained in the ink predominates over others. However, it is preferred that a dye having oxidation potential of nobler than 1.0 V account for 50 mass % or more of the entire dyes contained in the ink.

The value of oxidation potential (Eox) of the dye used in the invention can be easily measured. The measuring methods are described, e.g., in P. Delahay, *New Instrumental Methods in Electrochemistry*, Interscience Publishers Co. (1954), A. J. Bard et al., *Electrochemical Methods*, John Wiley & Sons (1980), and Akira Fujishima et al., *Denki-Kagaku Sokutei-Ho* (*Measuring Methods in Electrochemistry*), Gihodo Publishing Co. (1984).

Specifically, oxidation potential is measured as the value to SCE (standard saturated calomel electrode) with cyclic voltammetry and the like by dissolving $1\times10^{-2}$ to $1\times10^{-6}$ mol/liter of a test sample in a solvent, e.g., dimethylformamide or acetonitrile, containing supporting electrolyte such as sodium perchlorate or tetrapropylammonium perchlorate. There are cases where the value deviates several 10 mV or so by the influence of liquid potential difference and liquid resistance of a sample solution, but the reproducibility of potential can be compensated by adding a standard sample (e.g., hydroquinone).

For prescribing the potential unconditionally, the value (Vs SCE) obtained by measurement in dimethylformamide containing 0.1 mol/liter of tetrapropylammonium perchlorate as supporting electrolyte (the concentration of a dye is 0.001 mol/liter) is taken as the oxidation potential of a dye in the invention.

The value of Eox means the easiness of transfer of an electron from a sample to an electrode, and the greater the value (oxidation potential is nobler), the harder is the transfer of an electron from a sample to an electrode, in other words, difficult to be oxidized. In relation to the structure of a compound, oxidation potential becomes nobler by introducing an electron attractive group and becomes baser by introducing an electron donating group. In the invention, it is preferred to make oxidation potential nobler by introducing an electron attractive group into a dye skeleton to lower the reactivity with ozone which is an electrophilic agent.

In preparing inks, in inks having the same hue, the difference in fastness between ink of low concentration of a dye (light ink) and ink of high concentration of a dye (dark ink) can be lessened by reducing the content of a specific water-soluble organic solvent in light ink than the content in dark ink. Light ink having low concentration of a dye is susceptible to a water-soluble organic solvent, and tends to be inferior to dark ink in fastness, but this tendency can be avoided by reducing the content of a specific water-soluble organic solvent.

It is also possible to reduce the entire amount of a water-soluble organic solvent in inks, but the viscosity of light ink becomes lower than the viscosity of dark ink according to this method, and another problem arises, such that the sizes of ink droplets differ.

The specific water-soluble organic solvents are water-soluble glycol derivative organic solvents, e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether.

As the method of searching for a discoloration velocity constant, the following method is adopted in the invention. A printed pattern is formed with each single ink so that the reflection density obtained by measuring the density in the density range of the hue through a status A filter becomes almost 1.0±0.1.

As reflection density measuring instrument carrying a status A filter e.g. X-Rite densitometer can be exemplified.

Each printed matter is forcedly discolored with a fadeometer, and a discoloration velocity constant ($k_1$, $k_2$) is obtained from the time (t) required for the reflection density to become 80% of the initial reflection densityby the relational expression of [$0.8=\exp(-k\cdot t)$]. An ink set is manufactured in the present invention so as to satisfy the condition that the ratio of discoloration velocity constant ($k_{min}/k_{max}$) is from 0.7 to 1.0.

As fadeometers used here, an ozone fadeometer, a xenon lamp fadeometer, a fluorescent lamp fadeometer and a fadeometer for preservation under the conditions of high temperature and high humidity are exemplified. Of these fadeometers, an ozone fadeometer, a xenon lamp fadeometer and a fluorescent lamp fadeometer are preferred, and an ozone fadeometer is more preferred.

Ink for use in an ink set in the invention (hereinafter sometimes also referred to as ink of the invention), particularly preferably an ink set for ink jet recording, contains the dye in an amount of from 0.2 to 25 mass % of the entire inks, preferably from 0.5 to 15 mass %.

The present invention is described in detail below.

The present invention can provide an image excellent in color balance and weatherability with the lapse of time when printed on a recording medium according to the above constitution.

An ink set according to the invention can be expressed as aggregation of Aab. Here, a represents an integer of from 1 to n, and each numeral means to correspond to different hue, b represents an integer of from 1 to n, and each numeral means to correspond to different density.

For instance, as a general ink set, the kinds of inks comprising yellow (Y), dark yellow (DY), magenta (M), light magenta (LM), cyan (C), light cyan (LC) and black (K) are exemplified. The ink set can be expressed as shown below by using Aab. Other ink sets can also be expressed similarly.

Aab=[A11 (Y), A21 (DY), A31 (M), A32 (LM), A41 (C), A42 (LC), A51 (K)]

That is, A31 (M) and A32 (LM), and A41 (C) and A42 (LC) mean that they have respectively the same hue and different densities. Further, in the case of other ink of different hue, e.g. A11 can constitute A12, A13 . . . , different in densities, and A51 can constitute A52, A53 . . . , different in densities.

An ink set of the invention includes the case where a is only one kind, and in this case b should have 2 or more numerals.

As the dyes for use in an ink set according to the invention, an azo dye and a phthalocyanine dye having a heterocyclic group are exemplified as preferred dyes, and an azo dye having a heterocyclic group is specifically represented by the following structural formula:

$$(A\text{-}N{=}N{-}B)_n\text{-}L \qquad (1)$$

(2)

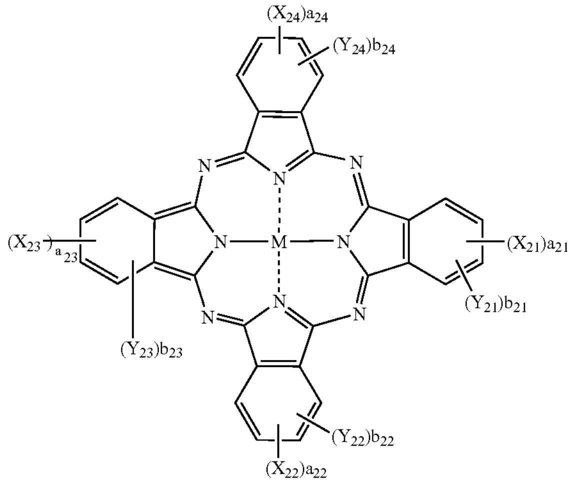

-continued (3)

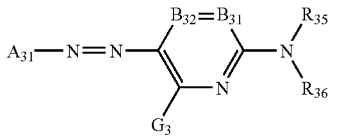

$$A_{41}\text{-}N{=}N{-}B_{41}{-}N{=}N{-}C_{41} \qquad (4)$$

In formula (1), A and B each represents a heterocyclic group which may be substituted; L represents a hydrogen atom, a single bond, or a divalent linking group; and n represents 1 or 2, provided that when n represents 1, L represents a hydrogen atom, and A and B both represent a monovalent heterocyclic group; and when n represents 2, L represents a single bond or a divalent linking group, and either A or B represents a monovalent heterocyclic group and the other represents a divalent heterocyclic group. When n represents 2, A may be the same or different and B may also be the same or different.

In formula (2), $X_{21}$, $X_{22}$, $X_{23}$ and $X_{24}$ each represents $—SO\text{-}Z_2$, $—SO_2\text{-}Z_2$, $—SO_2NR_{21}R_{22}$, a sulfo group, $—CONR_{21}R_{22}$ or $—COOR_{21}$.

$Z_2$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_{21}$ and $R_{22}$ each represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; and $Y_{21}$, $Y_{22}$, $Y_{23}$ and $Y_{24}$ each represents a monovalent substituent.

$a_{21}$ to $a_{24}$, and $b_{21}$ to $b_{24}$ respectively represent the number of the substituents of $X_{21}$ to $X_{24}$ and $Y_{21}$ to $Y_{24}$. $a_{21}$ to $a_{24}$ each represents a number of from 0 to 4, but $a_{21}$ to $a_{24}$ do not represent 0 at the same time. $b_{21}$ to $b_{24}$ each represents a number of from 0 to 4. When $a_{21}$ to $a_{24}$ and $b_{21}$ to $b_{24}$ represent a number of 2 or higher, a plurality of $X_{21}$ to $X_{24}$ and $Y_{21}$ to $Y_{24}$ may be the same or different. M represents a hydrogen atom, a metal atom, oxide or hydroxide of the metal atom, or halide.

In formula (3), $A_{31}$ represents a residue of 5-membered heterocyclic diazo component $A_{31}\text{-}N_2—$.

$B_{31}$ and $B_{32}$ each represents $=CR_{31}—$ or $—CR_{32}=$, or either $B_{31}$ or $B_{32}$ represents a nitrogen atom and the other represents $=CR_{31}—$ or $—CR_{32}=$. $R_{35}$ and $R_{36}$ each represents a hydrogen atom, an aliphatic group, an aromatic group, a heterocyclic group an acyl group, an alkoxycarbonyl group, an aryloxycarbonyl group, a carbamoyl group, an alkyl- or arylsulfonyl group, or a sulfamoyl group, and each group may further have a substituent.

$G_3$, $R_{31}$ and $R_{32}$ each represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (including an arylamino group and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfinyl group, a heterocyclic sulfinyl group, a sulfamoyl group, a sulfo group, or a heterocyclic thio group, and each group may further be substituted.

$R_{31}$ and $R_{35}$, or $R_{35}$ and $R_{36}$ may be bonded to each other to form a 5- or 6-membered ring.

In formula (4), $A_{41}$, $B_{41}$ and $C_{41}$ each represents an aromatic group which may be substituted or a heterocyclic group which may be substituted.

A dye represented by formula (2) is preferably represented by the following formula (5).

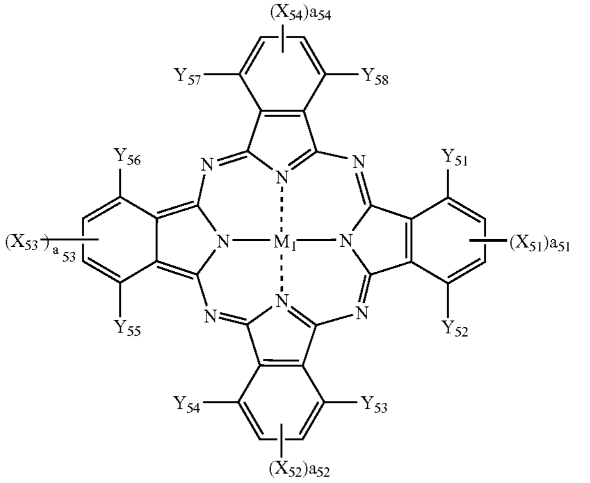

In formula (5), $X_{51}$ to $X_{54}$, $Y_{51}$ to $Y_{58}$ and $M_1$ respectively have the same meaning as $X_{21}$ to $X_{24}$, $Y_{21}$ to $Y_{24}$ and M in formula (2). $a_{51}$ to $a_{54}$ each represents an integer of 1 or 2.

Formulae (1) to (5) are described in detail below.

Dye Represented by Formula (1):

A dye represented by formula (1) is preferably a yellow dye.

From the point of fastness, particularly fastness to ozone gas, after ink is printed on a reflective recording medium, the reflection density is measured through a status A filter, one point at the point where the reflection density in yellow region ($D_B$) becomes from 0.90 to 1.10 is prescribed as the initial density of the ink, the printed matter is forcedly discolored with an ozone fadeometer capable of emitting 5 ppm of ozone constantly, and when a forced discoloration velocity constant (k) obtained from the time (t) required for the reflection density to become 80% (a residual rate) of the initial reflection density is determined, the forced discoloration velocity constant is preferably $5.0\times10^{-2}$ (hour$^{-1}$) or less, more preferably $3.0\times10^{-2}$ (hour$^{-1}$) or less, and still more preferably $1.0\times10^{-2}$ (hour$^{-1}$) or less.

Herein the reflection density is a value obtained by measuring through a status A filter (blue) with a reflection densitometer (X-Rite 310TR). Forced discoloration velocity constant (k) is a value obtained from residual rate=exp(−kt), i.e., k=(−ln0.8)/t.

It is preferred that dyes used in the invention have excellent fastness and excellent hue. It is particularly preferred that the foot of the absorption spectrum on the long wave side be cut in a preferred condition. Therefore, yellow dyes showing λmax of from 390 to 470 nm, the ratio of absorbance I of λmax (λmax) and absorbance I of λmax+70 nm (λmax+70 nm), I (λmax+70 nm)/I (λmax) of preferably 0.20 or less, more preferably 0.15 or less, and still more preferably 0.10 or less are preferably used in the invention. The values of absorption wavelength and absorbance defined herein are the values in a solvent (water or ethyl acetate).

In formula (1), A and B each represents a heterocyclic group which may be substituted. As the heterocyclic ring, a 5- or 6-membered heterocyclic ring is preferred, and the ring may have a monocyclic structure or a polycyclic structure by condensation of two or more rings, and the heterocyclic ring may be an aromatic heterocyclic ring or a non-aromatic heterocyclic ring. As the hetero atoms which constitute the heterocyclic ring, N, O and S atoms are preferred.

L represents a hydrogen atom, a single bond, or a divalent linking group. n represents 1 or 2, provided that when n represents 1, L represents a hydrogen atoms and A and B both represent a monovalent heterocyclic group. When n represents 2, L represents a single bond or a divalent linking group, and either A or B represents a monovalent heterocyclic group and the other represents a divalent heterocyclic group. When n represents 2, A may be the same or different and B may also be the same or different.

In formula (1), as the heterocyclic ring represented by A, 5-pyrazolone, pyrazole, triazole, oxazolone, isooxazolone, barbituric acid, pyridone, pyridine, rhodanine, pyrazolidinedione, pyrazolopyridine, merdoram acid, and condensed heterocyclic rings of these heterocyclic rings with an aromatic hydrocarbon ring or a heterocyclic ring are preferred. Of these heterocyclic rings, 5-pyrazolone, 5-aminopyrazole, pyridone, 2,6-diaminopyridine, and pyrazoloazoles are preferred, and 5-aminopyrazole, 2-hydroxy-6-pyridone and pyrazolotriazole are particularly preferred.

As the heterocyclic ring represented by B, pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole; triazole, oxazole, isooxazole, benzoxazole, thiazole, benzothiazole, isothiazole, benzisothiazole, thiadiazole, benzisooxazole, pyrrolidine, piperidine, piperazine, imidazolidine and thiazoline are exemplified. Of these heterocyclic rings, pyridine, quinoline, thiophene, benzothiophene, pyrazole, imidazole, benzimidazole, triazole, oxazole, isooxazole, benzoxazole, thiazole, benzothiazole, isothiazole, benzisothiazole, thiadiazole, and benzisooxazole are preferred, quinoline, thiophene, pyrazole, thiazole, benzoxazole, benzisooxazole, isothiazole, imidazole, benzothiazole and thiadiazole are more preferred, and pyrazole, benzothiazole, benzoxazole, imidazole, 1,2,4-thiadiazole and 1,3,4-thiadiazole are particularly preferred.

As the substituents of A and B, a halogen atom, an alkyl group, a cycloalkyl group, an aralkyl group, an alkenyl group, an alkynyl group, an aryl group, a heterocyclic group, a cyano group, a hydroxyl group, a nitro group, an alkoxyl group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino amino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, a silyl group, and ionic hydrophilic groups shown below are exemplified.

The examples of the divalent linking groups represented by L include an alkylene group, an arylene group, a heterocyclic residue, —CO—, —$SO_n$— (n represents 1 or 2), —NR— (R represents a hydrogen atom, an alkyl group or an aryl group), —O—, and divalent linking groups comprising these linking groups in combination, and these groups may have substituents described as the substituents of A and B, or may have the following shown ionic hydrophilic groups.

When the dyes represented by formula (1) are used as water-soluble dyes, it is preferred for the dyes to have at least one ionic hydrophilic group in their molecules. The examples of ionic hydrophilic groups include a sulfo group, a carboxyl group, a phosphono group and a quaternary ammonium group. As the ionic hydrophilic groups of the above, a carboxyl group, a phosphono group and a sulfo group are preferred, and a carboxyl group and a sulfo group are preferred of all. It is particularly preferred that at least one ionic hydrophilic group is a carboxyl group. The carboxyl group, phosphono group and sulfo group may be in the state of a salt, and the examples of counter ions for forming a salt include an ammonium ion, an alkali metal ion (e.g., alithiumion, a sodium ion, a potassium ion) and an organic cation (e.g., a tetramethylammonium ammonium ion, a tetramethyl guanidinium ion, a tetramethylphosphonium ion). Of the counter ions, alkali metal salts are preferred.

Of the dyes represented by formula (1), the dyes in which the moiety A-N═N—B is represented by formula (1-A), (1-B) or (1-C) are preferred.

(1-A)

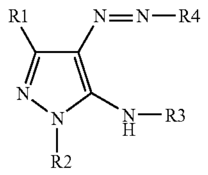

In formula (1-A), R1 and R3 each represents a hydrogen atom, a cyano group, an alkyl group, a cycloalkyl group, an aralkyl group, an alkoxyl group, an alkylthio group, an arylthio group, an aryl group, or an ionic hydrophilic group; R2 represents a hydrogen atom, an alkyl group, a cycloalkyl group, an aralkyl group, a carbamoyl group, an acyl group, an aryl group or a heterocyclic group; and R4 represents a heterocyclic group.

(1-B)

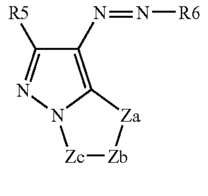

In formula (1-B), R5 represents a hydrogen atom, a cyano group, an alkyl group, a cycloalkyl group, an aralkyl group, an alkoxyl group, an alkylthio group, an arylthio group, an aryl group or an ionic hydrophilic group; Za represents —N═, —NH— or —C(R11)═; Zb and Zc each represents —N═ or —C(R11)═; R11 represents a hydrogen atom or a nonmetallic substituent; and R6 represents a heterocyclic group.

(1-C)

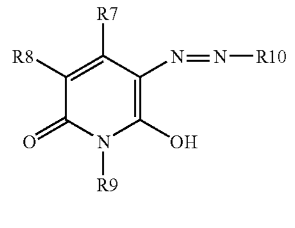

In formula (1-C), R7 and R9 each represents a hydrogen atom, a cyano group, an alkyl group, a cycloalkyl group, an aralkyl group, an aryl group, an alkylthio group, an arylthio group, an alkoxycarbonyl group, a carbamoyl group or an ionic hydrophilic group; R8 represents a hydrogen atom, a halogen atom, an alkyl group, an alkoxyl group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group a sulfamoyl group, a sulfonyl group, an acyl group, an alkylamino group, an arylamino group, a hydroxyl group or an ionic hydrophilic group; and R10 represents a heterocyclic group.

In formulae (1-A), (1-B) and (1-C), the alkyl groups represented by R1, R2, R3, R5, R7, R8 and R9 include alkyl groups having a substituent and unsubstituted alkyl groups. As the alkyl groups, alkyl groups having from 1 to 20 carbon atoms are preferred. The examples of the substituents include a hydroxyl group, an alkoxyl group, a cyano group, a halogen atom and an ionic hydrophilic group. The examples of the alkyl groups include methyl, ethyl, butyl, isopropyl, t-butyl, hydroxyethyl; methoxyethyl, cyanoethyl, trifluoromethyl, 3-sulfopropyl and 4-sulfobutyl.

The cycloalkyl groups represented by R1, R2, R3, R5, R7, R8 and R9 include cycloalkyl groups having a substituent and unsubstituted cycloalkyl groups. As the cycloalkyl groups, cycloalkyl groups having from5to 12 carbon atoms are preferred. The examples of the substituents include an ionic hydrophilic group. The examples of the cycloalkyl groups include cyclohexyl. The aralkyl groups represented by R1, R2, R3, R5, R7, R8 and R9 include aralkyl groups having a substituent and unsubstituted aralkyl groups. As the aralkyl groups, aralkyl groups having from 7 to 20 carbon atoms are preferred. The examples of the substituents include an ionic hydrophilic group. The examples of the aralkyl groups include benzyl and 2-phenethyl.

The aryl groups represented by R1, R2, R3, R5, R7 and R9 include aryl groups having a substituent and unsubstituted aryl groups. As the aryl groups, aryl groups having from 6 to 20 carbon atoms are preferred. The examples of the substituents include a hydroxyl group, an alkyl group, an alkoxyl group, a halogen atom, a cyano group, a carbamoyl group, a sulfamoyl group, an alkylamino group, an acylamino group and an ionic hydrophilic group. The examples of the aryl groups include phenyl, p-tolyl, p-methoxyphenyl, o-chlorophenyl and m-(3-sulfopropylamino)phenyl.

The alkylthio groups represented by R1, R2, R3, R5, R7, R8 and R9 include alkylthio groups having a substituent and unsubstituted alkylthio groups. As the alkylthio groups, alkylthio groups having from 1 to 20 carbon atoms are preferred. The examples of the substituents include an ionic hydrophilic group. The examples of the alkylthio groups include methylthio and ethylthio. The arylthio groups represented by R1, R2, R3, R5, R7, R8 and R9 include arylthio groups having a substituent and unsubstituted arylthio groups. As the arylthio groups, arylthio groups having from 6 to 20 carbon atoms are preferred. As the examples of the substituents, the same groups as described above in the substituents of the aryl group are exemplified. The examples of the arylthio groups include phenylthio and p-tolylthio.

The heterocyclic groups represented by R2 are preferably 5- or 6-membered heterocyclic groups and they may be further condensed. As the hetero atoms constituting the heterocyclic ring, N, S and O atoms are preferred. The heterocyclic groups may be aromatic or non-aromatic heterocyclic groups. The heterocyclic groups may further be substituted, and as the examples of the substituents, the same groups as the substituents of the aryl group are exemplified. Preferred heterocyclic groups are 6-membered nitrogen-containing aromatic heterocyclic groups, and triazine, pyrimidine and phthalazine are particularly preferred.

The halogen atoms represented by R8 include a fluorine atom, a chlorine atom and a bromine atom. The alkoxyl groups represented by R1, R3, R5 and R8 include alkoxyl groups having a substituent and unsubstituted alkoxyl groups. As the alkoxyl groups, alkoxyl groups having from 1 to 20 carbon atoms are preferred. The examples of the substituents include a hydroxyl group and an ionic hydrophilic group. The examples of the alkoxyl groups include methoxy, ethoxy, isopropoxy, methoxyethoxy, hydroxyethoxy and 3-carboxypropoxy.

The aryloxy groups represented by R8 include aryloxy groups having a substituent and unsubstituted aryloxy groups. As the aryloxy groups, aryloxy groups having from 6 to 20 carbon atoms are preferred. As the examples of the substituents, the same groups as the substituents of the aryl group are exemplified. The examples of the aryloxy groups include phenoxy, p-methoxyphenoxy and o-methoxyphenoxy. The acylamino amino groups represented by R8 include acylamino groups having a substituent and unsubstituted acylamino groups. As the acylamino groups, acylamino groups having from 2 to 20 carbon atoms are preferred. As the examples of the substituents, the same groups as the substituents of the aryl group are exemplified. The examples of the acylamino groups include acetamido, propionamido, benzamido and 3,5-disulfobenzamido.

The sulfonylamino groups represented by R8 include an alkylsulfonylamino group, an arylsulfonylamino group, and a heterocyclic sulfonylamino group, and the moieties of alkyl group, aryl group and heterocyclic group of these groups may have a substituent. As the examples of the substituents, the same groups as the substituents of the aryl group are exemplified. As the sulfonylamino groups, sulfonylamino groups having from 1 to 20 carbon atoms are preferred. The examples of the sulfonylamino groups include methylsulfonylamino and ethylsulfonylamino. The alkoxycarbonylamino groups represented by R8 include alkoxycarbonylamino groups having a substituent and unsubstituted alkoxycarbonylamino groups. As the alkoxycarbonylamino groups, alkoxycarbonylamino groups having from 2 to 20 carbon atoms are preferred. The examples of the substituents include an ionic hydrophilic group. The examples of the alkoxycarbonylamino groups include ethoxycarbonylamino.

The ureido groups represented by R8 include ureido groups having a substituent and unsubstituted ureido groups. As the ureido groups, ureido groups having from 1 to 20 carbon atoms are preferred. The examples of the substituents include an alkyl group and an aryl group. The examples of the ureido groups include 3-methylureido, 3,3-dimethylureido and 3-phenylureido.

The alkoxycarbonyl groups represented by R7, R8 and R9 include alkoxycarbonyl groups having a substituent and unsubstituted alkoxycarbonyl groups. As the alkoxycarbonyl groups, alkoxycarbonyl groups having from 2 to 20 carbon atoms are preferred. The examples of the substituents include an ionic hydrophilic group. The examples of the alkoxycarbonyl groups include methoxycarbonyl and ethoxycarbonyl.

The carbamoyl groups represented by R2, R7, R8 and R9 include carbamoyl groups having a substituent and unsubstituted carbamoyl groups. The examples of the substituents include an alkyl group. The examples of the carbamoyl groups include a methylcarbamoyl group and a dimethylcarbamoyl group.

The sulfamoyl groups represented by R8 include sulfamoyl groups having a substituent and unsubstituted sulfamoyl groups. The examples of the substituents include an alkyl group. The examples of the sulfamoyl groups include a dimethylsulfamoyl group and a di(2-hydroxyethyl)sulfamoyl group.

The sulfonyl groups represented by R8 include an alkylsulfonyl group, an arylsulfonyl group and a heterocyclic sulfonyl group, and these groups may further have a substituent. The examples of the substituents include an ionic hydrophilic group. The examples of the sulfonyl groups include methylsulfonyl and phenylsulfonyl.

The acyl groups represented by R2 and R8 include acyl groups having a substituent and unsubstituted acyl groups. As the acyl groups, acyl groups having from 1 to 20 carbon atoms are preferred. The examples of the substituents include an ionic hydrophilic group. The examples of the acyl groups include acetyl and benzoyl.

The amino groups represented by R8 include amino groups having a substituent and unsubstituted amino groups. The examples of the substituents include an alkyl group, an aryl group and a heterocyclic group. The examples of the amino groups include methylamino, diethylamino, anilino and 2-chloroanilino.

The heterocyclic groups represented by R4, R6 and R10 are the same as the heterocyclic groups represented by B in formula (1) which may be substituted, and the preferred examples of the heterocyclic groups, more preferred examples and particularly preferred examples are also the same as the above. The examples of the substituents include an ionic hydrophilic group, an alkyl group having from 1 to 12 carbon atoms, an aryl group, an alkylthio group, an arylthio group, a halogen atom, a cyano group, a sulfamoyl group, a sulfonamino group, a carbamoyl group and an acylamino group, and the alkyl group and the aryl group may further have a substituent.

In formula (1-B), Za represents —N═, —NH— or —C(R11)═; Zb and Zc each represents —N═ or —C(R11)═; and R11 represents a hydrogen atom or a nonmetallic substituent. As the nonmetallic substituent represented by R11, a cyano group, a cycloalkyl group, an aralkyl group, an aryl group, an alkylthio group, an arylthio group and an ionic hydrophilic group are preferred. Each of these substituents has the same meaning as each substituent represented by R1, and preferred examples are also the same. The examples of the skeletons of the heterocyclic ring comprising two 5-membered rings included in formula (1-B) are shown below.

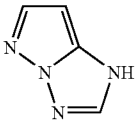 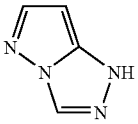 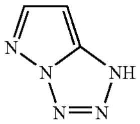

As the examples of the substituents in the case where each of the above described substituents may further have a substituent, the substituents of heterocyclic rings A and B in formula (1) can be exemplified.

Of the above formulae (1-A), (1-B) and (1-C), formula (1-A) is most preferred, and formula (1-A1) shown below is particularly preferred.

(1-A1)

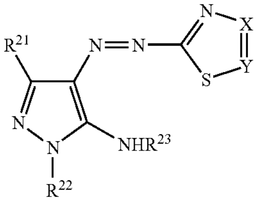

In formula (1-A1), $R^{21}$ and $R^{23}$ each represents a hydrogen atom, an alkyl group, a cycloalkyl group, an aralkyl group, an alkoxyl group or an aryl group; $R^{22}$ represents a hydrogen atom, an aryl group or a heterocyclic group; as to X and Y, either X or Y represents a nitrogen atom and the other represents —$CR^{24}$; $R^{24}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxyl group, an aryl group, an arylthio group, an arylsulfonyl group, an arylsulfinyl group, an aryloxy group or an acylamino group. Of these groups, a hydrogen atom, an alkyl group, an alkylthio group, an arylthio group and an aryl group are preferred, and a hydrogen atom, an alkylthio group and an aryl group are particularly preferred. Each substituent may further be substituted.

The dyes for use in the invention are disclosed in Japanese Patent Application Nos. 2003-286844, 2002-211683, 2002-124832, JP-A-2003-128953 and JP-A-2003-41160. However, the dyes that can be used in the invention are not limited thereto. In addition to the above patents, these compounds can be synthesized by referring to JP-A-2-24191 and JP-A-2001-279145.

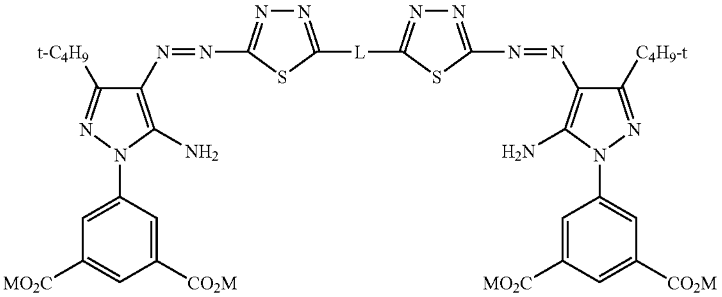

| Dye | L | M |
|---|---|---|
| 1 | $—SCH_2CH_2S—$ | Na |
| 2 | $—SCH_2CH_2S—$ | Li |
| 3 | $—SCH_2CH_2CH_2S—$ | Na |
| 4 | $—SCH_2CH_2CH_2S—$ | K |
| 5 | $—SCH_2CH_2CH_2S—$ | Li |
| 6 | $—SCH_2CH_2CH_2S—$ | $NH_4$ |
| 7 | $—SCH_2CH_2CH_2S—$ | $HN(Et)_3$ |
| 8 | 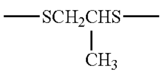 | Na |
| 9 | $—SCH_2CH_2OCH_2CH_2S—$ | Na |
| 10 | 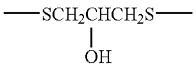 | Na |
| 11 | 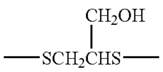 | Na |
| 12 | 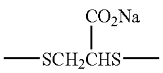 | Na |

-continued
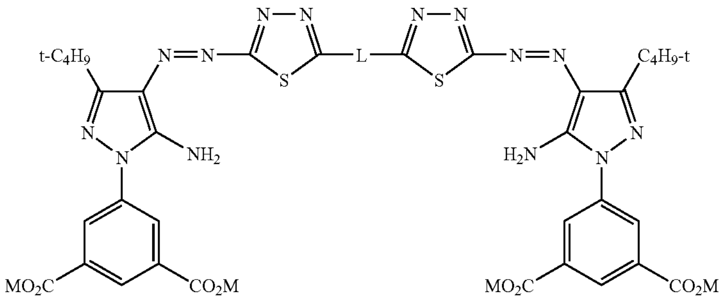
| Dye | L | M |
|---|---|---|
| 13 | 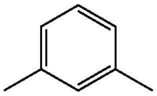 | Na |
| 14 |  | Na |
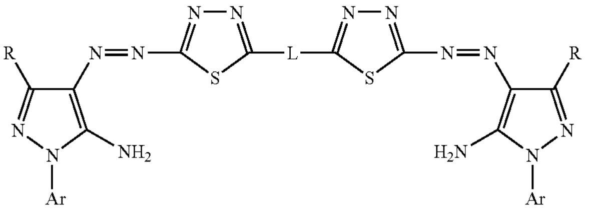
| Dye | Ar | L | R |
|---|---|---|---|
| 15 | 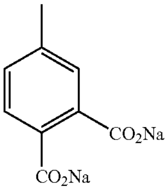 | $—SCH_2CH_2CH_2S—$ | $t\text{-}C_4H_9—$ |
| 16 | 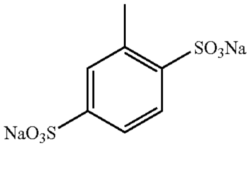 | $—SCH_2CH_2CH_2S—$ | $t\text{-}C_4H_9—$ |
| 17 | 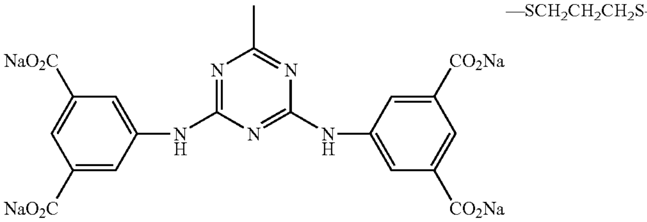 | $—SCH_2CH_2CH_2S—$ | $t\text{-}C_4H_9—$ |

-continued
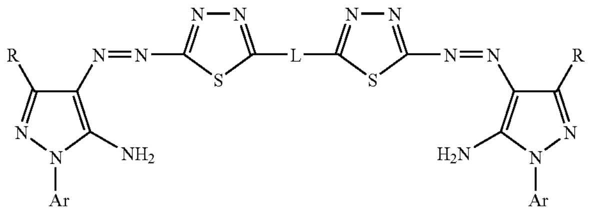
| Dye | Ar | L | R |
| --- | --- | --- | --- |
| 18 | 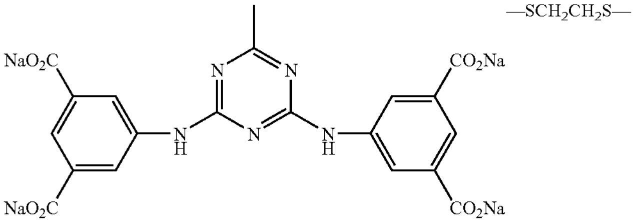 | $-SCH_2CH_2S-$ | t-$C_4H_9-$ |
| 19 | 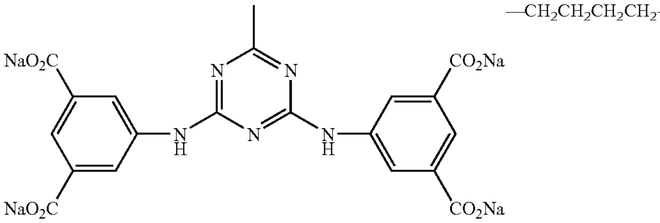 | $-CH_2CH_2CH_2CH_2-$ | t-$C_4H_9-$ |
| 20 | 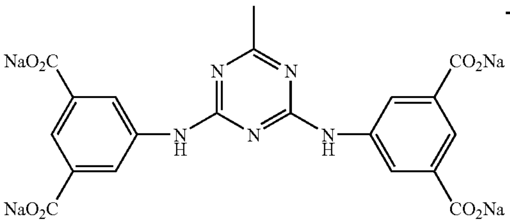 | 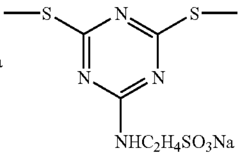 | t-$C_4H_9-$ |
| 21 | 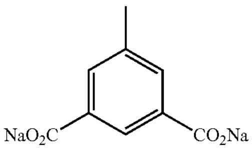 | $-SCH_2CH_2CH_2S-$ | Ph |
| 22 | 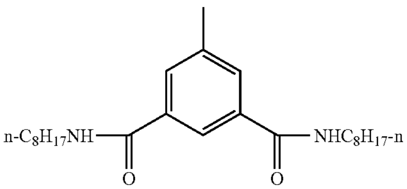 | $-SCH_2CH_2CH_2S-$ | t-$C_4H_9-$ |
| 23 | 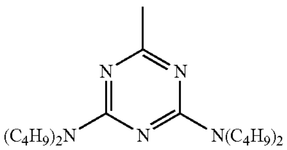 | $-SCH_2CH_2S-$ | t-$C_4H_9-$ |

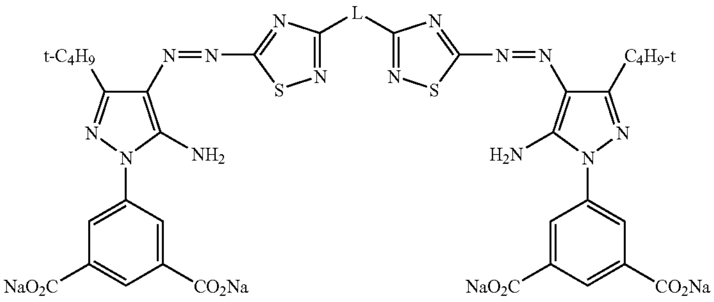
| Dye | L |
|---|---|
| 24 | $—SCH_2CH_2CH_2S—$ |
| 25 | 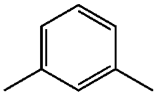 |
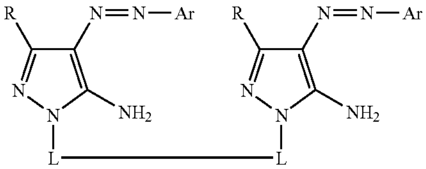
| Dye | Ar | L | R |
|---|---|---|---|
| 26 | 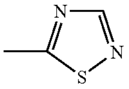 | 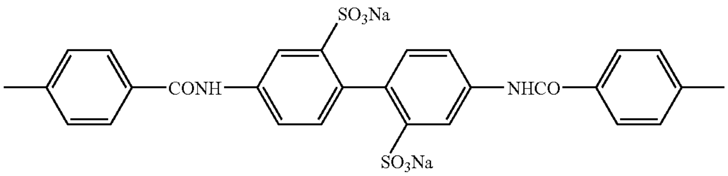 | t-$C_4H_9$— |
| 27 | 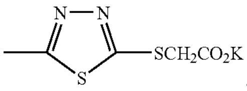 | 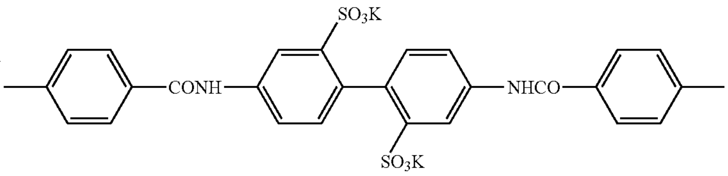 | t-$C_4H_9$— |
| 28 | 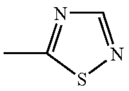 | 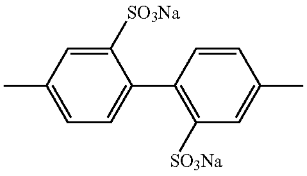 | t-$C_4H_9$— |
| 29 | 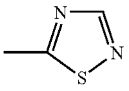 | 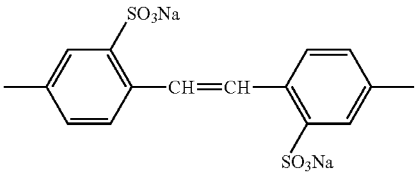 | t-$C_4H_9$— |

-continued
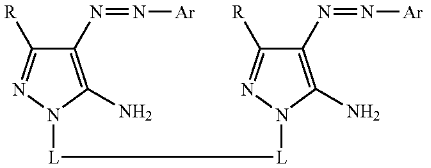
| Dye | Ar | L | R |
|---|---|---|---|
| 30 | 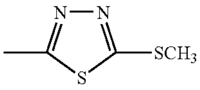 | 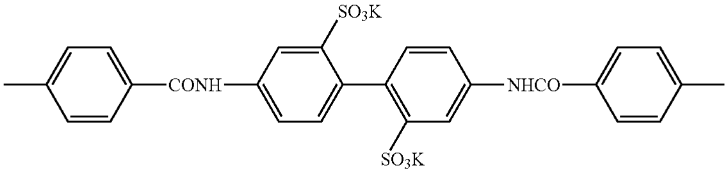 | t-$C_4H_9$— |
| 31 | 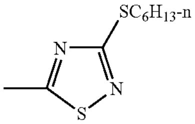 | 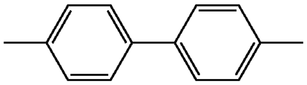 | t-$C_4H_9$— |
| 32 | 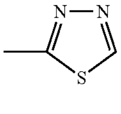 | 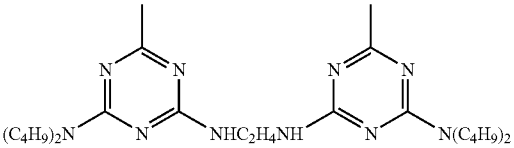 | t-$C_4H_9$— |
| 33 | 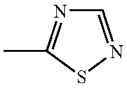 | 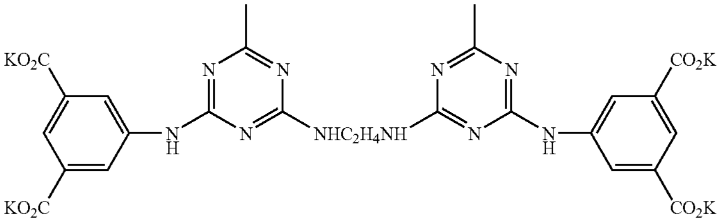 | t-$C_4H_9$— |
| 34 | 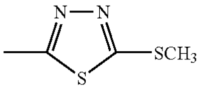 | 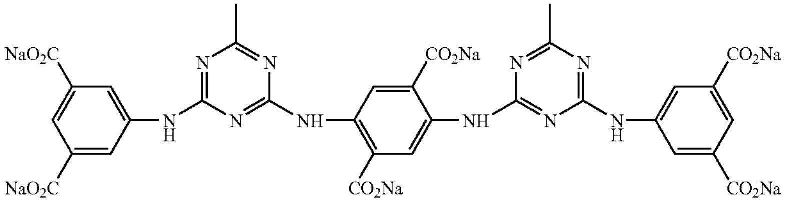 | t-$C_4H_9$— |
| 35 | 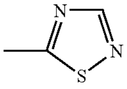 | 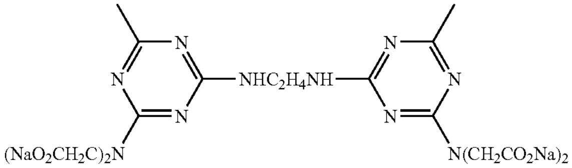 | t-$C_4H_9$— |

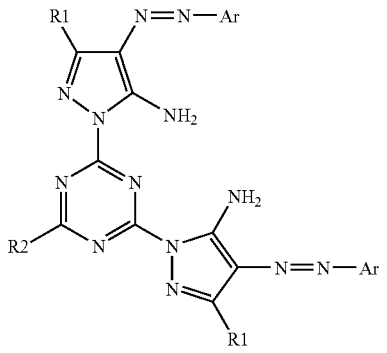
| Dye | Ar | R1 | R2 |
|---|---|---|---|
| 36 | 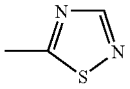 | t-$C_4H_9$— | 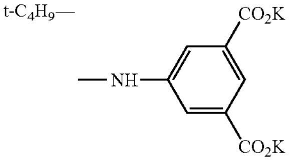 |
| 37 | 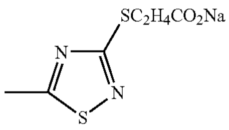 | t-$C_4H_9$— | —$NHC_2H_4SO_3Na$ |
| 38 | 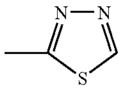 | Ph | —$NHC_{12}H_{25}$-n |
| Dye | Ar | R |
|---|---|---|
| | 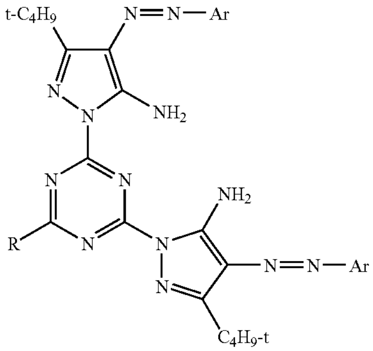 | |
| 39 | 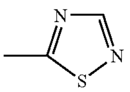 | 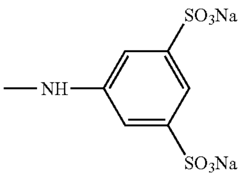 |

-continued
| Dye | Ar | R |
|---|---|---|
| 40 | 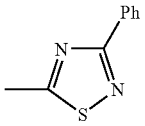 | 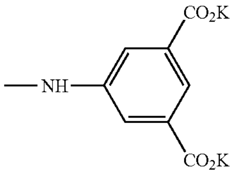 |
| 41 | 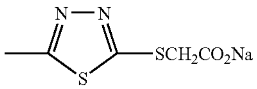 | $—NHC_2H_4SO_3Na$ |
| 42 | 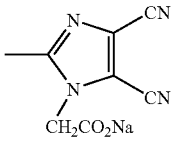 | $—NHC_2H_4SO_3Na$ |
| 43 | 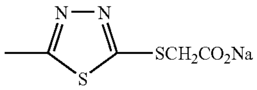 | 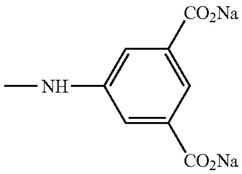 |
| 44 | 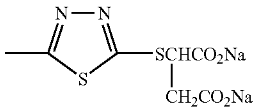 | 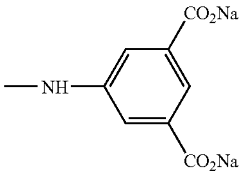 |
| 45 | 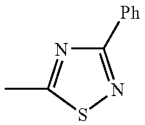 | 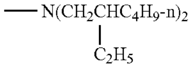 |
| | 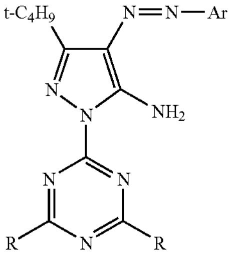 | |
| 46 | 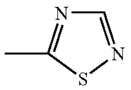 | $—NHC_2H_4SO_3Na$ |
| 47 | 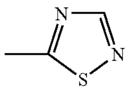 | 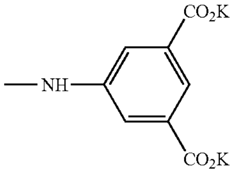 |

-continued
| Dye | Ar | R |
| --- | --- | --- |
| 48 | 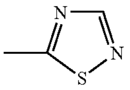 | 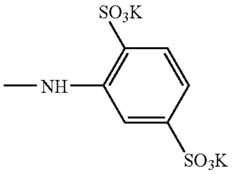 |
| 49 | 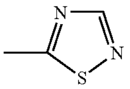 | $—N(CH_2CO_2Na)_2$ |
| 50 | 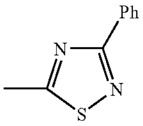 | 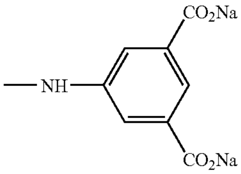 |
| 51 | 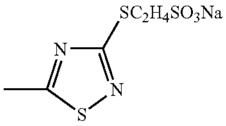 | 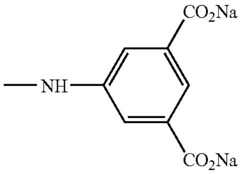 |
| 52 | 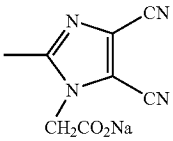 | 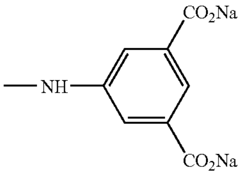 |
| 53 | 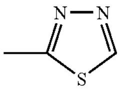 | 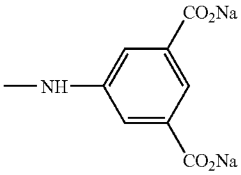 |
| 54 | 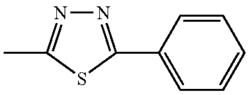 | 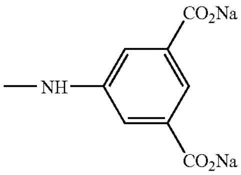 |
| 55 | 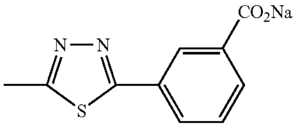 | 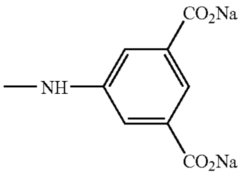 |

-continued
| Dye | Ar | R |
|---|---|---|
| 56 | 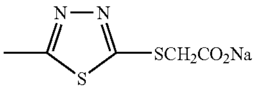 | 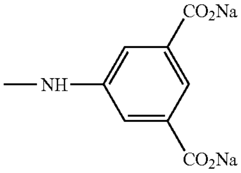 |
| 57 | 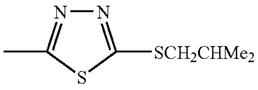 | 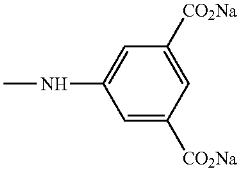 |
| 58 | 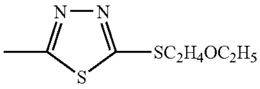 | 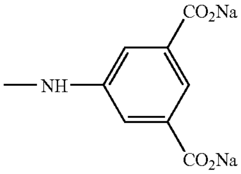 |
| 59 | 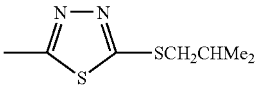 | 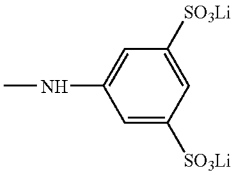 |
| 60 | 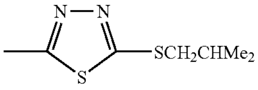 | 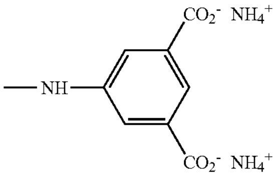 |
| 61 | 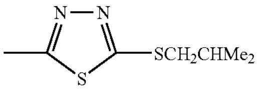 | —$NHC_8H_{17}$-n |
| 62 | 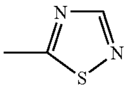 | 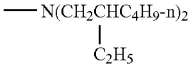 |
| 63 | 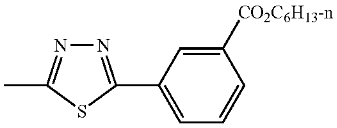 | —$NHC_6H_{13}$-n |

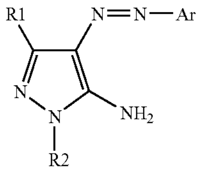
| Dye | Ar | R1 | R2 |
| --- | --- | --- | --- |
| 64 | 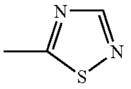 | $t-C_4H_9$— | 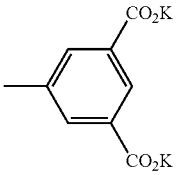 |
| 65 | 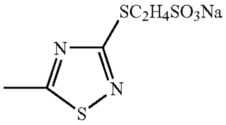 | 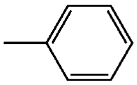 | 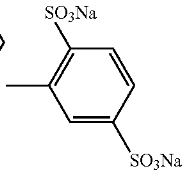 |
| 66 | 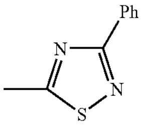 | $t-C_4H_9$— | 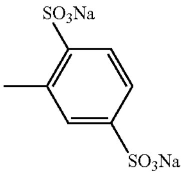 |
| 67 | 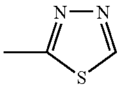 | $t-C_4H_9$— | 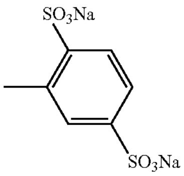 |
| 68 | 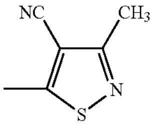 | $t-C_4H_9$— | 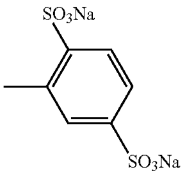 |
| 69 | 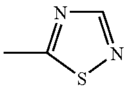 | $t-C_4H_9$— | 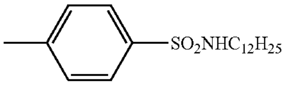 |
| 70 | 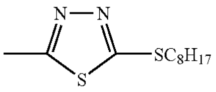 | $t-C_4H_9$— | 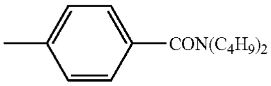 |
| 71 | 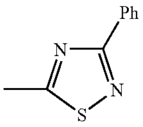 | $t-C_4H_9$— | 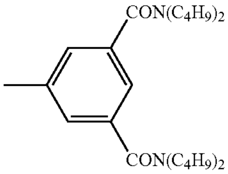 |

-continued
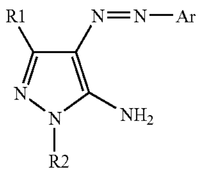
| Dye | Ar | R1 | R2 |
|---|---|---|---|
| 72 | 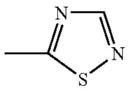 | t-$C_4H_9$— | 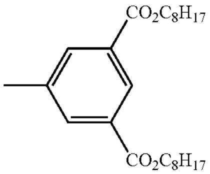 |
73
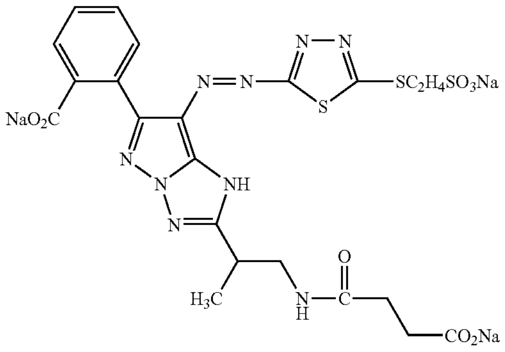
74
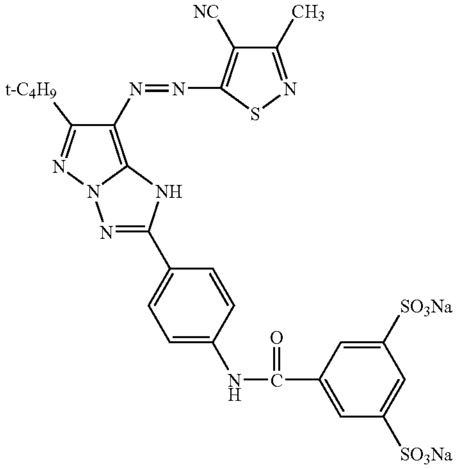
-continued
75
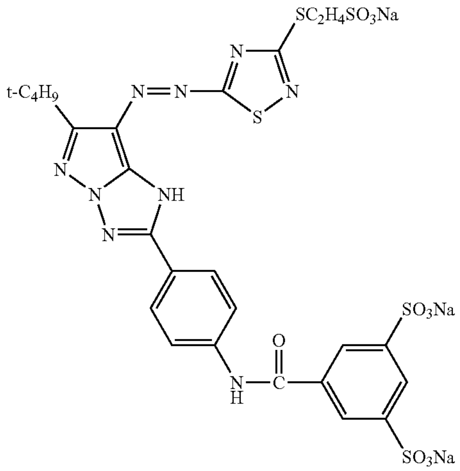
76
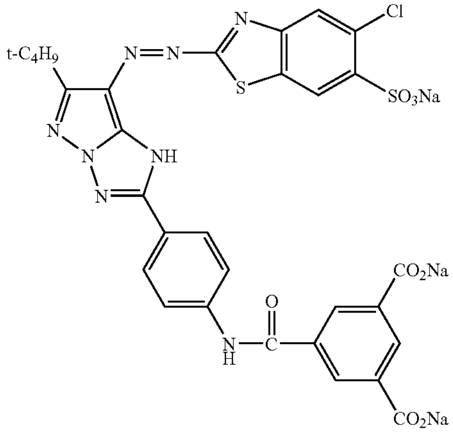

-continued

77

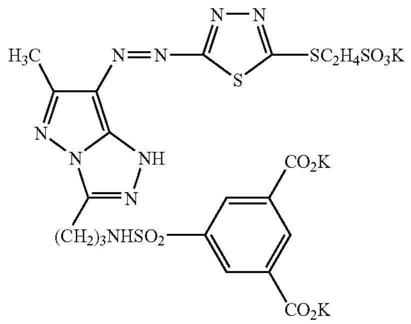

78

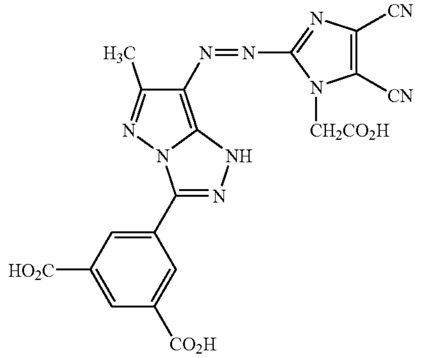

79

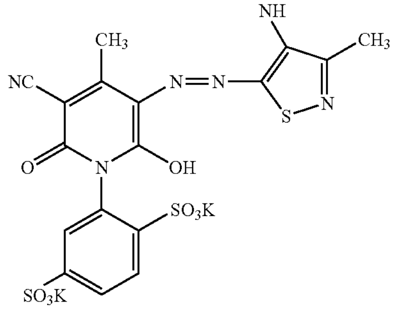

80

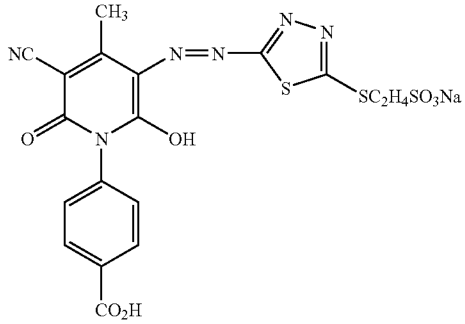

81

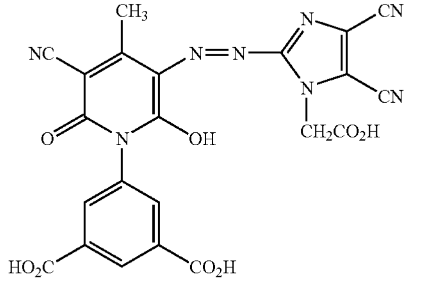

-continued

82

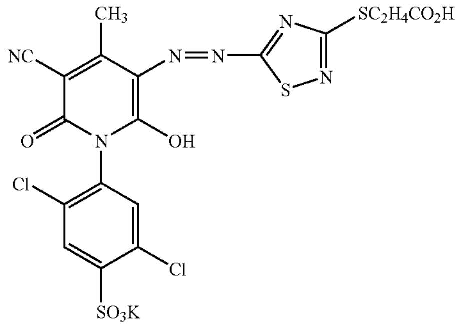

A dye represented by formula (1) is contained in yellow ink of the invention in an amount of preferably from 0.2 to 20 mass %, and more preferably from 0.5 to 15 mass %.

Dye Represented by Formula (2):

A dye represented by formula (2) is preferably a cyan dye.

Since phthalocyanine dye conventionally used in ink for ink jet recording is a mixture derived from sulfonation of unsubstituted phthalocyanine, the number and the positions of substituents cannot be specified. On the other hand, the characteristic of the dye in the invention is that the number and the positions of substituents can be specified.

As cyan inks containing this dye, the following modes are preferred.

1) Cyan ink showing light fastness in residual rate of 90% or more after 3 days on Epson PM photographic image-receiving paper by Xe 1.1 W/m (intermittent condition) through a TAC filter.
2) Cyan ink showing dye residual rate (the density after discoloration/initial density×100) of 60% or more (preferably 80% or more) in the printed area printed with a single color of the ink (cyan) so that the reflection density of the cyan through a status A filter becomes from 0.9 to 1.1 and preserved in an environment of 5 ppm of ozone for 24 hours.
3) Cyan ink in which the outflow of Cu ion into water after being subjected to discoloration with ozone in the same condition as in 2) is 20% or less of the entire dye.
4) Cyan ink capable of penetrating into 30% or more of the upper part of the image-receiving layer of a specific image-receiving paper.

In formula (2), $X_{21}$, $X_{22}$, $X_{23}$ and $X_{24}$ each represents —SO-$Z_2$, —$SO_2$-$Z_2$, —$SO_2NR_{21}R_{22}$, a sulfo group, —$CONR_{21}R_{22}$ or —$CO_2R_{22}$. Of these substituents, —SO-$Z_2$, —$SO_2$-$Z_2$, —$SO_2NR_{21}R_{22}$ and —$CONR_{21}R_{22}$ are preferred, —$SO_2$-$Z_2$ and —$SO_2NR_{21}R_{22}$ are particularly preferred, and —$SO_2$-$Z_2$ is most preferred. When any of $a_{21}$ to $a_{24}$, which respectively represent the number of the substituents of $X_{21}$ to $X_{24}$, represents a number of 2 or higher, among $X_{21}$ to $X_{24}$, those present in a plurality may be the same or different, and each represents any of the above groups. Further, $X_{21}$, $X_{22}$, $X_{23}$ and $X_{24}$ may be absolutely the same substituent, or $X_{21}$, $X_{22}$, $X_{23}$ and $X_{24}$ are the same kind of substituent but they are partially different from each other such that all of $X_{21}$, $X_{22}$, $X_{23}$ and $X_{24}$ represent —$SO_2$-$Z_2$, in which $Z_2$ is different. Alternatively, substituents different from each other, e.g., —$SO_2$-$Z_2$ and —$SO_2NR_{21}R_{22}$, may be contained.

$Z_2$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Of these groups, a substituted or unsubstituted alkyl group, a substituted or unsubstituted aryl group, and a substituted or unsubstituted heterocyclic group are preferred. A substituted alkyl group, a substituted aryl group, and a substituted heterocyclic group are most preferred.

$R_{21}$ and $R_{22}$ each represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Of these groups, a hydrogen atom, a substituted or unsubstituted alkyl group, a substituted or unsubstituted aryl group, and a substituted or unsubstituted heterocyclic group are preferred, and a hydrogen atom, a substituted alkyl group, a substituted aryl group, and a substituted heterocyclic group are more preferred. However, it is not preferred that both $R_{21}$ and $R_{22}$ represent hydrogen atoms.

As the substituted or unsubstituted alkyl groups represented by $R_{21}$, $R_{22}$ and $Z_2$, alkyl groups having from 1 to 30 carbon atoms are preferred. Branched alkyl groups are preferred for capable of increasing the solubility of dye and the stability of ink, and the case of having an asymmetric carbon atom (use in racemic modification) is particularly preferred. As the examples of the substituents, the same substituents as the substituents in the case where $Z_2$, $R_{21}$, $R_{22}$, $Y_{21}$, $Y_{22}$, $Y_{23}$ and $Y_{24}$ can further have substituents are exemplified. A hydroxyl group, an ether group, an ester group, a cyano group, an amido group and a sulfonamido group are particularly preferred for heightening the aggregation property and improving the fastness of dyes. In addition, a halogen atom and an ionic hydrophilic group may also be used as the substituents. Further, the number of carbon atoms of the substituents is not included in the number of carbon atoms of alkyl groups, and this regulation also applies to other groups.

As the substituted or unsubstituted cycloalkyl groups represented by $R_{21}$, $R_{22}$ and $Z_2$, cycloalkyl groups having from 5 to 30 carbon atoms are preferred. The case of having an. asymmetric carbon atom (use in racemic modification) is particularly preferred for capable of increasing the solubility of dye and the stability of ink. As the examples of the substituents, the same substituents as the substituents in the case where $Z_2$, $R_{21}$, $R_{22}$, $Y_{21}$, $Y_{22}$, $Y_{23}$ and $Y_{24}$ can further have substituents are exemplified. A hydroxyl group, an ether group, an ester group, a cyano group, an amido group and a sulfonamido group are particularly preferred for heightening the aggregation property and improving fastness of dyes. In addition, a halogen atom and an ionic hydrophilic group may also be used as substituents.

As the substituted or unsubstituted alkenyl groups represented by $R_{21}$, $R_{22}$ and $Z_2$, alkenyl groups having from 2 to 30 carbon atoms are preferred. Branched alkenyl groups are preferred for capable of increasing the solubility of dye and the stability of ink, and the case of having an asymmetric carbon atom (use in racemic modification) is particularly preferred. As the examples of the substituents, the same substituents as the substituents in the case where $Z_2$, $R_{21}$, $R_{22}$, $Y_{21}$, $Y_{22}$, $Y_{23}$ and $Y_{24}$ can further have substituents are exemplified. A hydroxyl group, an ether group, an ester group, a cyano group, an amido group and a sulfonamido group are particularly preferred for heightening the aggregation property and improving fastness of dyes. In addition, a halogen atom and an ionic hydrophilic group may also be used as substituents.

As the substituted or unsubstituted aralkyl groups represented by $R_{21}$, $R_{22}$ and $Z_2$, aralkyl groups having from 7 to 30 carbon atoms are preferred. Branched aralkyl groups are preferred for capable of increasing the solubility of dye and the stability of ink, and the case of having an asymmetric carbon atom (use in racemic modification) is particularly preferred. As the examples of the substituents, the same substituents as the substituents in the case where $Z_2$, $R_{21}$, $R_{22}$, $Y_{21}$, $Y_{22}$, $Y_{23}$ and $Y_{24}$ can further have substituents are exemplified. A hydroxyl group, an ether group, an ester group, a cyano group, an amido group and a sulfonamido group are particularly preferred for heightening the aggregation property and improving fastness of dyes. In addition, a halogen atom and an ionic hydrophilic group may also be used as substituents.

As the substituted or unsubstituted aryl groups represented by $R_{21}$, $R_{22}$ and $Z_2$, aryl groups having from 6 to 30 carbon atoms are preferred. As the examples of the substituents, the same substituents as the substituents in the case where $Z_2$, $R_{21}$, $R_{22}$, $Y_{21}$, $Y_{22}$, $Y_{23}$ and $Y_{24}$ can further have substituents are exemplified. Electron attractive groups are particularly preferred for capable of making the oxidation potential noble and improving fastness of dyes. As electron attractive groups, electron attractive groups having a positive $\sigma p$ value of Hammett's substitution constant are exemplified. Of such electron attractive groups, a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group, and a quaternary ammonium group are preferred, and a cyano group, a carboxyl group, a sulfamoyl group, a carbamoyl group, a sulfonyl group, an imido group, an acyl group, a sulfo group, and a quaternary ammonium group are more preferred.

As the heterocyclic groups represented by $R_{21}$, $R_{22}$ and $Z_2$, 5- or 6-membered heterocyclic groups are preferred, and these groups may be further condensed. The heterocyclic groups may be aromatic or non-aromatic heterocyclic groups. The heterocyclic groups represented by $R_{21}$, $R_{22}$ and $Z_2$ are shown below in the form of heterocyclic rings by omitting the substitution position. Substitution position is not limited, e.g., pyridine can substitute at 2-position, 3-position or 4-position. As the examples of the heterocyclic groups, pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isooxazole, benzisooxazole, pyrrolidine, piperidine, piperazine, imidazolidine and thiazoline are exemplified. Aromatic heterocyclic groups are especially preferred, and as the preferred examples, similarly to the above, pyridine, pyrazine, pyrimidine, pyridazine, triazine, pyrazole, imidazole, benzimidazole, triazole, thiazole, benzothiazole, isothiazole, benzisothiazole and thiadiazole are exemplified. These heterocyclic groups may have a substituent, and as the examples of the substituents, the same substituents as the substituents in the case where $Z_2$, $R_{21}$, $R_{22}$, $Y_{21}$, $Y_{22}$, $Y_{23}$ and $Y_{24}$ can further have substituents are exemplified. Preferred substituents are the same as the preferred substituents of the aryl group and more preferred substituents are the same as the more preferred substituents of the aryl group respectively.

$Y_{21}$, $Y_{22}$, $Y_{23}$ and $Y_{24}$ each represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxyl group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group, or a sulfo group, and each group may further be substituted.

Of these groups, a hydrogen atom, a halogen atom, an alkyl group, an aryl group, a cyano group, an alkoxyl group, an amido group, a ureido group, a sulfonamido group, a carbamoyl group, a sulfamoyl group, an alkoxycarbonyl group, a carboxyl group, and a sulfo group are more preferred, a hydrogen atom, a halogen atom, a cyano group, a carboxyl group, and a sulfo group are particularly preferred, and a hydrogen atom is most preferred.

When it is possible for $Z_2$, $R_{21}$, $R_{22}$, $Y_{21}$, $Y_{22}$, $Y_{23}$ and $Y_{24}$ to have further substituents, the following substituents may further be used.

A straight or branched chain alkyl group having from 1 to 12 carbon atoms, a straight or branched chain aralkyl group having from 7 to 18 carbon atoms, a straight or branched chain alkenyl group having from 2 to 12 carbon atoms, a straight or branched chain alkynyl group having from 2 to 12 carbon atoms, a straight or branched chain cycloalkyl group having from 3 to 12 carbon atoms, a straight or branched chain cycloalkenyl group having from 3 to 12 carbon atoms (each of the above groups preferably has branched chain for capable of increasing the solubility of dye and the stability of ink, and each group particularly preferably has an asymmetric carbon atom, the specific examples of the above groups are, e.g., methyl, ethyl, propyl, isopropyl, sec-butyl, t-butyl, 2-ethylhexyl, 2-methylsulfonylethyl, 3-phenoxypropyl, trifluoromethyl, cyclopentyl), a halogen atom (e.g., chlorine, bromine), an aryl group (e.g., phenyl, 4-t-butylphenyl, 2,4-di-t-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxyl group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-t-butylphenoxy, 3-nitrophenoxy, 3-t-butyloxycarbamoylphenoxy, 3-methoxycarbamoyl), an acylamino group (e.g., acetamido, benzamido, 4-(3-t-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoyl group (e.g., N,N-dipropylsulfamoylamino), an alkylthio group (e.g., methylthio, octylthio, 2-phenoxyethylthio), an arylthio group (e.g., phenylthio, 2-butoxy-5-t-octylphenylthio, 2-carboxyphenylthio), an alkyloxycarbonylamino group (e.g., methoxycarbonylamino), a sulfonamide group (e.g., methanesulfonamide, benzenesulfonamide, p-toluenesulfonamide), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g. 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-diphenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., a carboxyl group, a sulfo group, a phosphono group and a quaternary ammonium group) are exemplified.

When a phthalocyanine dye represented by formula (2) is water-soluble, it is preferred for the dye to have an ionic hydrophilic group. The examples of the ionic hydrophilic groups include a sulfo group, a carboxyl group, a phosphono group and a quaternary ammonium group. As the ionic hydrophilic groups, a carboxyl group, a phosphono group and a sulfo group are preferred, and a carboxyl group and a sulfo group are particularly preferred. The carboxyl group, phosphono group and sulfo group may be in the state of a salt, and the examples of counter ions for forming a salt include an ammonium ion, an alkali metal ion (e.g., a lithium ion, a sodium ion, a potassium ion) and an organic cation (e.g., a tetramethylammonium ion, a tetramethylguanidinium ion, a tetramethylphosphonium ion). Of the counter ions, alkali metal salts are preferred, and a lithium salt is particularly preferred for capable of increasing the solubility of dye and the stability of ink.

It is preferred to have at least two ionic hydrophilic groups in one molecule of a phthalocyanine dye, and it is particularly preferred to have at least two sulfo groups and/or carboxyl groups.

$a_{21}$ to $a_{24}$, and $b_{21}$ to $b_{24}$ respectively represent the number of the substituents of $X_{21}$ to $X_{24}$ and $Y_{21}$ to $Y_{24}$. $a_{21}$ to $a_{24}$ each represents an integer of from 0 to 4, but $a_{21}$ to $a_{24}$ do not represent 0 at the same time. $b_{21}$ to $b_{24}$ each represents an integer of from 0 to 4. When any of $a_{21}$ to $a_{24}$ and $b_{21}$ to $b_{24}$ represents an integer of 2 or higher, any of $X_{21}$ to $X_{24}$ and $Y_{21}$ to $Y_{24}$ present in a plurality may be the same or different.

a21 and $b_{21}$ satisfy the relationship of $a_{21}+b_{21}=4$. A particularly preferred combination is that $a_{21}$ represents 1 or 2 and $b_{21}$ represents 3 or 2, and the most preferred combination is that $a_{21}$ represents 1 and $b_{21}$ represents 3.

In combinations of $a_{22}$ and $b_{22}$, $a_{23}$ and $b_{23}$, and $a_{24}$ and $b_{24}$, respective combinations have the same relationship as the combination of $a_{21}$ and $b_{21}$, and preferred combinations are also the same.

M represents a hydrogen atom, a metal element, oxide or hydroxide of the metal element, or halide.

M preferably represents, besides a hydrogen atom, as metal elements, e.g., Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. As oxides, VO and GeO are preferred. As hydroxides, $Si(OH)_2$, $Cr(OH)_2$ and $Sn(OH)_2$ are preferred. As halides, AlCl, $SiCl_2$, VCl, $VCl_2$, VOCl, FeCl, GaCl and ZrCl are exemplified. Cu, Ni, Zn and Al are particularly preferred of all, and Cu is most preferred.

Pc (a phthalocyanine ring) may form a dimer (e.g., Pc-M-L-M-Pc) or a trimer via L (a divalent linking group), and M may be the same or different at this time.

As the divalent linking groups represented by L, an oxy group-O—, a thio group-S—, a carbonyl group-CO—, a sulfonyl group-$SO_2$—, an imino group-NH—, a methylene group-$CH_2$—, and groups formed by combining these groups are preferred.

With respect to combinations of the preferred substituents of the compounds represented by formula (2), compounds having at least one above-described preferred group in various substituents are preferred, compounds having many preferred groups in various substituents are more preferred, and compounds in which all the substituents are the above described preferred groups are most preferred.

The phthalocyanine dye represented by formula (2) is more preferably represented by formula (5). The phthalocyanine dye represented by formula (5) is described in detail below.

In formula (5), $X_{51}$ to $X_{54}$, and $Y_{51}$ to $Y_{58}$ respectively have the same meaning as $X_{21}$ to $X_{24}$, and $Y_{21}$ to $Y_{24}$ in formula (2), and preferred examples are also the same. $M_1$ has the same meaning as M in formula (2), and preferred examples are also the same.

In formula (5), $a_{51}$ to $a_{54}$ each represents an integer of 1 or 2, preferably $a_{51}$ to $a_{54}$ satisfy the relationship of $4 \leqq a_{51}+a_{52}+a_{53}+a_{54} \leqq 6$, particularly preferably $a_{51}=a_{52}=a_{53}=a_{54}=1$.

$X_{51}$, $X_{52}$, $X_{53}$ and $X_{54}$ may be absolutely the same substituent, or $X_{51}$, $X_{52}$, $X_{53}$ and $X_{54}$ are the same kind of substituent but they are partially different from each other such that all of $X_{51}$, $X_{52}$, $X_{53}$ and $X_{54}$ represent —$SO_2$-$Z_5$, in which $Z_5$ is different. Alternatively, substituents different from each other, e.g., —$SO_2$-$Z_5$ and —$SO_2NR_{51}R_{52}$, may be contained.

Of the phthalocyanine dyes represented by formula (5), particularly preferred combinations are shown below.

$X_{51}$ to $X_{54}$ each preferably represents —SO-$Z_5$, —$SO_2$-$Z_5$, —$SO_2NR_{51}R_{52}$ or —$CONR_{51}R_{52}$, particularly preferably —$SO_2$-$Z_5$ or —$SO_2NR_{51}R_{52}$, and most preferably —$SO_2$-$Z_5$.

$Z_5$ preferably represents a substituted or unsubstituted alkyl group, a substituted or unsubstituted aryl group, or a substituted or unsubstituted heterocyclic group. A substituted alkyl group, a substituted aryl group, and a substituted heterocyclic group are most preferred. The case of having an asymmetric carbon atom (use in racemic modification) in the substituents is particularly preferred for capable of increasing the solubility of dye and the stability of ink. It is preferred to have a hydroxyl group, an ether group, an ester group, a cyano group, an amido group and a sulfonamido group in the substituents for heightening the aggregation property and improving fastness of dyes.

$R_{51}$ and R52 each preferably represents a hydrogen atom, a substituted or unsubstituted alkyl group, a substituted or unsubstituted aryl group, or a substituted or unsubstituted heterocyclic group. Of these groups, a hydrogen atom, a substituted alkyl group, a substituted aryl group, and a substituted heterocyclic group are more preferred. However, it is not preferred that both $R_{51}$ and $R_{52}$ represent hydrogen atoms. The case of having an asymmetric carbon atom (use in racemic modification) in the substituents is particularly preferred for capable of increasing the solubility of dye and the stability of ink. It is preferred to have a hydroxyl group, an ether group, an ester group, a cyano group, an amido group and a sulfonamido group in the substituents for heightening the aggregation property and improving fastness of dyes.

$Y_{51}$ to $Y_{58}$ each preferably represents a hydrogen atom, a halogen atom, an alkyl group, an aryl group, a cyano group, an alkoxyl group, an amido group, a ureido group, a sulfonamido group, a carbamoyl group a sulfamoyl group, an alkoxycarbonyl group, a carboxyl group, or a sulfo group, particularly preferably a hydrogen atom, a halogen atom, a cyano group, a carboxyl group, or a sulfo group, and most preferably a hydrogen atom.

$a_{51}$ to $a_{54}$ each preferably represents 1 or 2, and particularly preferably all of $a_{51}$ to $a_{54}$ represent 1.

$M_1$ represents a hydrogen atom, a metal element, oxide or hydroxide of the metal element, or halide, preferably Cu, Ni, Zn or Al, and Cu is particularly preferred.

When a phthalocyanine dye represented by formula (5) is water-soluble, it is preferred for the dye to have an ionic hydrophilic group. The examples of ionic hydrophilic groups include a sulfo group, a carboxyl group, a phosphono group and a quaternary ammonium group. As the ionic hydrophilic groups, a carboxyl group, a phosphono group and a sulfo group are preferred, and a carboxyl group and a sulfo group are particularly preferred. The carboxyl group, phosphono group and sulfo group may be in the state of a salt, and the examples of counter ions for forming a salt include an ammonium ion, an alkali metal ion (e.g., a lithiumion, a sodium ion, a potassium ion) and an organic cation (e.g., a tetramethylammonium ion, a tetramethylguanidinium ion, a tetramethylphosphonium ion). Of the counter ions, alkali metal salts are preferred, and a lithium salt is particularly preferred for capable of increasing the solubility of dye and the stability of ink.

It is preferred to have at least two ionic hydrophilic groups in one molecule of a phthalocyanine dye, and it is particularly preferred to have at least two sulfo groups and/or carboxyl groups.

With respect to preferred combinations of the substituents of the compounds represented by formula (5), compounds in which at least one substituent of various substituents is the above preferred group are preferred, compounds in which more substituents are the above preferred groups are more preferred, and compounds in which all the substituents are the above preferred groups are most preferred.

As the chemical structure of the phthalocyanine dye of the invention, it is preferred to introduce at least one electron attractive group, e.g., a sulfinyl group, a sulfonyl group or a sulfamoyl group, to every four benzene rings of phthalocyanine, so that the sum total of σp values of the substituents of the entire phthalocyanine skeleton becomes 1.6 or more.

A σp value of Hammett's substitution constant is described below in brief. Hammett's rule is a rule of thumb advocated by L. P. Hammett in 1935 for quantitatively discussing the influence of a substituent upon the reaction or equilibrium of a benzene derivative, and the pertinence of the rule is widely appreciated today. There are a up value and a am value in substitution constant according to Hammett's rule, and these values can be found in various general literatures, e.g., described in detail in J. A. Dean compiled, *Lange's Handbook of Chemistry,* $12_{th}$ Edition, McGraw-Hill (1979), and *Kagaku no Ryoiki* (*The Domain of Chemistry*), an extra number, No. 122, pp. 96 to 103, Nankodo Co. (1979).

A phthalocyanine derivative represented by formula (2) is generally a mixture of analogous substances inevitably different in the positions and numbers of substituents Xn (n is from 1 to 4) and Ym (m is from 1 to 4) according to its synthesis method, accordingly these mixtures of analogous substances are in many cases statistically standardized in general formulae. By classifying these mixtures of analogous substances into the following three types, it can be found that a specific mixture is particularly preferred. That is, the mixtures of analogous substances of the phthalocyanine dyes represented by formulae (2) and (5) are defined by classifying into the following three types on the basis of the substitution positions. The positions of $Y_{51}$, $Y_{52}$, $Y_{53}$, $Y_{54}$, $Y_{55}$, $Y_{56}$, $Y_{57}$ and $Y_{58}$ in formula (5) are respectively taken as 1-, 4-, 5-, 8-, 9-, 12-, 13- and 16-positions.

(1) β-Position substitution type: Phthalocyanine dyes having specific substituents at 2- and-3-positions, 6- and 7-positions, 10- and 11-positions, and 14- and 15-positions.

(2) α-Position substitution type: Phthalocyanine dyes having specific substituents at 1- and/or 4-positions, 5- and/or 8-positions, 9- and/or 12-positions, and 13- and/or 16-positions.

(3) α,β-Position mixed substitution type: Phthalocyanine dyes having specific substituents at from 1- to 16-positions with no regularity.

In explaining phthalocyanine dye derivatives having different structures (in particular different in substitution position) in the specification of the invention, the above β-position substitution type, α-position substitution type and α,β-position mixed substitution type are used.

Phthalocyanine derivatives for use in the present invention can be synthesized according to the methods described or quoted, e.g., in Shirai and Kobayashi, *Phthalocyanine Kagaku to Kino* (*Phthalocyanine Chemistry and Functions*), pp. 1 to 62, IPC Publishing Co., C. C. Leznoff and A. B. P. Lever, *Phthalocyanies—Properties and Applications*, pp. 1 to 54, VCH Publishing Co., or analogous methods to the above methods.

As disclosed in WO 00/17275, WO 00/08103, WO 00/08101, WO 98/41853, and JP-A-10-36471, the phthalocyanine compound represented by formula (2) can be synthesized, e.g., by sulfonation, sulfonyl chloridization and amidation reactions of an unsubstituted phthalocyanine compound. In this case, sulfonation can occur at anywhere on the phthalocyanine nucleus and it is difficult to control the number of sulfonation. Accordingly, in the case where sulfo groups are introduced in such a reaction condition, the positions and the number of sulfo groups introduced into the product cannot be specified, and as an inevitable result, the obtained compound is a mixture containing substituents differing in the number and the substitution positions. Therefore, when a dye is synthesized with the mixture as a starting material, since the number and substitution positions of heterocyclic ring-substituted sulfamoyl groups cannot be specified, the dye is obtained as an α,β-position mixed substitution type mixture containing some kinds of compounds different in the number and the substitution positions of substituents.

As described above, when a large number of electron attractive groups, e.g., sulfamoyl groups, are introduced into phthalocyanine nuclei, oxidation potential becomes nobler and ozone resistance is heightened. According to the above synthesis methods, a phthalocyanine dye to which electron attractive groups introduced are less in number, i.e., oxidation potential is baser, cannot be prevented from being mixed. Therefore, it is preferred to use synthesis methods capable of suppressing the formation of a compound baser in oxidation potential for improving ozone resistance.

A phthalocyanine compound represented by formula (5) can be obtained by the reaction of phthalonitrile derivative (Compound P shown below) and/or diiminoisoindoline derivative (Compound Q shown below) with a metal derivative represented by formula (6) shown below, or derived from the tetrasulfophthalocyanine compound obtained by the reaction of a 4-sulfophthalonitrile derivative (Compound R shown below) with a metal derivative represented by formula (6).

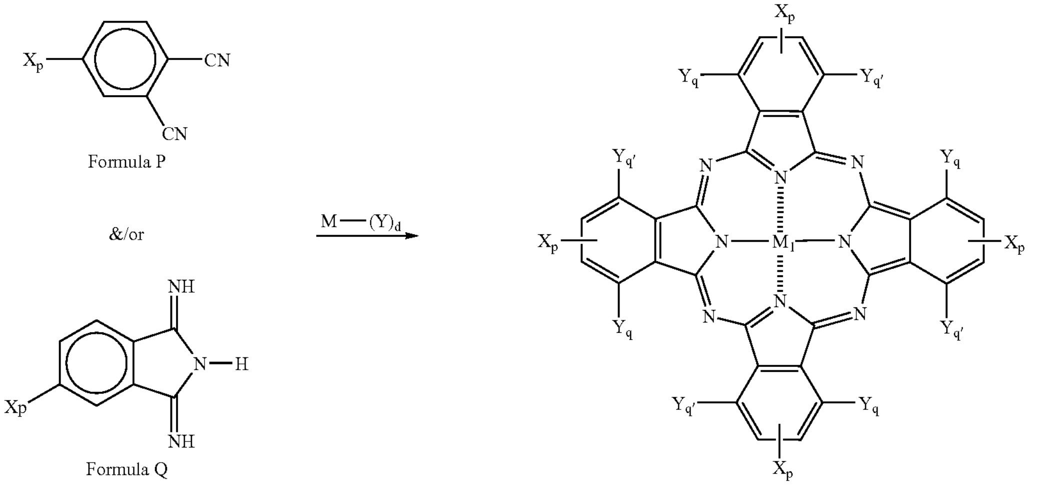

Formula P

&/or

Formula Q

Compound corresponding to formula (5)

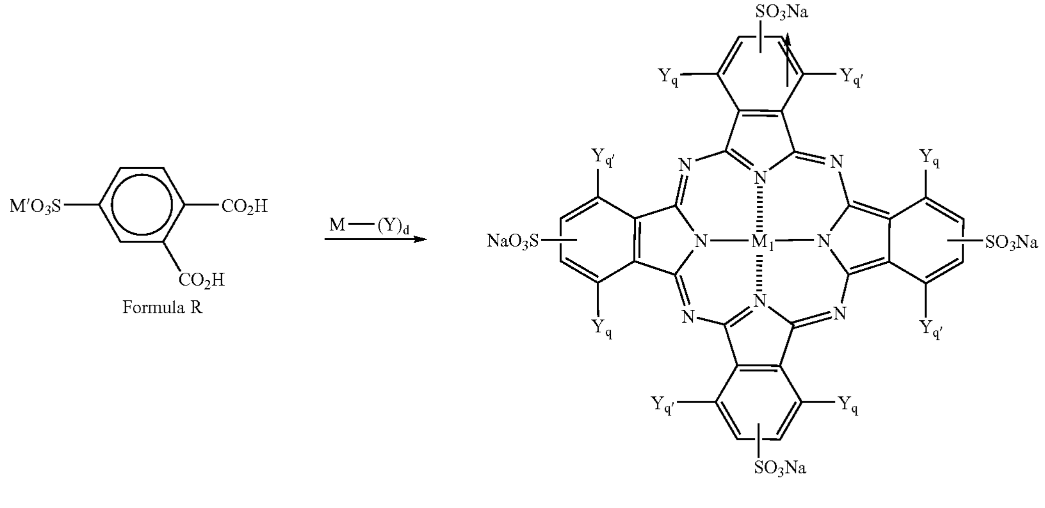

Formula R

In the above formulae, Xp corresponds to $X_{51}$, $X_{52}$, $X_{53}$ or $X_{54}$ in formula (5). Yq and Yq' each corresponds to of $Y_{51}$, $Y_{52}$, $Y_{53}$, $Y_{54}$, $Y_{55}$, $Y_{56}$, $Y_{57}$ or $Y_{58}$ in formula (5). M' in formula R represents a cation.

As the cations represented by M', alkali metal ions, e.g., Li, Na and K, and organic cations, e.g., a triethylammonium ion and pyridinium ion are exemplified.

$$M\text{-}(Y)_d \qquad (6)$$

In formula (6), M has the same meaning as M in formula (2) and $M_1$ in formula (5); Y represents a monovalent or divalent ligand, e.g., a halogen atom, an acetate anion, acetylacetonate and oxygen; and d represents an integer of from 1 to 4.

That is, according to the above synthesis method, specified number of desired substituents can be introduced. Particularly when it is desired to introduce a large number of electron attractive groups for the purpose of making oxidation potential nobler, the above synthesis method is extremely excellent as compared with the already described methods for synthesizing a phthalocyanine compound represented by formula (2).

The thus-obtained phthalocyanine compound represented by formula (5) is generally a mixture of compounds represented formulae (a)-1 to (a)-4 shown below, which are isomers at each substitution position of Xp, that is, a β-position substitution type.

Formula (a)-1

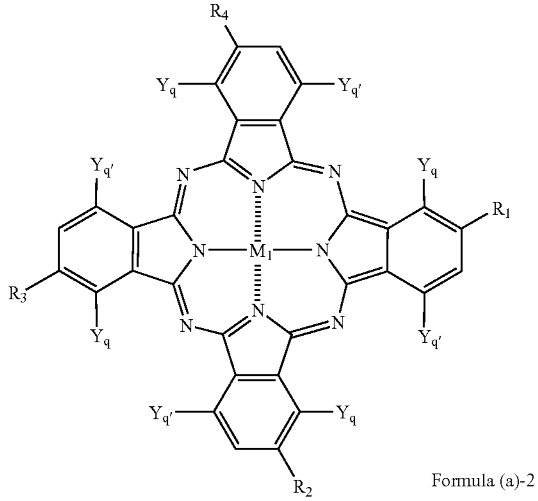

Formula (a)-2

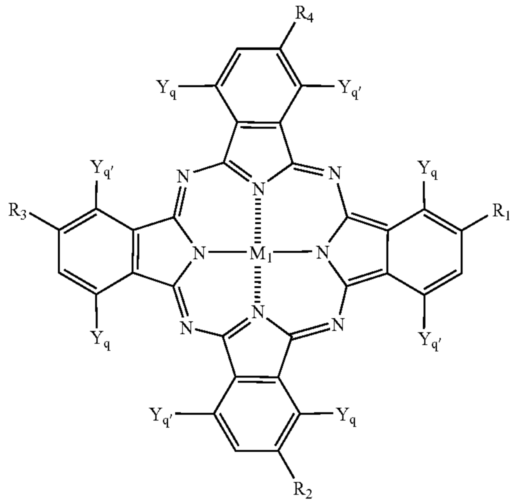

-continued

Formula (a)-3

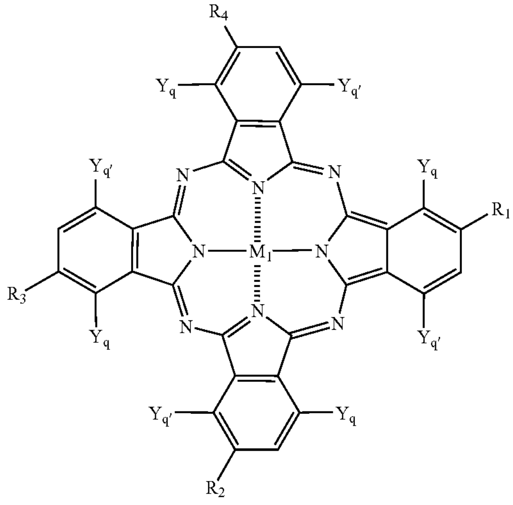

Formula (a)-4

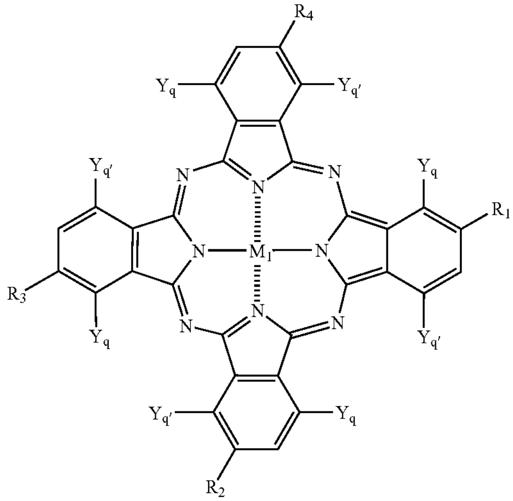

In the above synthesis method, when the same substituent is used as Xp, a β-position substitution type phthalocyanine dye in which $X_{51}$, $X_{52}$, $X_{53}$ and $X_{54}$ are absolutely the same substituent can be obtained. On the other hand, when different substituents are used in combination as Xp, a dye having the same kind but partially different substituents, or a dye having substituents different from each other can be synthesized. Of the dyes represented by formula (5), these dyes having electron attractive groups different from each other are particularly preferred for capable of adjusting the solubility of dyes and the aggregation property and the stability with the lapse of time of inks.

Further, although detailed reasons are not clear, β-position substitution type phthalocyanine dye is apparently superior to α,β-position mixed substitution type in hue, light fastness and ozone gas resistance.

The specific examples of the phthalocyanine dyes represented by formulae (2) and (5) (Exemplified Compounds I-1 to I-12 and 101 to 190) are shown below, but the phthalocyanine dyes used in the invention are not limited thereto.

Exemplified Compound:
(I-1)
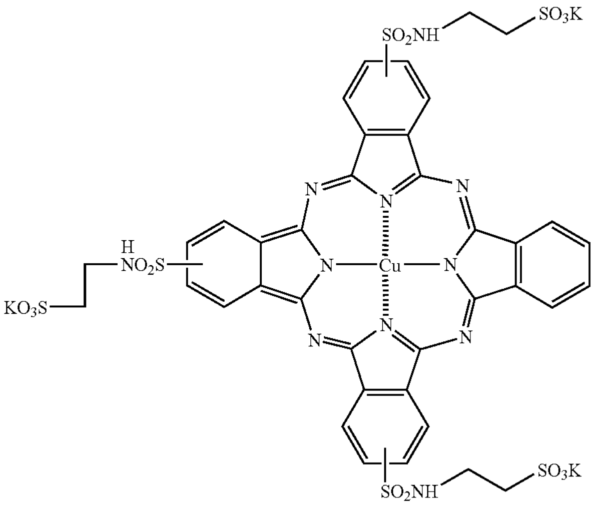
(I-2)
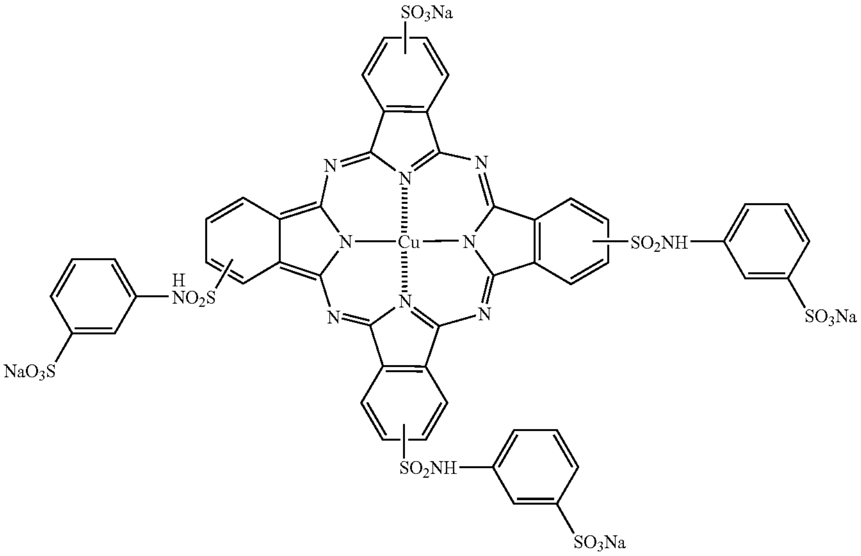
(I-3)
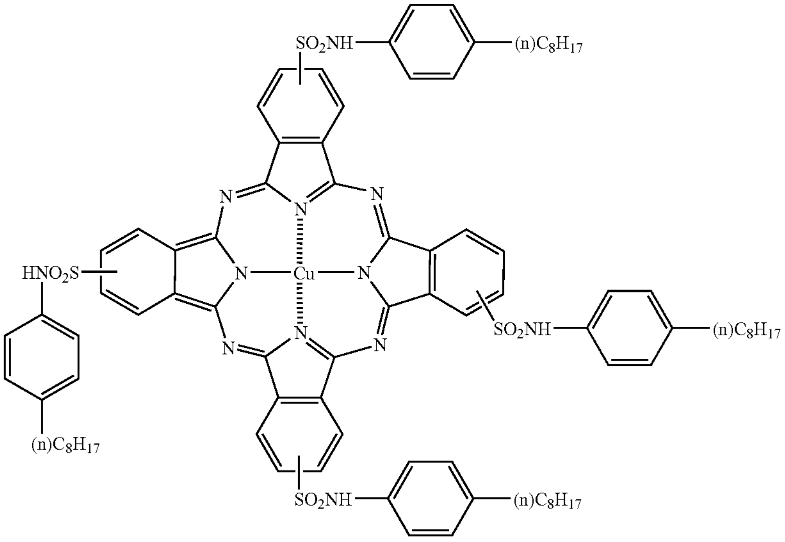

-continued
(I-4)
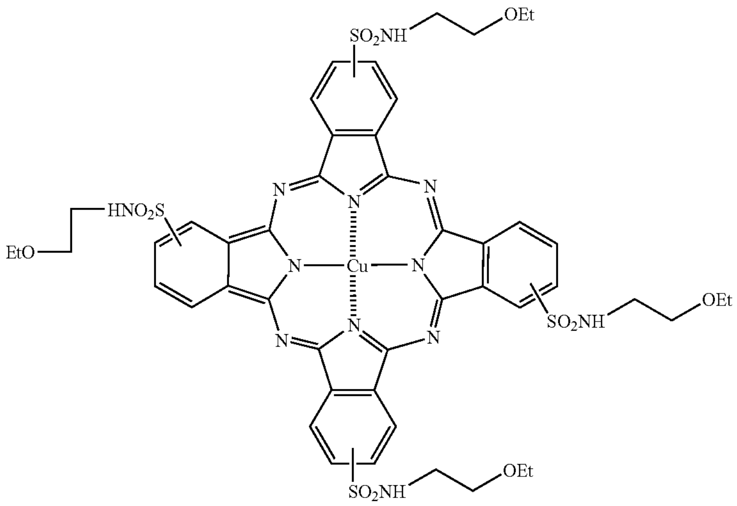
(I-5)
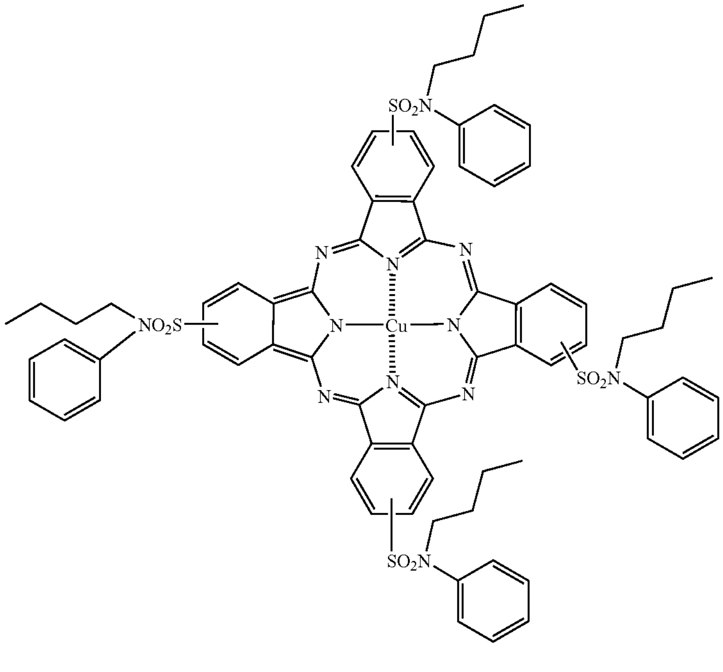

-continued
(I-6)
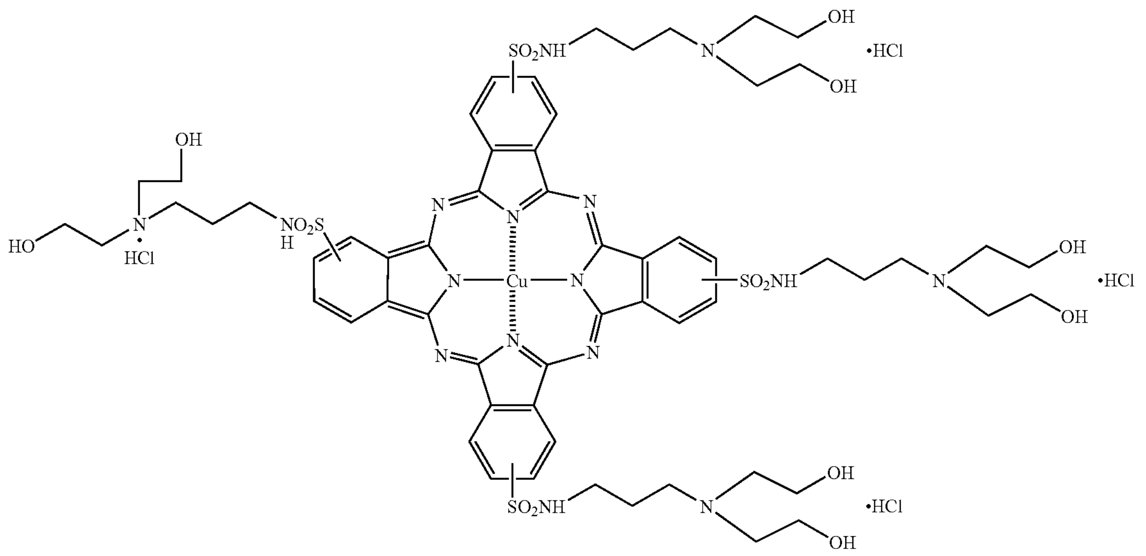
(I-7)
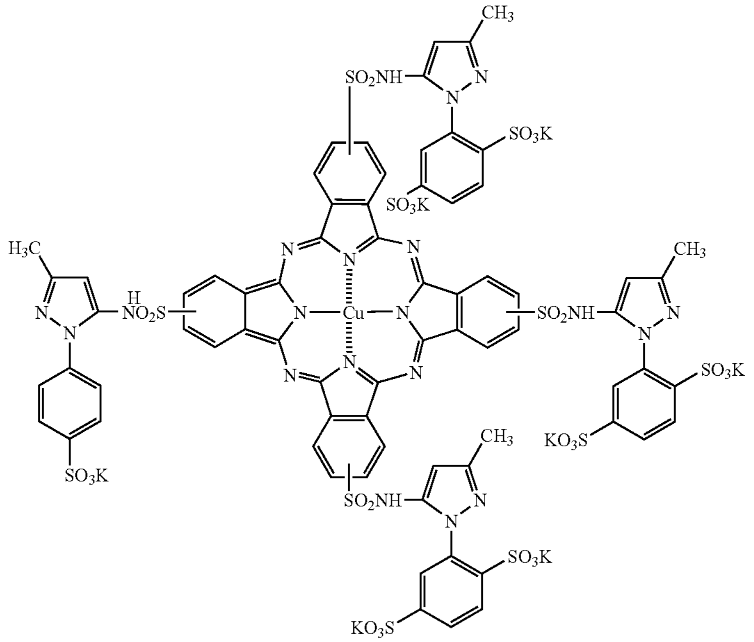

-continued
(I-8)
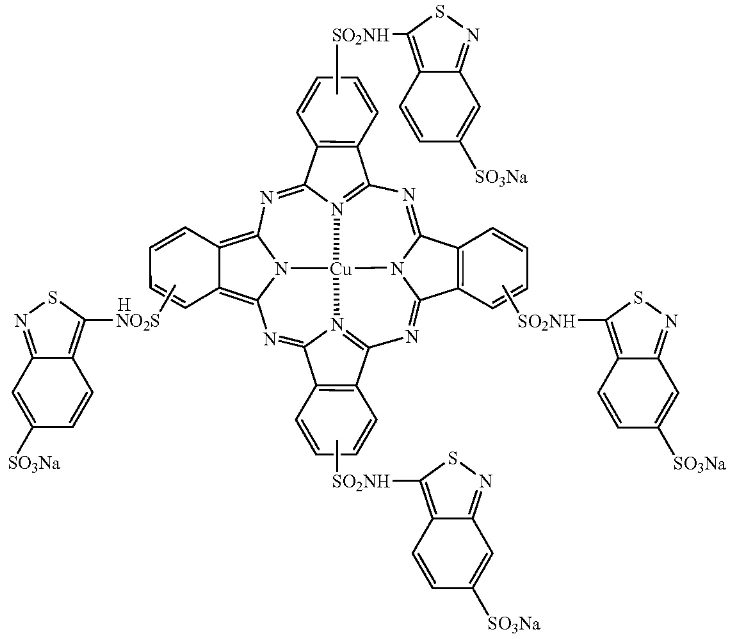
(I-9)
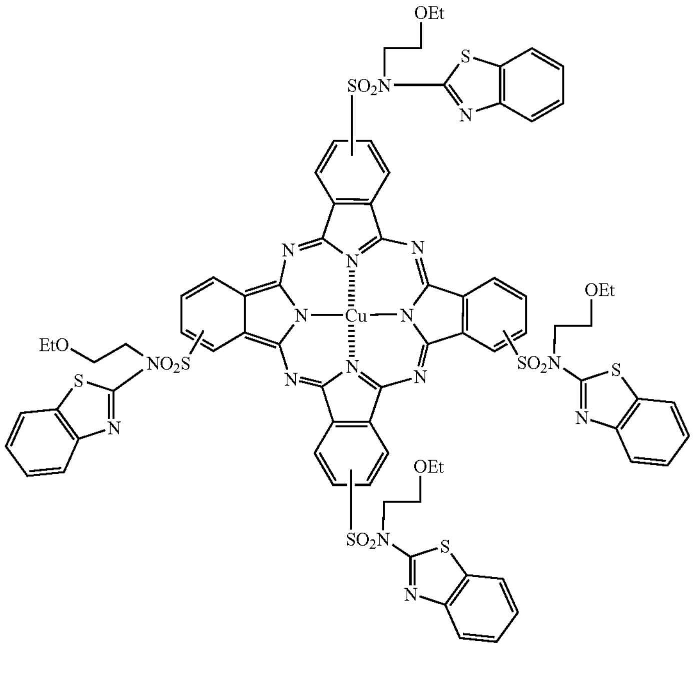

-continued
(I-10)
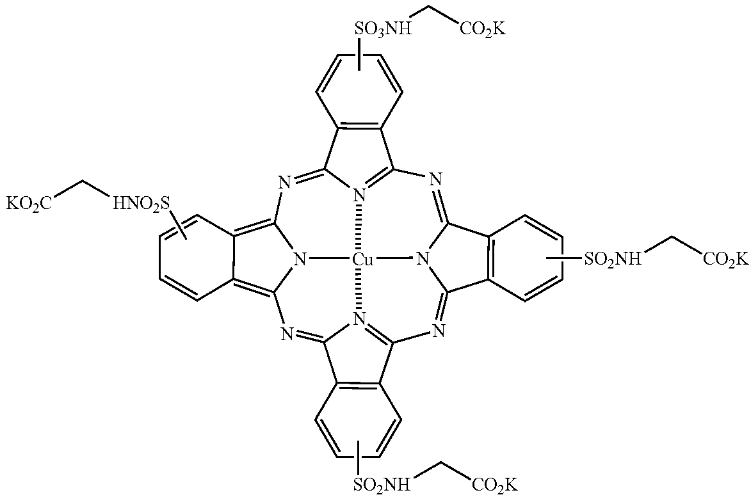
(I-11)
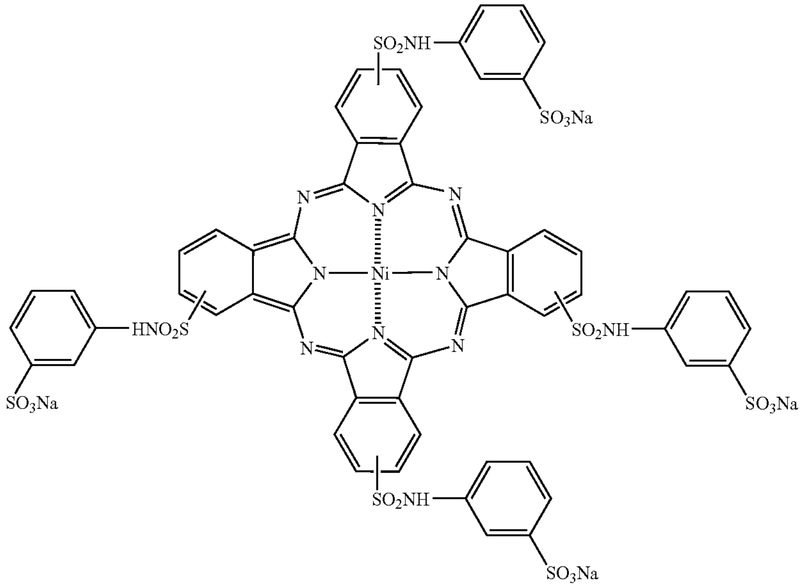
(I-12)
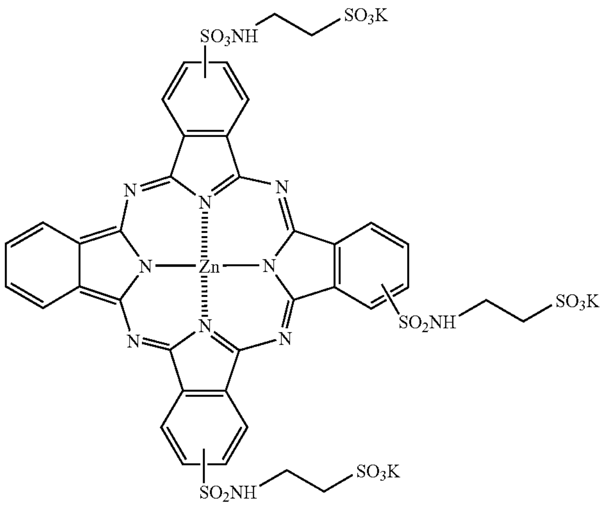

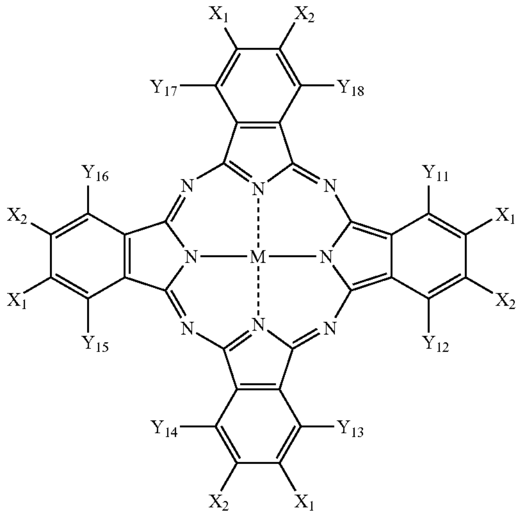
| Cpd. No. | M | $X_1$ |
|---|---|---|
| 101 | Cu | $—SO_2—NH—CH_2—CH_2—SO_3Li$ |
| 102 | Cu | 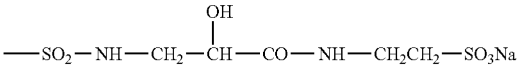 |
| 103 | Cu | 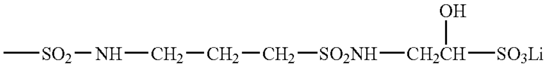 |
| 104 | Cu | 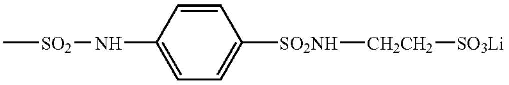 |
| 105 | Ni | 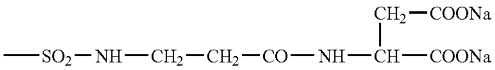 |
| 106 | Cu | $—SO_2—NH—CH_2—CH_2—SO_2—NH—CH_2—COONa$ |
| 107 | Cu | 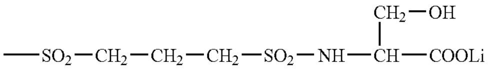 |
| 108 | Cu | $—SO_2—CH_2—CH_2—CH_2—SO_3Li$ |
| 109 | Cu | $—SO_2—CH_2—CH_2—CH_2—SO_3K$ |
| 110 | Cu | $—SO_2—(CH_2)_5—CO_2K$ |
| 111 | Cu | 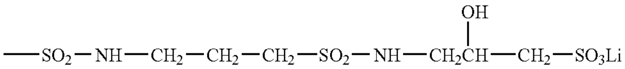 |
| 112 | Cu | 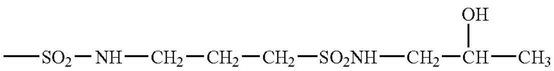 |
| 113 | Cu | 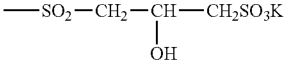 |
| 114 | Cu | 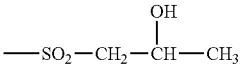 |
| 115 | Cu | 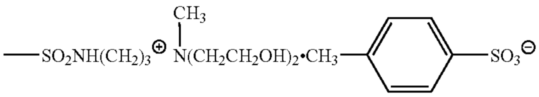 |

-continued
| | | |
|---|---|---|
| 116 | Cu | 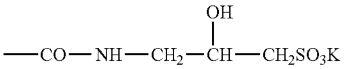 |
| 117 | Cu | 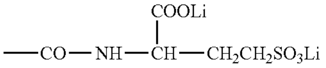 |
| 118 | Cu | 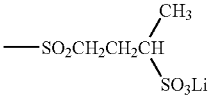 |
| 119 | Cu | 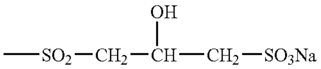 |
| 120 | Cu | 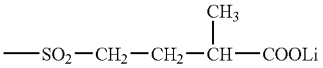 |
| 121 | Cu | 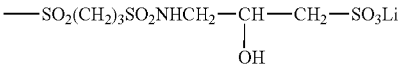 |
| 122 | Cu | 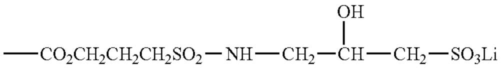 |
| 123 | Cu | $-SO_2NH-C_8H_{17}(t)$ |
| 124 | Cu | 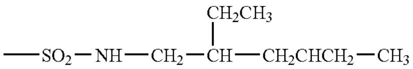 |
| 125 | Cu | 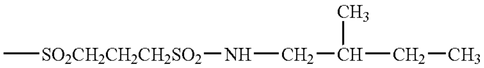 |
| 126 | Cu | 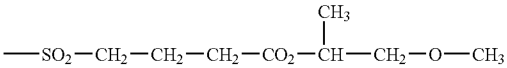 |
| 127 | Cu | 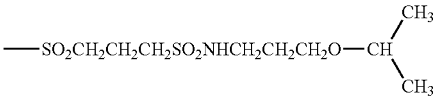 |
| 128 | Zn | 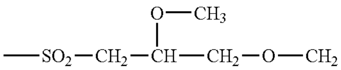 |
| 129 | Cu | 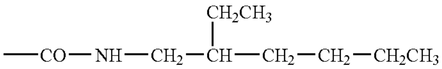 |
| 130 | Cu | 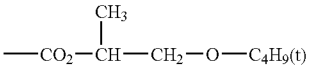 |
| 131 | Cu | 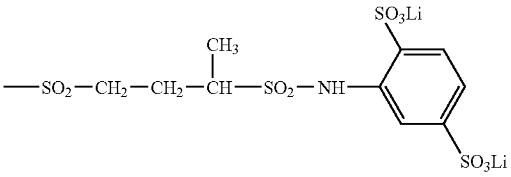 |

-continued
132 Cu 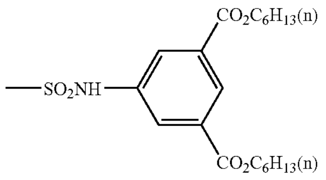
133 Cu 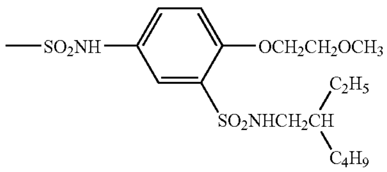
134 Cu 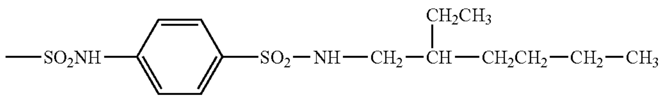
135 Cu 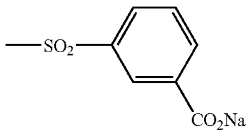
136 Cu 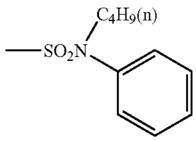
137 Cu 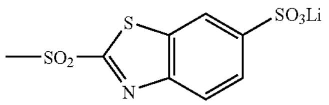
138 Cu 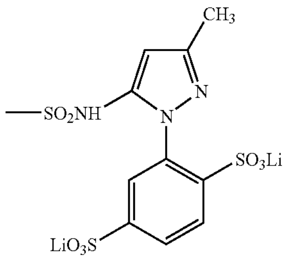
139 Cu 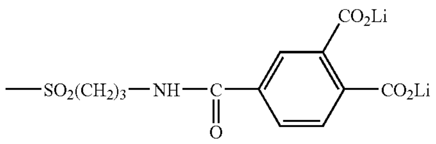
140 Cu 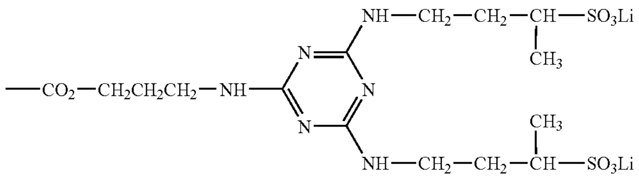
141 Cu 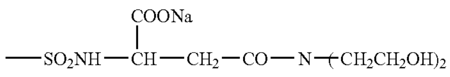

-continued

| | | |
|---|---|---|
| 142 | Cu | 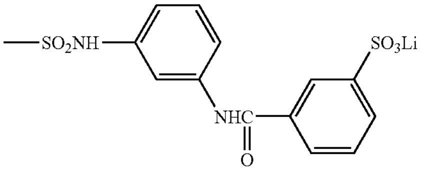 |
| 143 | Cu | 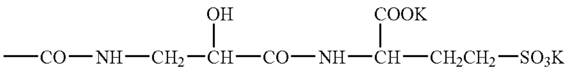 |
| 144 | Cu | 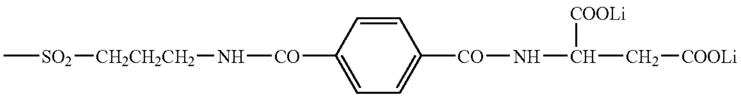 |
| 145 | Cu | —$SO_2CH_2CH_2OCH_2CH_2OCH_2CH_2SO_3Li$ |

| Cpd. No. | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|
| 101 | —H | —H, —H | —H, —H | —H, —H | —H, —H |
| 102 | —H | —Cl, —H | —Cl, —H | —Cl, —H | —Cl, —H |
| 103 | —H | —H, —H | —H, —H | —H, —H | —H, —H |
| 104 | —H | —H, —H | —H, —H | —H, —H | —H, —H |
| 105 | —H | —Cl, —H | —Cl, —H | —Cl, —H | —Cl, —H |
| 106 | —CN | —H, —H | —H, —H | —H, —H | —H, —H |
| 107 | —H | —H, —H | —H, —H | —H, —H | —H, —H |
| 108 | —H | —H, —H | —H, —H | —H, —H | —H, —H |
| 109 | —H | —H, —H | —H, —H | —H, —H | —H, —H |
| 110 | —H | —H, —H | —H, —H | —H, —H | —H, —H |
| 111 | —H | —H, —H | —H, —H | —H, —H | —H, —H |
| 112 | —$SO_3Li$ | —H, —H | —H, —H | —H, —H | —H, —H |
| 113 | —H | —H, —H | —H, —H | —H, —H | —H, —H |
| 114 | —$SO_3Li$ | —H, —H | —H, —H | —H, —H | —H, —H |
| 115 | —H | —H, —H | —H, —H | —H, —H | —H, —H |
| 116 | —H | —H, —H | —H, —H | —H, —H | —H, —H |
| 117 | —H | —H, —H | —H, —H | —H, —H | —H, —H |
| 118 | —H | —H, —H | —H, —H | —H, —H | —H, —H |
| 119 | —H | —H, —H | —H, —H | —H, —H | —H, —H |
| 120 | —H | —H, —H | —H, —H | —H, —H | —H, —H |
| 121 | —H | —H, —H | —H, —H | —H, —H | —H, —H |
| 122 | —H | —H, —H | —H, —H | —H, —H | —H, —H |
| 123 | —H | —H, —H | —H, —H | —H, —H | —H, —H |
| 124 | —H | —H, —H | —H, —H | —H, —H | —H, —H |
| 125 | —H | —H, —H | —H, —H | —H, —H | —H, —H |
| 126 | —H | —H, —H | —H, —H | —H, —H | —H, —H |
| 127 | —H | —H, —H | —H, —H | —H, —H | —H, —H |
| 128 | —CN | —H, —H | —H, —H | —H, —H | —H, —H |
| 129 | —H | —Cl, —H | —Cl, —H | —Cl, —H | —Cl, —H |
| 130 | —H | —H, —H | —H, —H | —H, —H | —H, —H |
| 131 | —H | —H, —H | —H, —H | —H, —H | —H, —H |
| 132 | —H | —H, —H | —H, —H | —H, —H | —H, —H |
| 133 | —H | —H, —H | —H, —H | —H, —H | —H, —H |
| 134 | —H | —H, —H | —H, —H | —H, —H | —H, —H |
| 135 | —H | —H, —H | —H, —H | —H, —H | —H, —H |
| 136 | —H | —H, —H | —H, —H | —H, —H | —H, —H |
| 137 | —H | —H, —H | —H, —H | —H, —H | —H, —H |
| 138 | —H | —H, —H | —H, —H | —H, —H | —H, —H |
| 139 | —Cl | —H, —H | —H, —H | —H, —H | —H, —H |
| 140 | —H | —H, —H | —H, —H | —H, —H | —H, —H |
| 141 | —H | —H, —H | —H, —H | —H, —H | —H, —H |
| 142 | —H | —H, —H | —H, —H | —H, —H | —H, —H |
| 143 | —H | —H, —H | —H, —H | —H, —H | —H, —H |
| 144 | —H | —H, —H | —H, —H | —H, —H | —H, —H |
| 145 | —H | —H, —H | —H, —H | —H, —H | —H, —H |

In the table, the specific examples of respective groups (X1, X2), (Y11, Y12), (Y13, Y14), (Y15, Y16) and (Y17, Y18) are not in order.

| Cpd. No. | M | $R_{11}$ | m |
|---|---|---|---|
| 146 | Cu | 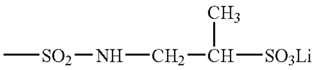 | 3 |
| 147 | Cu | $—SO_2—NH—CH_2—CH_2SO_3Li$ | 3 |
| 148 | Cu | 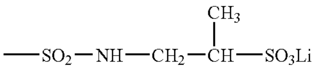 | 3 |
| 149 | Cu | 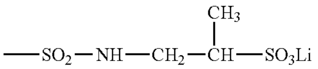 | 2 |
| 150 | Cu | $—SO_2—NH—CH_2—CH_2—SO_2—NH—CH_2CH_2—COONa$ | 3 |
| 151 | Cu | 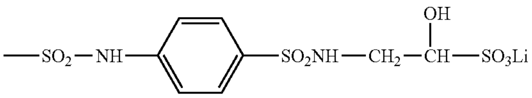 | 3 |
| 152 | Cu | 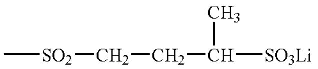 | 2.5 |
| 153 | Cu | 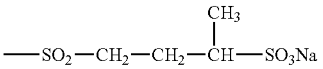 | 2 |
| 154 | Cu | $—SO_2—CH_2—CH_2—CH_2—SO_3Li$ | 3 |
| 155 | Cu | $—SO_2—CH_2—CH_2—CH_2—COOK$ | 2 |
| 156 | Cu | $—SO_2—CH_2—CH_2—CH_2—SO_3Li$ | 3 |
| 157 | Cu | $—SO_2—CH_2—CH_2—O—CH_2—CH_2—SO_3Li$ | 2 |
| 158 | Cu | 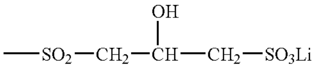 | 3 |
| 159 | Cu | $—SO_2NHCH_2CH_2—SO_3Li$ | 3 |
| 160 | Cu | $—SO_2—CH_2—CH_2—O—CH_2—CH_2—O—CH_2—CH_2—SO_3Na$ | 3 |
| 161 | Cu | $—SO_2CH_2CH_2CH_2SO_3Li$ | 3 |
| 162 | Cu | $—SO_2CH_2CH_2CH_2SO_3Li$ | 2 |
| 163 | Cu | $—SO_2CH_2CH_2CH_2SO_3K$ | 3 |
| 164 | Cu | $—SO_2CH_2CH_2CH_2SO_3Li$ | 2 |
| 165 | Cu | $—CO—NH—CH_2—CH_2—SO_3K$ | 3 |
| 166 | Cu | $—CO—NH—CH_2—CH_2—SO_2—NH—CH_2—CH_2—COONa$ | 3 |
| 167 | Cu | 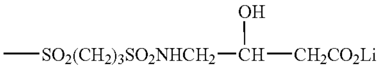 | 2.5 |
| 168 | Cu | 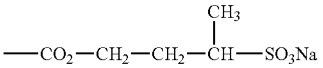 | 2 |
| 169 | Cu | $—CO_2—CH_2—CH_2—CH_2—SO_3Li$ | 3 |
| 170 | Cu | $—CO_2—CH_2—CH_2—CH_2COOK$ | 2 |
| 171 | Cu | $—CO_2—CH_2—CH_2—O—CH_2—CH_2—O—CH_2—CH_2—SO_3Na$ | 3 |
| 172 | Cu | $—SO_2CH_2CH_2OCH_2CH_2O—CH_2CH_2SO_3K$ | 2 |
| 173 | Cu | 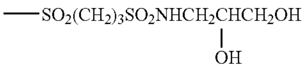 | 2 |
| 174 | Cu | 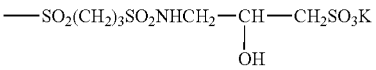 | 3 |
| 175 | Cu | $—SO_2(CH_2)_3SO_2NH(CH_2)_3N(CH_2CH_2OH)_2$ | 2 |
| 176 | Cu | 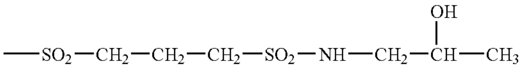 | 3 |

-continued
| | | | |
|---|---|---|---|
| 177 | Cu | $-SO_2-CH_2-CH_2-O-CH_2-CH_2-O-CH_3$ | 2 |
| 178 | Cu | $-SO_2-CH_2-CH_2-O-CH_2-CH_2-O-CH_2-CH_2-OH$ | 3 |
| 179 | Cu | 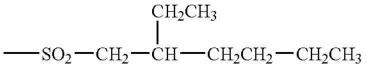 | 2 |
| 180 | Cu | 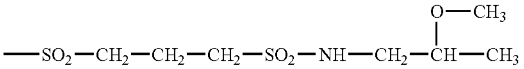 | 3 |
| 181 | Cu | 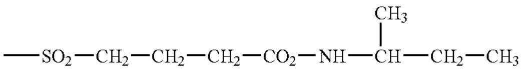 | 3 |
| 182 | Cu | 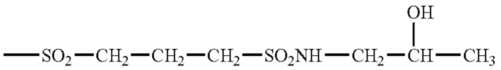 | 2.5 |
| 183 | Cu | 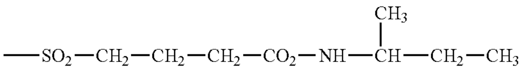 | 2 |
| 184 | Cu | 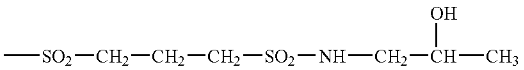 | 3 |
| 185 | Cu | 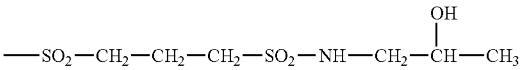 | 3 |
| 186 | Cu | 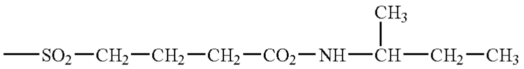 | 3 |
| 187 | Cu | $-SO_2-CH_2-CH_2-CH_2-SO_2NH-CH-(CH_3)_2$ | 3 |
| 188 | Cu | 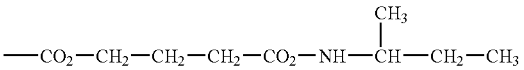 | 3 |
| 189 | Cu | $-CO-NH-CH_2-CH_2-SO_2NH-CH-(CH_3)_2$ | 3 |
| 190 | Cu | 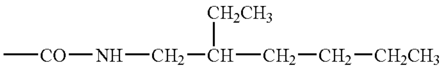 | 3 |
| Cpd. No. | $R_{12}$ | n |
|---|---|---|
| 146 | 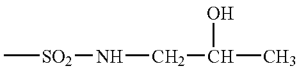 | 1 |
| 147 | 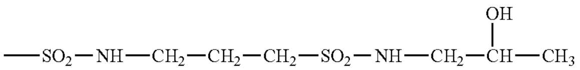 | 1 |
| 148 | $-SO_2NH-CH_2-CH_2-CH_2-SO_2-NH-CH_2-CH_2-O-CH_2-CH_2-OH$ | 1 |
| 149 | $-SO_2-NH-CH_2-CH_2-CH_2-CO-N-(CH_2-CH_2-OH)_2$ | 2 |
| 150 | 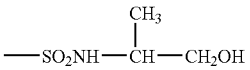 | 1 |
| 151 | $-SO_2NH-CH_2-CH_2-O-CH_2-CH_2-OH$ | 1 |
| 152 | $-SO_2-CH_2-CH_2-O-CH_2-CH_2-OH$ | 1.5 |
| 153 | $-SO_2-CH_2-CH_2-CH_2-CO-N-(CH_2-CH_2-OH)_2$ | 2 |
| 154 | 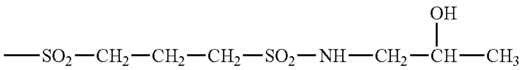 | 1 |
| 155 | 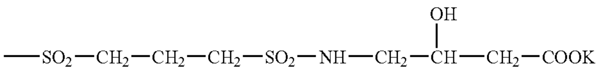 | 2 |

-continued
| | | |
|---|---|---|
| 156 | 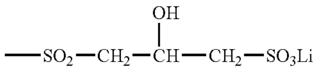 | 1 |
| 157 | 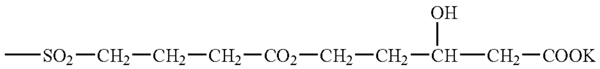 | 2 |
| 158 | 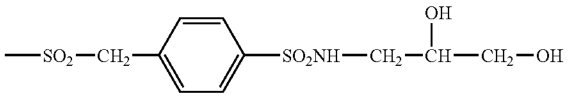 | 1 |
| 159 | 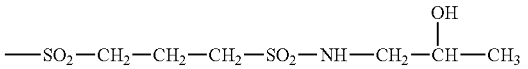 | 1 |
| 160 | 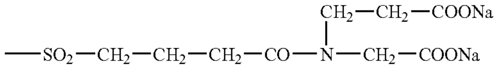 | 1 |
| 161 | 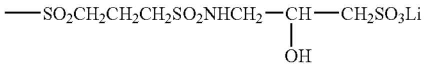 | 1 |
| 162 | $—SO_2CH_2CH_2OCH_2CH_2OCH_2CH_2OH$ | 2 |
| 163 | 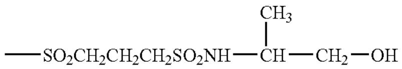 | 1 |
| 164 | $—SO_2CH_2CH_2CH_2SO_2N(CH_2CH_2OH)_2$ | 2 |
| 165 | $—CO—NH—CH_2—CH_2—O—CH_2—CH_2—OH$ | 1 |
| 166 | 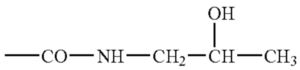 | 1 |
| 167 | $—CO—NH—CH_2—CH_2—CH_2—CO—N—(CH_2—CH_2—OH)_2$ | 1.5 |
| 168 | $—CO—CH_2—CH_2—CH_2—CO—N—(CH_2—CH_2—OH)_2$ | 2 |
| 169 | 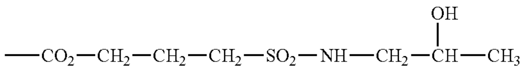 | 1 |
| 170 | 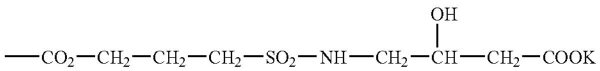 | 2 |
| 171 | 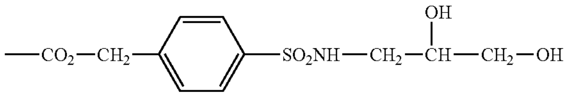 | 1 |
| 172 | 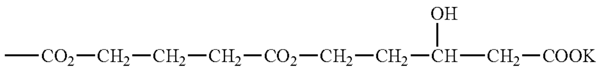 | 2 |
| 173 | 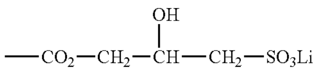 | 2 |
| 174 | 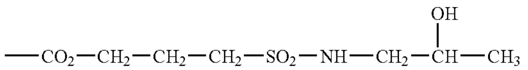 | 1 |
| 175 | 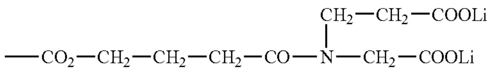 | 2 |
| 176 | 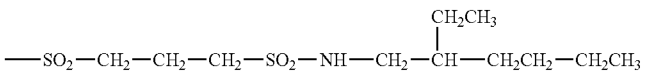 | 1 |

-continued

| | | |
|---|---|---|
| 177 | 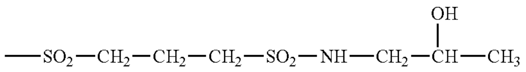 | 1 |
| 178 | 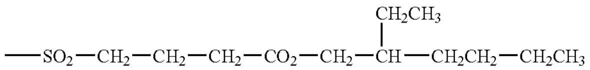 | 1 |
| 179 | 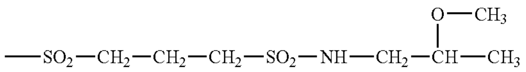 | 2 |
| 180 | $—SO_2NH—CH_2—CH_2—SO_2NH—CH_2—CH_2—O—CH_2—CH_2—OH$ | 1 |
| 181 | $—SO_2—CH_2—CH_2—CH_2—SO_2—NH—CH—(CH_3)_2$ | 1 |
| 182 | 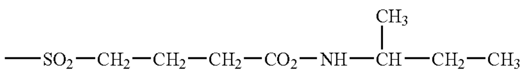 | 1.5 |
| 183 | $—SO_2—CH_2—CH_2—CH_2—SO_2NH—(CH_2)_3—CH_2—O—CH_2CH_2—OH$ | 2 |
| 184 | $—SO_2—CH_2—CH_2—O—CH_2—CH_2—O—CH_3$ | 1 |
| 185 | $—SO_2—CH_2—CH_2—O—CH_2—CH_2—O—CH_2—CH_2—O—CH_3$ | 1 |
| 186 | $—SO_2—CH_2—CH_2—O—CH_2—CH_2—O—CH_2—CH_2—OH$ | 1 |
| 187 | 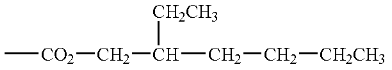 | 1 |
| 188 | $—CO_2—CH_2—CH_2—O—CH_2—CH_2—O—CH_3$ | 1 |
| 189 | 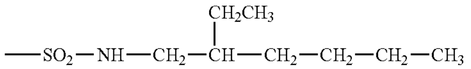 | 1 |
| 190 | $—CO—NH—CH_2—CH_2—O—CH_2—CH_2—O—CH_3$ | 1 |

The structural formula of the phthalocyanine compounds shown by Compound Nos. 146 to 190 is shown below, wherein m and n each represents a substituent.

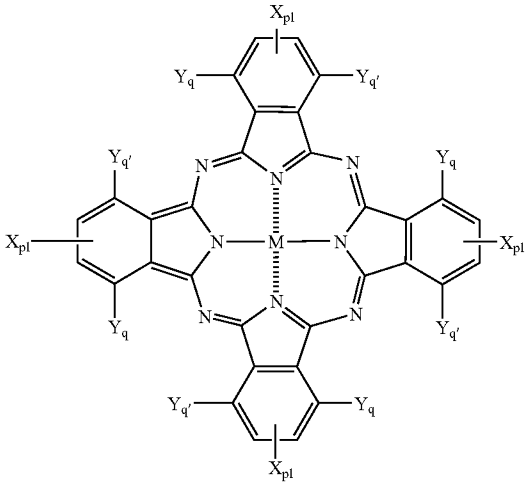

($X_{pl}$ represents independently $R_{11}$ or $R_{12}$)

The phthalocyanine dyes represented by formula (2) can be synthesized according to the above synthesis method. Besides the above synthesis method, the phthalocyanine dyes represented by formula (5) can be synthesized according to the methods disclosed in JP-A-2001-226275, JP-A-2001-96610, JP-A-2001-47013 and JP-A-2001-193638. Moreover, starting matereials, intermediate dyes and synthesis routes are not limited thereto.

An ink set in the invention, particularly preferably an ink set for ink jet recording, contains a dye represented by formula (2) in cyan ink in an amount of preferably from 0.2 to 20 mass %, and more preferably from 0.5 to 15 mass %.

Dye Represented by Formula (3):

A dye represented by formula (3) is preferably a magenta dye.

The magenta dye for use in the invention has a dye structure of a type having a chromophore represented by (heterocyclic ring A) —N=N— (heterocyclic ring B). The structure comprises an azo group having an aromatic nitrogen-containing 6-membered heterocyclic ring as the coupling component directly bonded to at least one side of the group. It is preferred to have a structure containing an aromatic cyclic amino group or a heterocyclic amino group as the auxochrome, and it is also preferred to remove α hydrogen of the azo dye, thereby the oxidation potential of the dye can be heightened. A means for heightening oxidation potential is specifically disclosed in Japanese Patent Application No. 2001-254878.

The forced discoloration velocity constant of the dye to ozone gas is preferably $5.0\times10^{-2}$ ($hour^{-1}$) or less, more preferably $3.0\times10^{-2}$ ($hour^{-1}$) or less, and still more preferably $1.5\times10^{-2}$ ($hour^{-1}$) or less.

A forced discoloration velocity constant to ozone gas is measured as follows. An image is printed on a reflective image-receiving medium with the ink alone, the colored area where the reflection density of the color of the main spectral absorption region of the ink of the obtained image measured through a status A filter becomes from 0.90 to 1.10 is selected as the point of initial density of the ink, and this initial density is taken as starting density (100%). The image is forcedly discolored with an ozone fadeometer capable of emitting 5 mg/liter of ozone constantly, the time required for the density to become 80% of the initial density is searched for, the reciprocal of the time ($hour^{-1}$) is obtained, and this is taken as the velocity constant of discoloration reaction on the assumption the relationship of discoloration density and time follows the velocity expression of first order reaction. Accordingly, the obtained discoloration velocity constant is the discoloration velocity constant of the colored area printed with the ink, and this value is used as a discoloration velocity constant of ink in the specification of the invention.

As printed patches for test, a patch printed with a black square mark according to JIS Code 2223, a stepwise color patch of Macbeth chart, and an arbitrary stepwise density patch capable of obtaining the measured area can be used.

The reflection density of a reflected image (a stepwise color patch) printed for measurement is the density obtained by measuring light through a status A filter with a densitometer satisfying International Organization for Standardization ISO5-4 (geometrical condition of reflection density).

In a test chamber for measuring a forced discoloration velocity constant by ozone gas, an ozonator (e.g., a high pressure discharge system applying alternating voltage to dry air) capable of constantly maintaining the inside ozone gas density at 5 mg/liter is equipped and aeration temperature is adjusted to 25° C.

The forced discoloration velocity constant is the index of the susceptibility to oxidation by oxidizing atmosphere in the environment, such as photochemical smog, automobile exhaust gas, organic vapors from coating of furniture and carpet, and generating gas from a picture frame of a bright room, and these oxidizing atmospheres are represented by ozone gas.

As magenta inks using the dye represented by formula (3), hue is excellent when λmax is from 500 to 580 nm, and it is preferred that the half value width of long wave side and short wave side of maximum absorption wavelength is small, that is, absorption is sharp, and this is specifically disclosed in JP-A-2002-309133. Absorption can be sharpened by the introduction of a methyl group into α-position (e.g., $R_{32}$ in formula (3-A)).

In formula (3), $A_{31}$ represents a 5-membered heterocyclic group.

$B_{31}$, and $B_{32}$ each represents $=CR_{31}-$ or $-CR_{32}=$, or either $B_{31}$ or $B_{32}$ represents a nitrogen atom and the other represents $=CR_{31}-$ or $-CR_{32}=$. $R_{35}$ and $R_{36}$ each represents a hydrogen atom or a substituent, e.g., an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and the hydrogen atom of each substituent may be substituted $G_3$, $R_{31}$ and $R_{32}$ each represents a hydrogen atom or a substituent, e.g., a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfoly group, a heterocyclic sulfonyl group, an alkylsulfinyl group, an arylsulfinyl group, a heterocyclic sulfinyl group, a sulfamoyl group, or a sulfo group, and the hydrogen atom of each substituent may be substituted $R_{31}$ and $R_{35}$, or $R_{35}$ and $R_{36}$ may be bonded to each other to form a 5- or 6-membered ring.

The dye represented by formula (3) is described in further detail below.

In formula (3), $A_{31}$ represents a 5-membered heterocyclic ring, and as the hetero atoms of the heterocyclic ring, N, O and S atoms are exemplified. The heterocyclic ring is preferably a nitrogen-containing 5-membered heterocyclic ring. An aliphatic ring, an aromatic ring or other heterocyclic rings may be condensed to the heterocyclic ring. The examples of preferred heterocyclic rings represented by $A_{31}$ include a pyrazole ring, an imidazole ring, a thiazole ring, an isothiazole ring, a thiadiazole ring, a benzothiazole ring, a benzoxazole ring and benzisothiazole ring. Each heterocyclic ring may further have a substituent. A pyrazole ring, an imidazole ring, an isothiazole ring, a thiadiazole ring and a benzothiazole ring represented by the following formulae (a) to (f) are particularly preferred.

In the following formulae (a) to (f), $R_{307}$ to $R_{320}$ represent the same substituents as $G_3$, $R_{31}$ and $R_{32}$ in formula (3).

Of formulae (a) to (f), a pyrazole ring and an isothiazole ring represented by formula (a) or (b) are preferred, and a pyrazole ring represented by formula (a) is most preferred.

Formula (a)

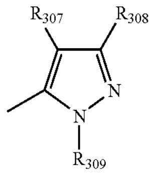

(b)

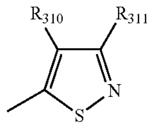

(c)

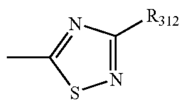

(d)

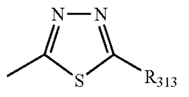

(e)

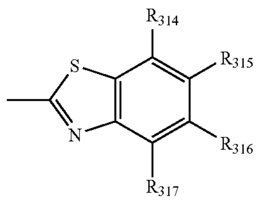

-continued

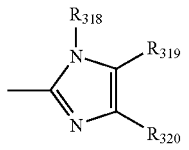
(f)

In formula (3), $B_{31}$ and $B_{32}$ each represents $=CR_{31}-$ or $-CR_{32}=$, or either $B_{31}$ or $B_{32}$ represents a nitrogen atom and the other represents $=CR_{31}-$ or $-CR_{32}=$, preferably each represents $=CR_{31}-$ or $-CR_{32}=$.

$R_{35}$ and $R_{36}$ each represents a hydrogen atom or a substituent, e.g., an aliphatic group, an aromatic group, a heterocyclic group, an acyl group, an alkoxycarbonyl group, an aryloxycarbonyl group, a carbamoyl group; an alkylsulfonyl group, an arylsulfonyl group, or a sulfamoyl group, and the hydrogen atom of each substituent may be substituted.

$R_{35}$ and $R_{36}$ each preferably represents a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group. The hydrogen atom of each substituent may be substituted. However, $R_{35}$ and $R_{36}$ do not represent a hydrogen atom at the same time.

$G_3$, $R_{31}$ and $R_{32}$ each represents a hydrogen atom or a substituent, e.g., a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and the hydrogen atom of each substituent may be substituted.

$G_3$ preferably represents a hydrogen atom, a halogen atom, an aliphatic group, an aromatic group, a hydroxyl group, an alkoxyl group, an aryloxy group, an acyloxy group, a heterocyclic oxy group, an amino group, an acylamino group, a ureido group, a sulfamoylamino group, an alkoxycarbonylamino group, an aryloxycarbonylamino group, an alkylthio group, an arylthio group, or a heterocyclic thio group, more preferably a hydrogen atom, a halogen atom, an alkyl group, a hydroxyl group, an alkoxyl group, an aryloxy group, an acyloxy group, an amino group, or an acylamino group, and most preferably a hydrogen atom, an amino group (preferably an anilino group), or an acylamino group. The hydrogen atom of each substituent may be substituted.

$R_{31}$ and $R_{32}$ each preferably represents a hydrogen atom, an alkyl group, a halogen atom, an alkoxycarbonyl group, a carboxyl group, a carbamoyl group, a hydroxyl group, an alkoxyl group, or a cyano group. The hydrogen atom of each substituent may be substituted.

$R_{31}$ and $R_{35}$, or $R_{35}$ and $R_{36}$ may be bonded to each other to form a 5- or 6-membered ring.

When $A_{31}$ has a substituent, or the substituents of $R_{31}$, $R_{32}$, $R_{35}$, $R_{36}$ or $G_3$ further have substituents, the substituents described above in $G_3$, $R_{31}$ and $R_{32}$ are exemplified.

When the dye represented by formula (3) is a water-soluble dye, it is preferred that an ionic hydrophilic group is substituted anywhere on $A_{31}$, $R_{31}$, $R_{32}$, $R_{35}$, $R_{36}$ and $G_3$ as the substituent. The examples of the ionic hydrophilic groups include a sulfo group, a carboxyl group, a phosphono group and a quaternary ammonium group. As the ionic hydrophilic groups, a carboxyl group, a phosphono group and a sulfo group are preferred, and a carboxyl group and a sulfo group are particularly preferred. The carboxyl group, phosphono group and sulfo group may be in the state of a salt, and the examples of counter ions for forming a salt include an ammonium ion, an alkali metal ion (e.g., alithiumion, a sodium ion, a potassium ion) and an organic cation (e.g., a tetramethylammonium ion, a tetramethylguanidinium ion, a tetramethylphosphphonium ion.

The terminologies (substituents) used in the specification of the invention are described. Terminologies are common in formula (3) and formula (3-A) described later even when marks are different.

Halogen atoms include a fluorine atom, a chlorine atom and a bromine atom.

An aliphatic group means an alkyl group, a substituted alkyl group, an alkenyl group, a substituted alkenyl group, an alkynyl group, a substituted alkynyl group, an aralkyl group and a substituted aralkyl group. The term "substituted" used in "substituted alkyl group" and the like means that a hydrogen atom present in "alkyl group" and the like is substituted with a substituent described in $G_3$, $R_{31}$ and $R_{32}$.

An aliphatic group may be branched or may form a ring. The carbon atom of an aliphatic group is preferably from 1 to 20, and more preferably from 1 to 16. The aryl moiety of an aralkyl group and a substituted aralkyl group is preferably a phenyl group or a naphthyl group, and a phenyl group is particularly preferred. As the examples of aliphatic groups, a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group can be exemplified.

An aromatic group means an aryl group and a substituted aryl group. An aryl group is preferably a phenyl group or a naphthyl group, and a phenyl group is especially preferred. The carbon atom of an aromatic group is preferably from 6 to 20, and more preferably from 6 to 16.

As the examples of aromatic groups, a phenyl group, a p-tolyl group, a p-methoxyphenyl group, an o-chlorophenyl group and an m-(3-sulfopropylamino)phenyl group are included.

A substituted heterocyclic group is included in heterocyclic groups. A heterocyclic ring of a heterocyclic group may be condensed with an aliphatic ring, an aromatic ring or other heterocyclic ring. The heterocyclic group is preferably a 5- or6-membered heterocyclic group. The examples of the substituents include an aliphatic group, a halogen atom, an alkylsulfonyl group, an arylsulfonyl group, an acyl group, an acylamino group, a sulfamoyl group, a carbamoyl group and an ionic hydrophilic group. The examples of the heterocyclic groups include a 2-pyridyl group, a 2-thienyl group, a 2-thiazolyl group, a 2-benzothiazolyl group, a 2-benzoxazolyl group and a 2-furyl group.

A carbamoyl group includes a substituted carbamoyl group. The examples of the substituents include an alkyl group. The examples of the carbamoyl groups include a methylcarbamoyl group and a dimethylcarbamoyl group.

An alkoxycarbonyl group includes a substituted alkoxycarbonyl group. As the alkoxycarbonyl group, an alkoxycarbonyl group having from 2 to 20 carbon atoms is preferred. The examples of the substituents include an ionic hydrophilic group. The examples of alkoxycarbonyl groups include a methoxycarbonyl group and an ethoxycarbonyl group.

An aryloxycarbonyl group includes a substituted aryloxycarbonyl group. As the aryloxycarbonyl group, an aryloxycarbonyl group having from 7 to 20 carbon atoms is preferred. The examples of the substituents include an ionic hydrophilic group. The examples of the aryloxycarbonyl groups include a phenoxycarbonyl group.

A heterocyclic oxycarbonyl group includes a substituted heterocyclic oxycarbonyl group. As the hetero rings, the heterocyclic rings described in the above heterocyclic groups are exemplified. As the heterocyclic oxycarbonyl group, a heterocyclic oxycarbonyl group having from 2 to 20 carbon atoms is preferred. The examples of the substituents include an ionic hydrophilic group. The examples of the heterocyclic oxycarbonyl groups include a 2-pyridyloxycarbonyl group.

An acyl group includes a substituted acyl group. As the acyl group, an acyl group having from 1 to 20 carbon atoms is preferred. The examples of the substituents include an ionic hydrophilic group. The examples of the acyl groups include an acetyl group and a benzoyl group.

An alkoxyl group includes a substituted alkoxyl group. As the alkoxyl group, an alkoxyl group having from 1 to 20 carbon atoms is preferred. The examples of the substituents include an alkoxyl group, a hydroxyl group, and an ionic hydrophilic group. The examples of the alkoxyl groups include a methoxy group, an ethoxy group, an isopropoxy group, a methoxyethoxy group, a hydroxyethoxy group and a 3-carboxypropoxy group.

An aryloxy group includes a substituted aryloxy group. As the aryloxy group, an aryloxy group having from 6 to 20 carbon atoms is preferred. The examples of the substituents include an alkoxyl group and an ionic hydrophilic group. The examples of the aryloxy groups include a phenoxy group, a p-methoxyphenoxy group and an o-methoxyphenoxy group.

A heterocyclic oxy group includes a substituted heterocyclic oxy group. As the hetero rings, the heterocyclic rings described in the above heterocyclic groups are exemplified. As the heterocyclic oxy group, a heterocyclic oxy group having from 2 to 20 carbon atoms is preferred. The examples of the substituents include an alkyl group, an alkoxyl group and an ionic hydrophilic group. The examples of the heterocyclic oxy groups include a 3-pyridyloxy group and a 3-thienyloxy group.

As silyloxy groups, silyloxy groups having from 1 to 20 carbon atoms substituted with an aliphatic group or an aromatic group are preferred. The examples of the silyloxy groups include trimethylsilyloxy and diphenylmethylsilyloxy.

An acyloxy group includes a substituted acyloxy group. As the acyloxy group, an acyloxy having from 1 to 20 carbon atoms is preferred. The examples of the substituents include an ionic hydrophilic group. The examples of the acyloxy groups include an acetoxy group and a benzoyloxy group.

A carbamoyloxy group includes a substituted carbamoyloxy group. The examples of the substituents include an alkyl group. The examples of the carbamoyloxy groups include an N-methyl-carbamoyloxy group.

An alkoxycarbonyloxy group includes a substituted alkoxycarbonyloxy group. As the alkoxycarbonyloxy group, an alkoxycarbonyloxy group having from 2 to 20 carbon atoms is preferred. The examples of the alkoxycarbonyloxy groups include a methoxycarbonyloxy group and an isopropoxycarbonyloxy group.

An aryloxycarbonyloxy group includes a substituted aryloxycarbonyloxy group. As the aryloxycarbonyloxy group, an aryloxycarbonyloxy group having from 7 to 20 carbon atoms is preferred. The examples of the aryloxycarbonyloxy groups include a phenoxycarbonyloxy group.

An amino group includes a substituted amino group. The examples of the substituents include an alkyl group, an aryl group and a heterocyclic group, and the alkyl group, the aryl group and the heterocyclic group may further have a substituent. An alkylamino group includes a substituted alkylamino group. As the alkylamino group, an alkylamino group having from 1 to 20 carbon atoms is preferred. The examples of the substituents include an ionic hydrophilic group. The examples of the alkylamino groups include a methylamino group and a diethylamino group.

An arylamino group includes a substituted arylamino group. As the arylamino group, an arylamino group having from 6 to 20 carbon atoms is preferred. The examples of the substituents include a halogen atom and an ionic hydrophilic group. The examples of the arylamino groups include a phenylamino group and a 2-chlorophenylamino group.

A heterocyclic amino group includes a substituted heterocyclic amino group. As the hetero rings, the heterocyclic rings described in the above heterocyclic groups are exemplified. As the heterocyclic amino group, a heterocyclic amino group having from 2 to 20 carbon atoms is preferred. The examples of the substituents include an alkyl group, a halogen atom and an ionic hydrophilic group.

An acylamino group includes a substituted acylamino group. As the acylamino group, an acylamino group having from 2 to 20 carbon atoms is preferred. The examples of the substituents include an ionic hydrophilic group. The examples of the acylamino groups include an acetylamino group, a propionylamino group, a benzoylamino group, an N-phenylacetylamino group and a 3,5-d isulfobenzoylamino group.

A ureido group includes a substituted ureido group. As the ureido group, a ureido group having from 1 to 20 carbon atoms is preferred. The examples of the substituents include an alkyl group and an aryl group. The examples of the ureido group include a 3-methylureido group, a 3,3-dimethylureido group and a 3-phenylureido group.

A sulfamoylamino group includes a substituted sulfamoylamino group. The examples of the substituents include an alkyl group. The examples of the sulfamoylamino groups include an N,N-dipropylsulfamoylamino group.

An alkoxycarbonylamino group includes a substituted alkoxycarbonylamino group. As the alkoxycarbonylamino group, an alkoxycarbonylamino group having from 2 to 20 carbon atoms is preferred. The examples of the substituents include an ionic hydrophilic group. The examples of the alkoxycarbonylamino groups include an ethoxycarbonylamino group.

An aryloxycarbonylamino group includes a substituted aryloxycarbonylamino group. As the aryloxycarbonylamino group, an aryloxycarbonylamino group having from 7 to 20 carbon atoms is preferred. The examples of the substituents include an ionic hydrophilic group. The examples of the aryloxycarbonylamino groups include a phenoxycarbonylamino group.

An alkylsulfonylamino group and an arylsulfonylamino group include a substituted alkylsulfonylamino group and a substituted arylsulfonylamino group. As the alkylsulfonylamino group and the arylsulfonylamino group, an alkylsulfonylamino group having from 1 to 20 carbon atoms and an arylsulfonylamino group are preferred. The examples of the substituents include an ionic hydrophilic group. The examples of the alkylsulfonylamino group and the arylsulfonylamino group include a methylsulfonylamino group, an N-phenylmethylsulfonylamino group, a phenylsulfonylamino group and a 3-carboxyphenylsulfonylamino group.

A heterocyclic sulfonylamino group includes a substituted heterocyclic sulfonylamino group. As the hetero rings, the heterocyclic rings described in the above heterocyclic groups are exemplified. As the heterocyclic sulfonylamino group, a heterocyclic sulfonylamino group having from 1 to 12 carbon atoms is preferred. The examples of the substituents include an ionic hydrophilic group. The examples of the heterocyclic sulfonylamino groups include a 2-thienylsulfonylamino group and a 3-pyridylsulfonylamino group.

An alkylthio group, an arylthio group and a heterocyclic thio group include a substituted alkylthio group, a substituted arylthio group and a substituted heterocyclic thio group. As the hetero rings, the heterocyclic rings described in the above heterocyclic groups are exemplified. As the alkylthio group, the arylthio group and the heterocyclic thio group, those having from 1 to 20 carbon atoms are preferred. The examples of the substituents include an ionic hydrophilic group. The examples of the alkylthio group, arylthio group and heterocyclic thio group includes a methylthio group, a phenylthio group and a 2-pyridylthio group.

An alkylsulfonyl group and an arylsulfonyl group include a substituted alkylsulfonyl group and a substituted arylsulfonyl group. The examples of the alkylsulfonyl group and the arylsulfonyl group include a methylsulfonyl group and a phenylsulfonyl group respectively.

A heterocyclic sulfonyl group includes a substituted heterocyclic sulfonyl group. As the hetero rings, the heterocyclic rings described in the above heterocyclic groups are exemplified. As the heterocyclic sulfonyl group, a heterocyclic sulfonyl group having from 1 to 20 carbon atoms is preferred. The examples of the substituents include an ionic hydrophilic group. The examples of the heterocyclic sulfonyl groups include a 2-thienylsulfonyl group and a 3-pyridylsulfonyl group.

An alkylsulfinyl group and an arylsulfinyl group include a substituted alkylsulfinyl group and a substituted arylsulfinyl group. The examples of the alkylsulfinyl group and arylsulfinyl group include a methylsulfinyl group and a phenylsulfinyl group respectively.

A heterocyclic sulfinyl group includes a substituted heterocyclic sulfinyl group. As the hetero rings, the heterocyclic rings described in the above heterocyclic groups are exemplified. As the heterocyclic sulfinyl group, a heterocyclic sulfinyl group having from 1 to 20 carbon atoms is preferred. The examples of the substituents include an ionic hydrophilic group. The examples of the heterocyclic sulfinyl groups include a 4-pyridylsulfinyl group.

A sulfamoyl group includes a substituted sulfamoyl group. The examples of the substituents include an alkyl group. The examples of the sulfamoyl groups include a dimethylsulfamoyl group and a di(2-hydroxyethyl)sulfamoyl group.

Formula (3) is particularly preferably represented by the following formula (3-A).

(3-A)

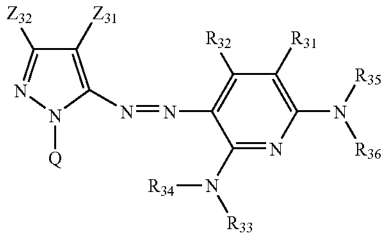

In formula (3-A), $R_{31}$, $R_{32}$, $R_{35}$ and $R_{36}$ have the same meaning as in formula (3).

$R_{33}$ and $R_{34}$ each represents a hydrogen atom or a substituent, e.g., an aliphatic group, an aromatic group, a heterocyclic group, an acyl group, an alkoxycarbonyl group, an aryloxycarbonyl group, a carbamoyloxy group, an alkylsulfonyl group, an arylsulfonyl group, or a sulfamoyl group, of these groups, a hydrogen atom, an aromatic group, a heterocyclic group, an acyl group, an alkylsulfonyl group, and an arylsulfonyl group are preferred, and a hydrogen atom, an aromatic group and a heterocyclic group are particularly preferred.

$Z_{31}$ represents an electron attractive group having a σp value of Hammett's substitution constant of 0.20 or more, preferably an electron attractive group having a σp value of 0.30 or more, more preferably an electron attractive group having a σp value of 0.45 or more, and particularly preferably an electron attractive group having a σp value of 0.60 or more, but it is preferred not to exceed 1.0. As the specific examples of the preferred substituents, the later described electron attractive groups can be exemplified, and above all, an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, and alkyl halide group having from 1 to 20 carbon atoms are preferred. A cyano group, an alkylsulfonyl group having from 1 to 20 carbon atoms, and an arylsulfonyl group having from 6 to 20 carbon atoms are particularly preferred, and a cyano group is most preferred.

$Z_{32}$ represents a hydrogen atom or a substituent, e.g., an aliphatic group, an aromatic group or a heterocyclic group, preferably an aliphatic group, and more preferably an alkyl group having from 1 to 6 carbon atoms.

Q represents a hydrogen atom or a substituent, e.g., an aliphatic group, an aromatic group or a heterocyclic group. Groups comprising nonmetal atoms necessary to form a 5- to 8-membered ring are preferred. The 5- to 8-membered ring may be substituted, may be a saturated ring, or may have an unsaturated bond. An aromatic group and a heterocyclic group are preferred. The preferred nonmetal atoms are a nitrogen atom, an oxygen atom, a sulfur atom and a carbon atom. As the specific examples of such ring structures, e.g. a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxan ring, a sulfolane ring and a thian ring are exemplified.

The hydrogen atom of each substituent described in formula (3-A) maybe substituted. As the examples of the substituents, the groups described in $G_3$, $R_{31}$ and $R_{32}$ and ionic hydrophilic groups are exemplified.

A σp value of Hammett's substitution constant is described below. Hammett's rule is a rule of thumb advocated by L. P. Hammett in 1935 for quantitatively discussing the influence of a substituent upon the reaction or equilibrium of a benzene derivative, and the pertinence of the rule is widely appreciated today. There are a σp value and a σm value in substitution constant according to Hammett's rule, and these values can be found in various general literatures, e.g., described in detail in J. A. Dean compiled, *Lange's Handbook of Chemistry,* 12$^{th}$ Edition, McGraw-Hill (1979), and *Kagaku no Ryoiki* (*The Domain of Chemistry*), an extra number, No. 122, pp. 96 to 103, Nankodo Co. (1979). In the present invention, each substituent is restricted or defined by a σp value of Hammett's substitution constant, but this does not mean that an already known value found in the above literature is limited to only a certain substituent, and even if the value is unknown, a substituent having a value which will be included in the range when measured on the basis of Hammett's rule is of course included. In the compounds represented by formula (3-A), compounds not benzene derivatives are included, but a σp value is used as the index showing the electron effect of the substituent irrespective of the substitution position. In the present invention, a σp value is used in such a meaning.

As electron attractive groups having a σp value of Hammett's substitution constant of 0.60 or more, a cyano group, a nitro group, an alkylsulfonyl group (e.g., methylsulfonyl), and an arylsulfonyl group (e.g., phenylsulfonyl) can be exemplified.

As electron attractive groups having a Hammett's σp value of 0.45 or more, in addition to the above groups, an acyl group (e.g., acetyl), an alkoxycarbonyl group (e.g., dodecyloxy-carbonyl), an aryloxycarbonyl group (e.g., m-chlorophenoxy-carbonyl), an alkylsulfinyl group (e.g., n-propylsulfinyl), an arylsulfinylgroup (e.g., phenylsulfinyl), a sulfamoyl group (e.g., N-ethylsulfamoyl, N,N-dimethylsulfamoyl), and an alkyl halide (e.g., trifluoromethyl) can be exemplified.

As electron attractive groups having a σp value of Hammett's substitution constant of 0.30 or more, in addition to the above groups, an acyloxy group (e.g., acetoxy), a carbamoyl group (e.g., N-ethylcarbamoyl, N,N-dibutyl-carbamoyl), an alkoxy halide (e.g., trifluoromethyloxy), an aryloxy halide (.e.g., pentafluorophenyloxy), a sulfonyloxy group (e.g., methylsulfonyloxy), an alkylthio halide (e.g., difluoromethylthio), an aryl group substituted with two or more electron attractive groups having a σp value of 0.15 or more (e.g., 2,4-dinitrophenyl, pentachlorophenyl), and a heterocyclic group (e.g., 2-benzoxazolyl, 2-benzothiazolyl, 1-phenyl-2-benzimidazolyl) can be exemplified.

As electron attractive groups having a σp value of 0.20 or more, in addition to the above groups, a halogen atom is exemplified.

As the especially preferred combinations of substituents of azo dyes represented by formula (3), $R_{35}$ and $R_{36}$ each preferably represents a hydrogen atom, an alkyl group, an aryl group, a heterocyclic group, a sulfonyl group or an acyl group, more preferably a hydrogen atom, an aryl group, a heterocyclic group, or a sulfonyl group, and most preferably a hydrogen atom, an aryl group, or a heterocyclic group. However, $R_{35}$ and $R_{36}$ do not represent a hydrogen atom at the same time.

$G_3$ preferably represents a hydrogen atom, a halogen atom, an alkyl group, a hydroxyl group, an amino group, or an acylamino group, more preferably a hydrogen atom, a halogen atom, an amino group, or an acylamino group, and most preferably a hydrogen atom, an amino group or an acylamino group.

The preferred examples of $A_{31}$ include a pyrazole ring, an imidazole ring, an isothiazole ring, a thiadiazole ring, and a benzothiazole ring, more preferred examples include a pyrazole ring and an isothiazole ring, and a pyrazole ring is most preferred.

$B_{31}$ and $B_{32}$ each represents $=CR_{31}-$ or $-CR_{32}=$. $R_{31}$ and $R_{32}$ each preferably represents a hydrogen atom, an alkyl group, a halogen atom, a cyano group, a carbamoyl group, a carboxyl group, a hydroxyl group, an alkoxyl group or an alkoxycarbonyl group, more preferably a hydrogen atom, an alkyl group, a carboxyl group, a cyano group or a carbamoyl group.

With respect to preferred combinations of the substituents of the compounds represented by formula (3), compounds in which at least one substituent of various substituents is the above preferred group are preferred, compounds in which more substituents are the above preferred groups are more preferred, and compounds in which all the substituents are the above preferred groups are most preferred.

The specific examples of the azo dyes represented by formula (3) are shown in the following Tables 1 to 13 and formulae f-1 and f-2, but the azo dyes used in the invention are not limited thereto.

TABLE 1

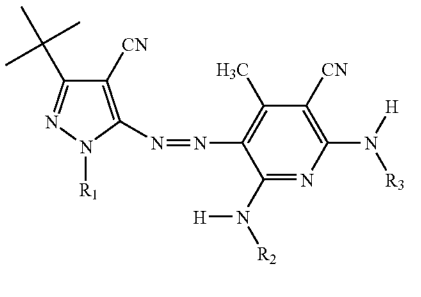

| Dye | $R_1$ | $R_2$ | $R_3$ |
|---|---|---|---|
| a-1 | 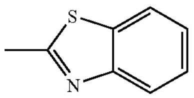 | 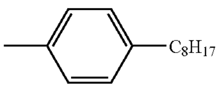 | 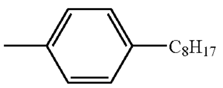 |

TABLE 1-continued
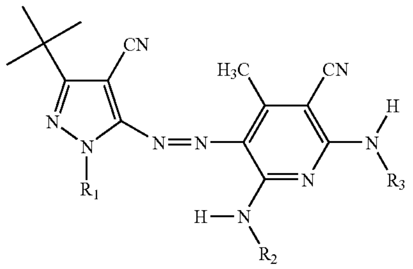
| Dye | $R_1$ | $R_2$ | $R_3$ |
|---|---|---|---|
| a-2 | 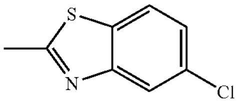 | 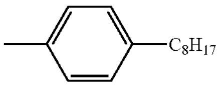 | 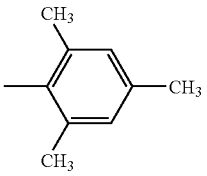 |
| a-3 | 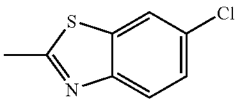 | 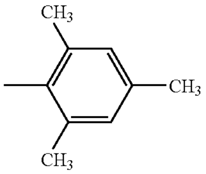 | 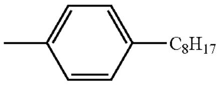 |
| a-4 | 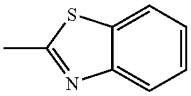 | 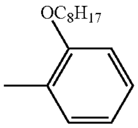 | 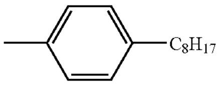 |
| a-5 | 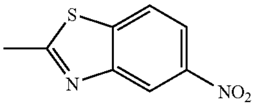 | 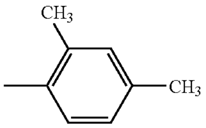 | 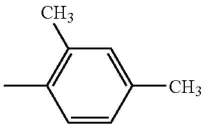 |
TABLE 2
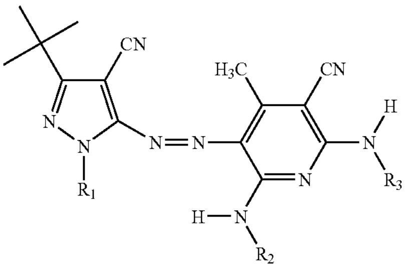
| Dye | $R_1$ | $R_2$ | $R_3$ |
|---|---|---|---|
| a-6 | 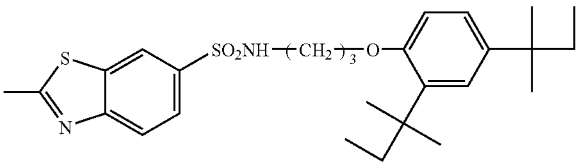 | 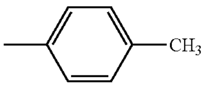 | 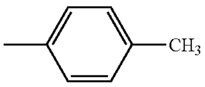 |

TABLE 2-continued
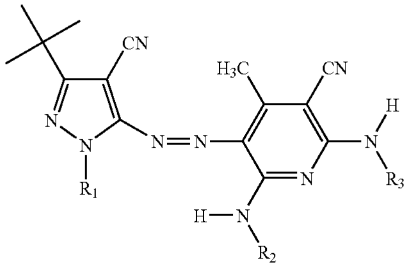
| Dye | R1 | R2 | R3 |
|---|---|---|---|
| a-7 | 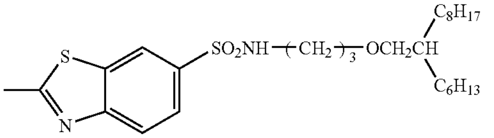 | 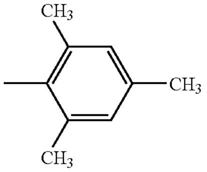 | 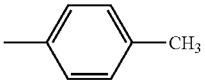 |
| a-8 | 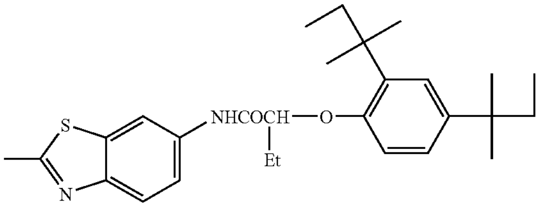 | 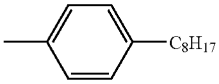 | 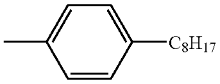 |
| a-9 | 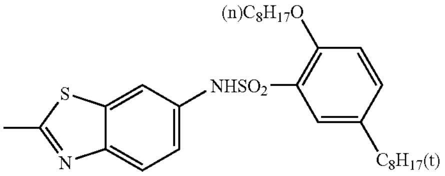 | 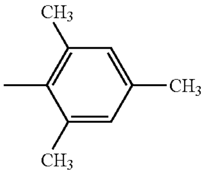 | $C_8H_{17}(t)$ |
| a-10 | 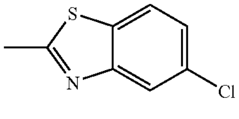 | 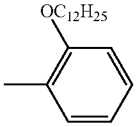 | 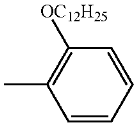 |
TABLE 3
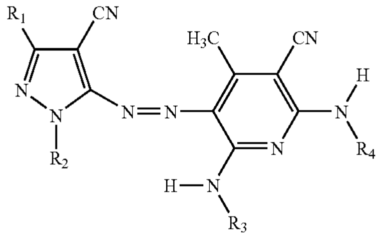
| Dye | R1 | R2 | R3 | R4 |
|---|---|---|---|---|
| a-11 | 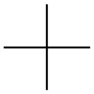 | 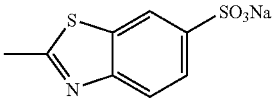 | 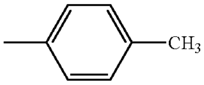 | 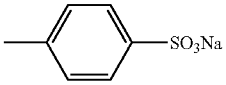 |

TABLE 3-continued
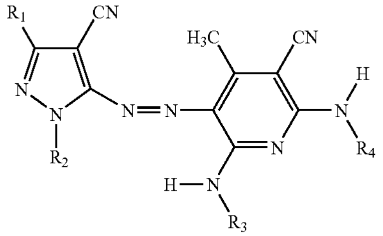
| Dye | $R_1$ | $R_2$ | $R_3$ | $R_4$ |
|---|---|---|---|---|
| a-12 | 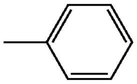 | 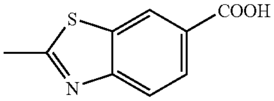 | 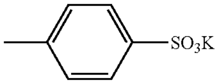 | 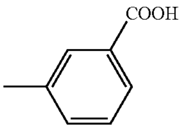 |
| a-13 | 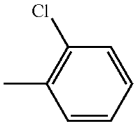 | 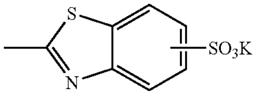 (4,5-mix) | 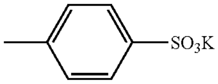 | 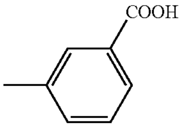 |
| a-14 | 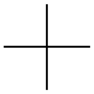 | 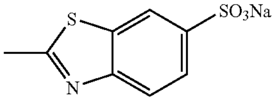 | 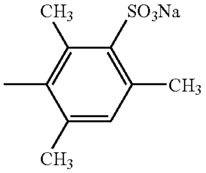 | 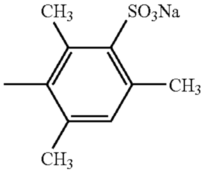 |
| a-15 | 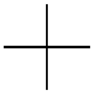 | 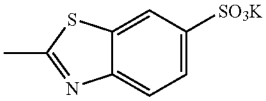 | 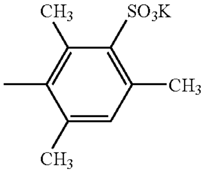 | 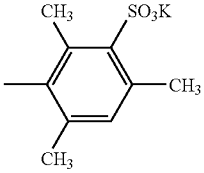 |
| a-16 | 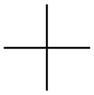 | 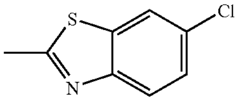 | 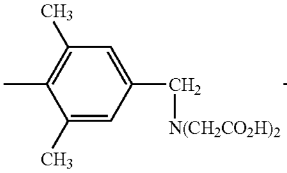 | 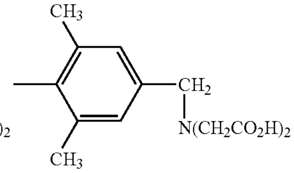 |
| a-17 | 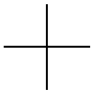 | 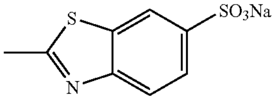 | 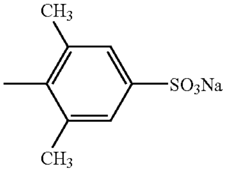 | 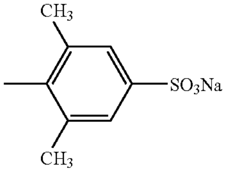 |

TABLE 4
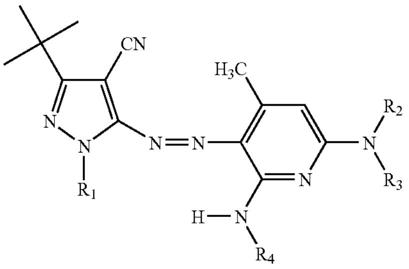
| Dye | R1 | R2 | R3 | R4 |
|---|---|---|---|---|
| a-18 | 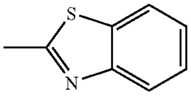 | 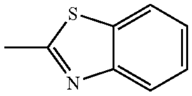 | 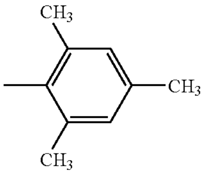 | 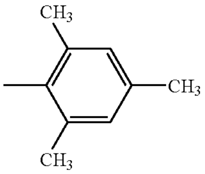 |
| a-19 | 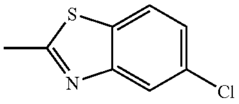 | —$SO_2CH_3$ | 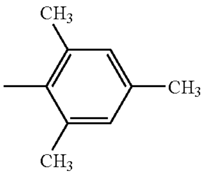 | 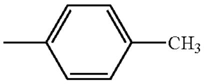 |
| a-20 | 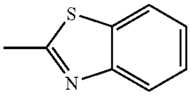 | —$COCH_3$ | $C_8H_{17}$(t) | $C_8H_{17}$(t) |
| a-21 | 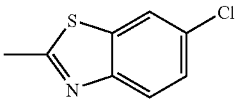 | —$SO_2CH_3$ | 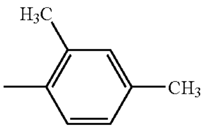 | $C_8H_{17}$(t) |
| a-22 | 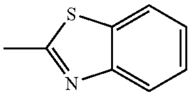 | H | 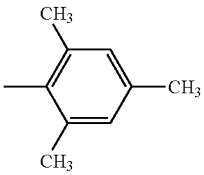 | 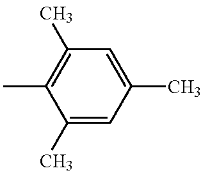 |
| a-23 | 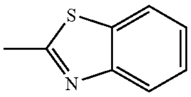 | H | 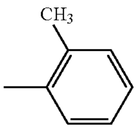 | 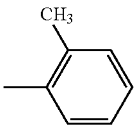 |
| a-24 | 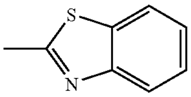 | H | 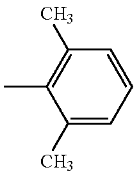 | 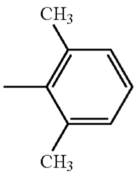 |

TABLE 4-continued
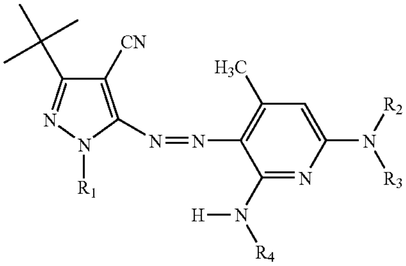
| Dye | $R_1$ | $R_2$ | $R_3$ | $R_4$ |
|---|---|---|---|---|
| a-25 | 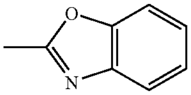 | 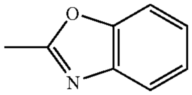 | 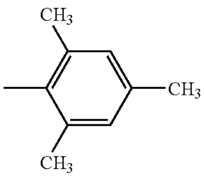 | 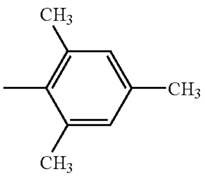 |
TABLE 5
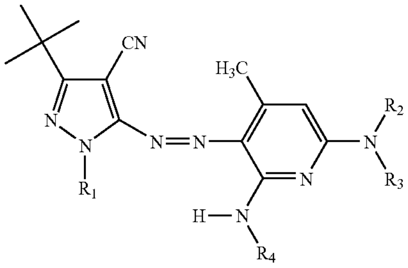
| Dye | $R_1$ |
|---|---|
| a-26 | 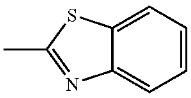 |
| a-27 | 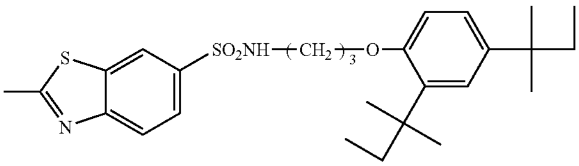 |
| a-28 | 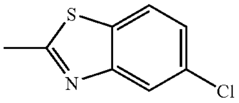 |
| a-29 | 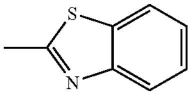 |
| a-30 | 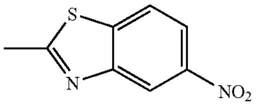 |

TABLE 5-continued
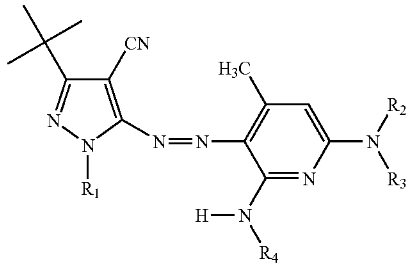
| | |
|---|---|
| a-31 | 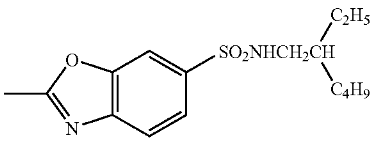 |
| Dye | $R_2$ |
|---|---|
| a-26 | 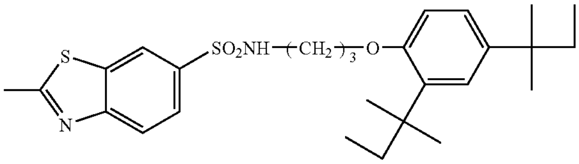 |
| a-27 | 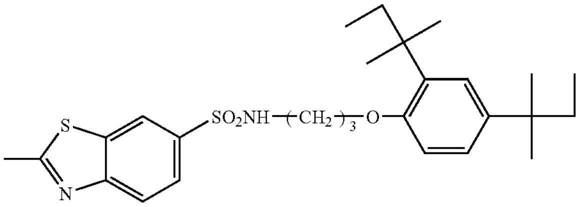 |
| a-28 | 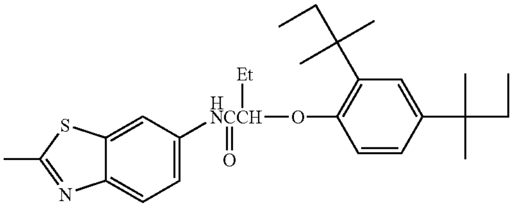 |
| a-29 | 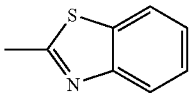 |
| a-30 | 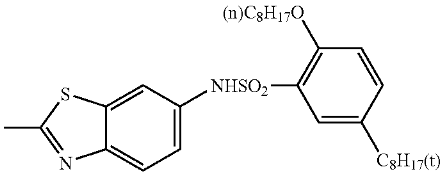 |
| a-31 | 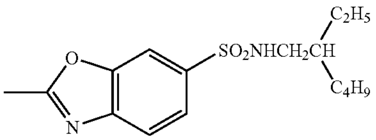 |

TABLE 5-continued
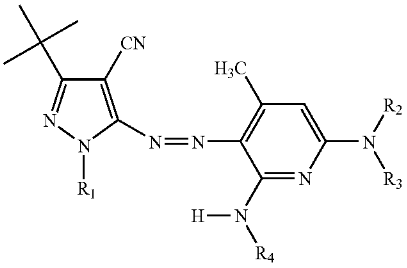
| Dye | $R_3$ | $R_4$ |
| --- | --- | --- |
| a-26 | 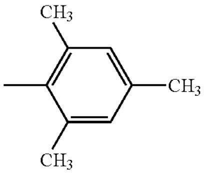 | 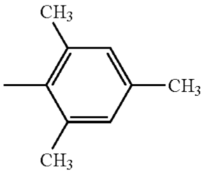 |
| a-27 | 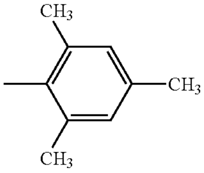 | 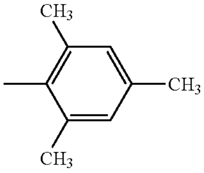 |
| a-28 | 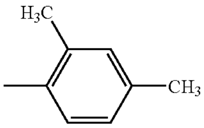 | 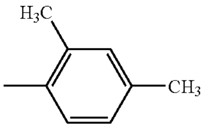 |
| a-29 | 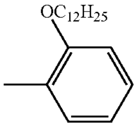 | 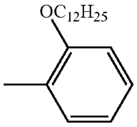 |
| a-30 | 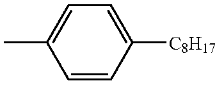 | $C_8H_{17}(t)$ |
| a-31 | 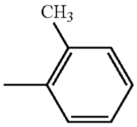 | 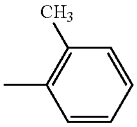 |

TABLE 6
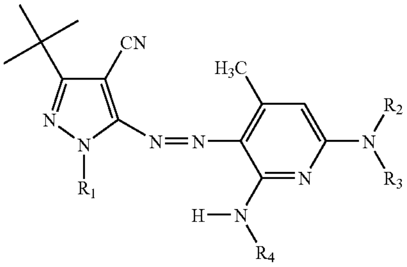
| Dye | $R_1$ | $R_2$ |
|---|---|---|
| a-32 | 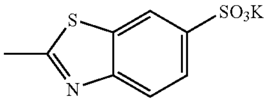 | 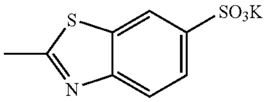 |
| a-33 | 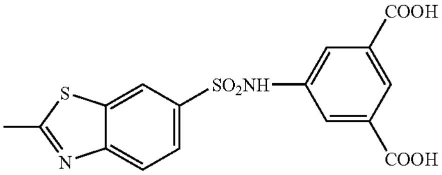 | 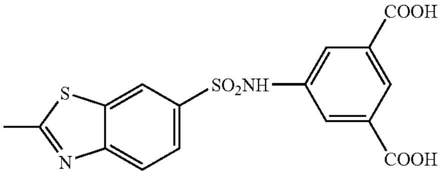 |
| a-34 | 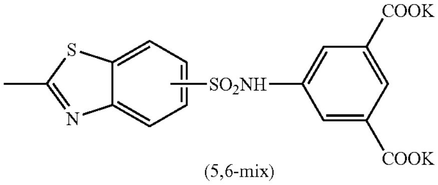 (5,6-mix) | 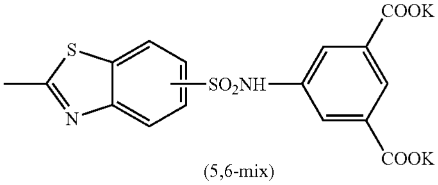 (5,6-mix) |
| a-35 | 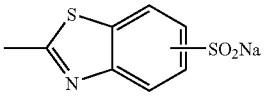 (5,6-mix) | 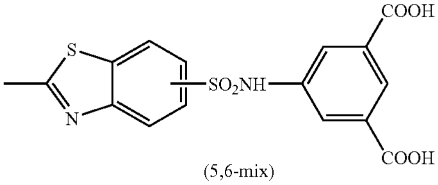 (5,6-mix) |
| Dye | $R_3$ | $R_4$ |
|---|---|---|
| a-32 | 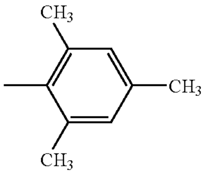 | 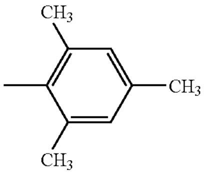 |
| a-33 | 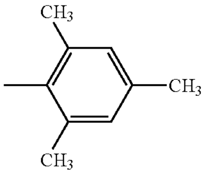 | 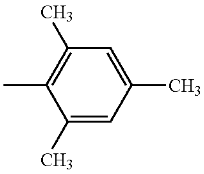 |
| a-34 | 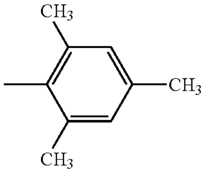 | 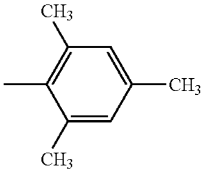 |

TABLE 6-continued
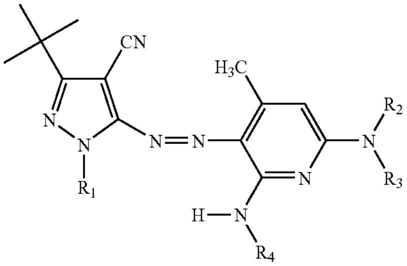
| | | |
|---|---|---|
| a-35 | 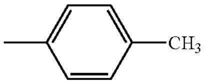 | 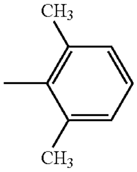 |
TABLE 7
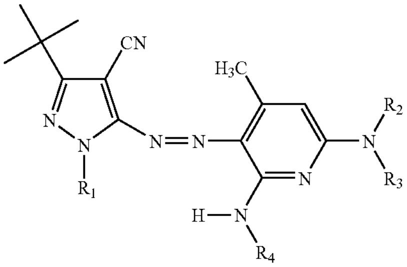
| Dye | $R_1$ | $R_2$ |
|---|---|---|
| a-36 | 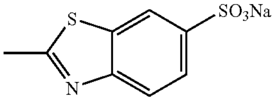 | 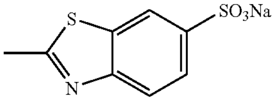 |
| a-37 | 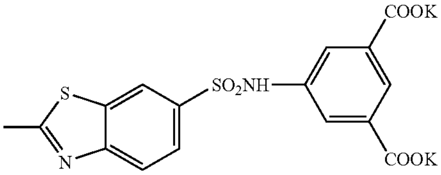 | 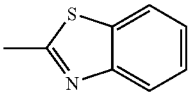 |
| a-38 | 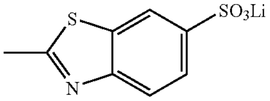 | 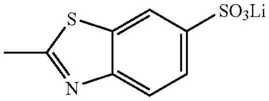 |
| a-39 | 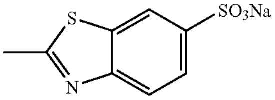 | 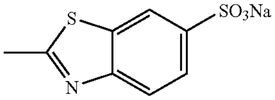 |
| a-40 | 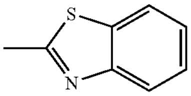 | 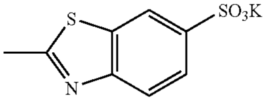 |

TABLE 7-continued
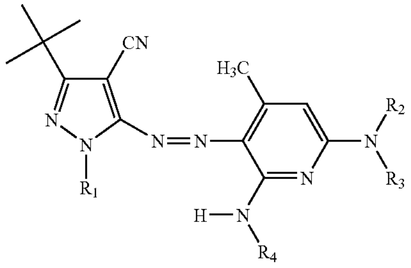
| Dye | $R_3$ | $R_4$ |
| --- | --- | --- |
| a-36 | 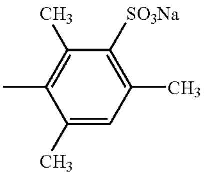 | 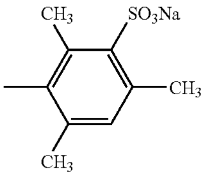 |
| a-37 | 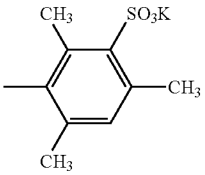 | 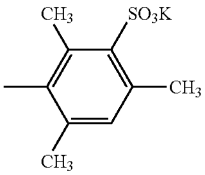 |
| a-38 | 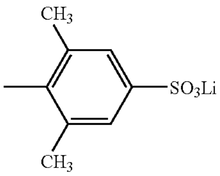 | 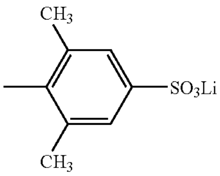 |
| a-39 | 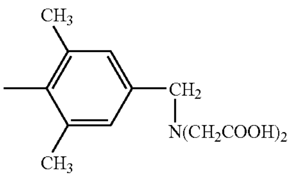 | 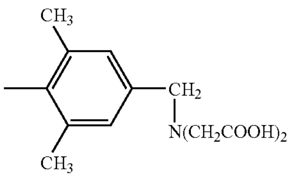 |
| a-40 | 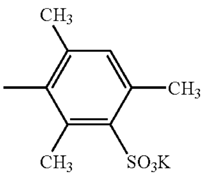 | 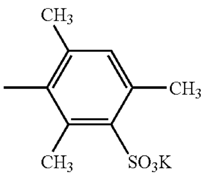 |

TABLE 8
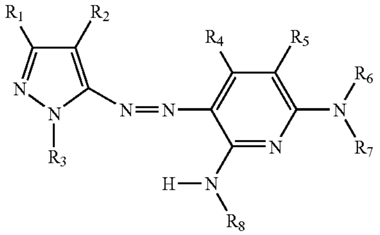
| Dye | $R_1$ | $R_2$ | $R_3$ | $R_4$ | $R_5$ | $R_6$ |
|---|---|---|---|---|---|---|
| a-41 | 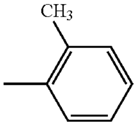 | CN | 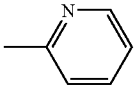 | H | $CONH_2$ | $SO_2CH_3$ |
| a-42 | 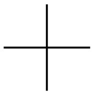 | Br | 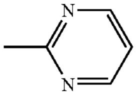 | COOEt | H | 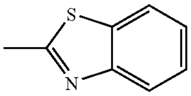 |
| a-43 | 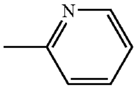 | $SO_2CH_3$ | 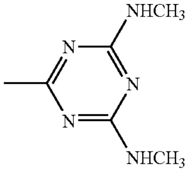 | $CONH_2$ | H | 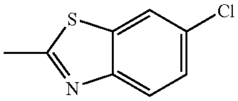 |
| a-44 | 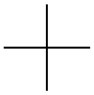 | CN | 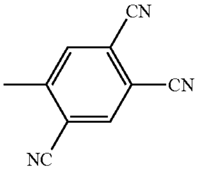 | H | H | 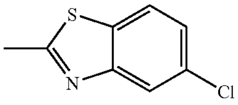 |
| a-45 | 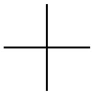 | Br | 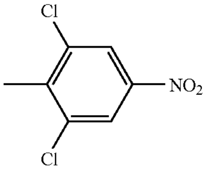 | H | $CONH_2$ | 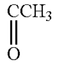 |
| a-46 | 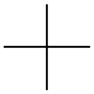 | CN | 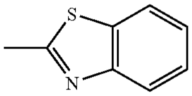 | $CH_3$ | H | 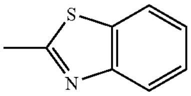 |
| Dye | $R_7$ | $R_8$ |
|---|---|---|
| a-41 | 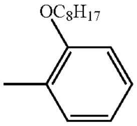 | 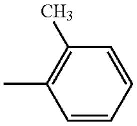 |
| a-42 | $C_8H_{17}(t)$ | $COCH_3$ |
| a-43 | 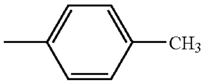 | 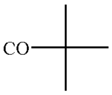 |

TABLE 8-continued
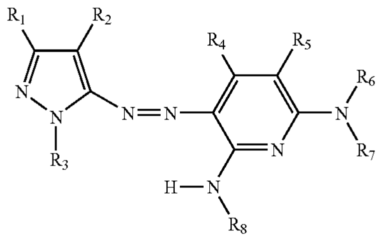
| | | | |
|---|---|---|---|
| a-44 | 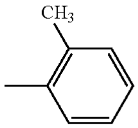 | | $SO_2CH_3$ |
| a-45 | 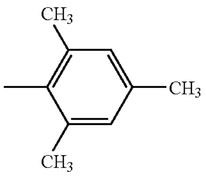 | 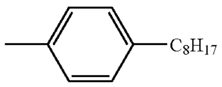 | |
| a-46 | 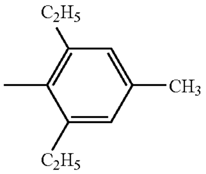 | 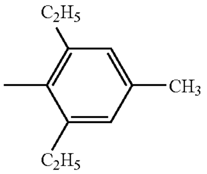 | |
TABLE 9
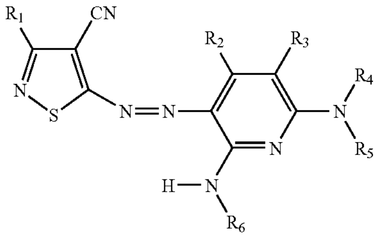
| Dye | $R_1$ | $R_2$ | $R_3$ | $R_4$ | $R_5$ | $R_6$ |
|---|---|---|---|---|---|---|
| b-1 | $CH_3$ | $CH_3$ | CN | H | 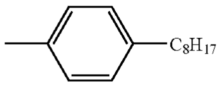 | 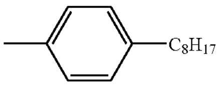 |
| b-2 | $CH_3$ | $CH_3$ | CN | H | 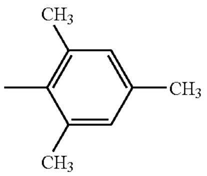 | 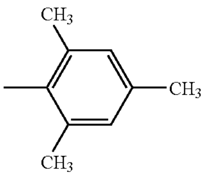 |
| b-3 | $CH_3$ | $CH_3$ | $CONH_2$ | H | 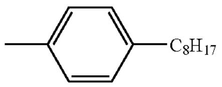 | 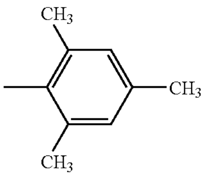 |

TABLE 9-continued
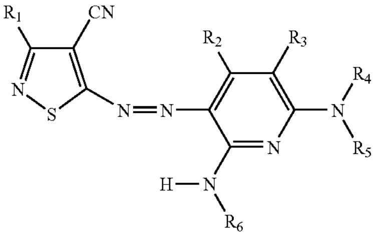
| Dye | $R_1$ | $R_2$ | $R_3$ | $R_4$ | $R_5$ | $R_6$ |
| --- | --- | --- | --- | --- | --- | --- |
| b-4 | $CH_3$ | $CH_3$ | H | H | 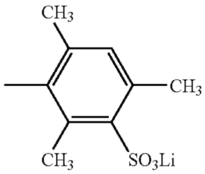 | 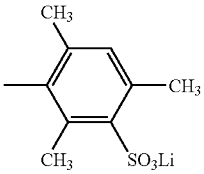 |
| b-5 | $CH_3$ | H | CN | H | 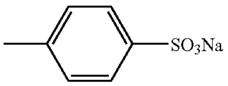 | 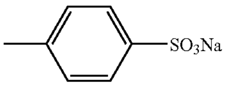 |
TABLE 10
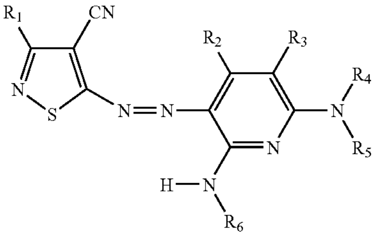
| Dye | $R_1$ | $R_2$ | $R_3$ | $R_4$ | $R_5$ | $R_6$ |
| --- | --- | --- | --- | --- | --- | --- |
| b-6 | $CH_3$ | $CH_3$ | H | 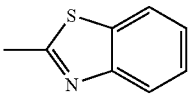 | 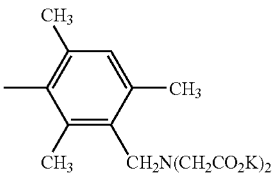 | 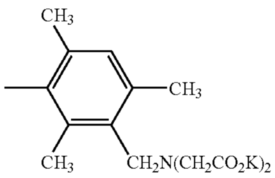 |
| b-7 | $CH_3$ | $CH_3$ | H | 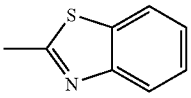 | 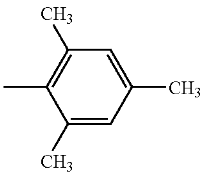 | 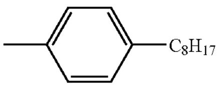 |
| b-8 | $CH_3$ | H | H | $SO_2CH_3$ | 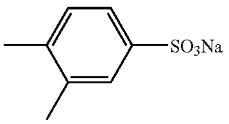 | 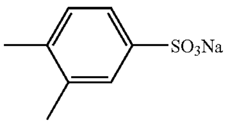 |

TABLE 11
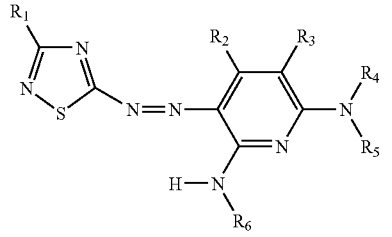
| Dye | $R_1$ | $R_2$ | $R_3$ | $R_4$ |
|---|---|---|---|---|
| c-1 | $—SCH_3$ | $CH_3$ | CN | H |
| c-2 | 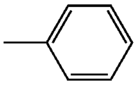 | H | $CONH_2$ | H |
| c-3 | 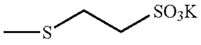 | $CH_3$ | H | 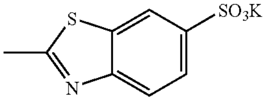 |
| c-4 | $—CH_3$ | $CH_3$ | H | 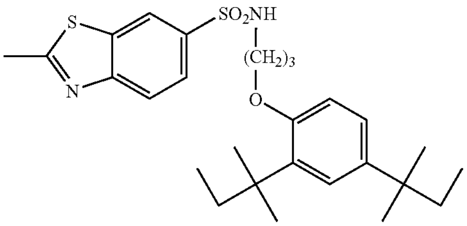 |
| c-5 | 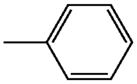 | H | H | 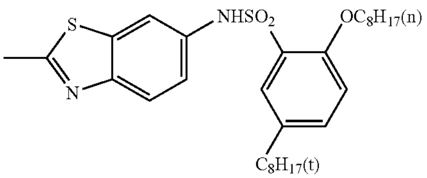 |
| Dye | $R_5$ | $R_6$ |
|---|---|---|
| c-1 | $C_8H_{17}(t)$ | 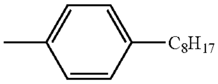 |
| c-2 | 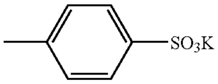 | 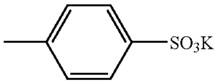 |
| c-3 | 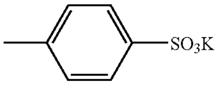 | 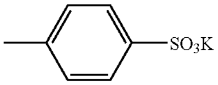 |
| c-4 | 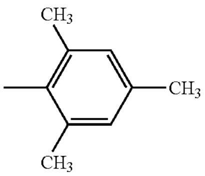 | 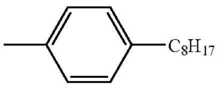 |

TABLE 11-continued
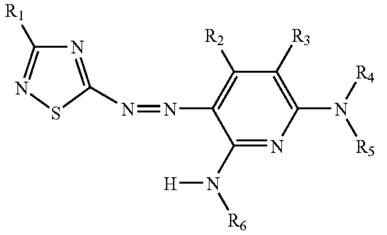
| | | |
|---|---|---|
| c-5 | 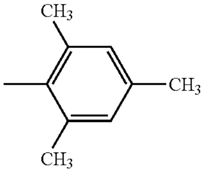 | $C_8H_{17}$(t) |
TABLE 12
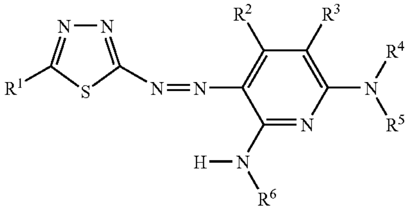
| Dye | $R_1$ | $R_2$ | $R_3$ | $R_4$ | $R_5$ | $R_6$ |
|---|---|---|---|---|---|---|
| d-1 | Me | $CH_3$ | CN | H | 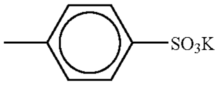 | 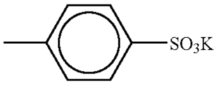 |
| d-2 | Me | $CH_3$ | CN | H | 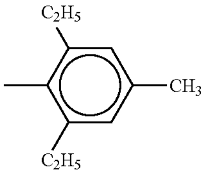 | 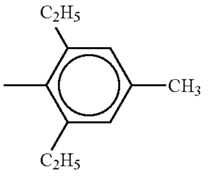 |
| d-3 | Me | H | H | 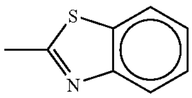 | 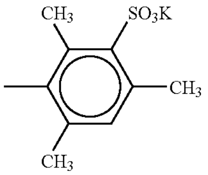 | 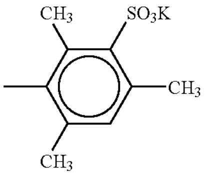 |
| d-4 | Ph | $CH_3$ | $CONH_2$ | H | 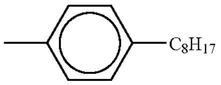 | 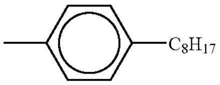 |

TABLE 12-continued
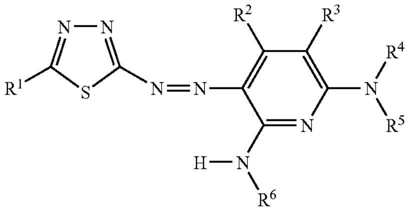
| Dye | $R_1$ | $R_2$ | $R_3$ | $R_4$ | $R_5$ | $R_6$ |
|---|---|---|---|---|---|---|
| d-5 | Ph | $CH_3$ | H | 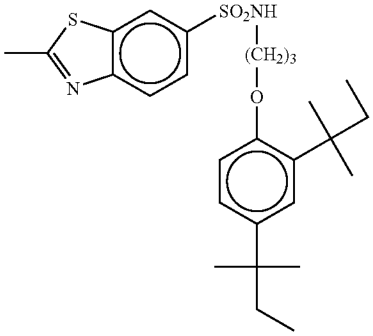 | 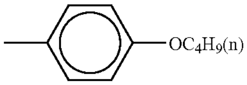 | 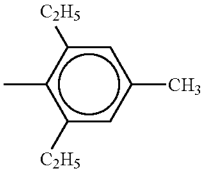 |
TABLE 13
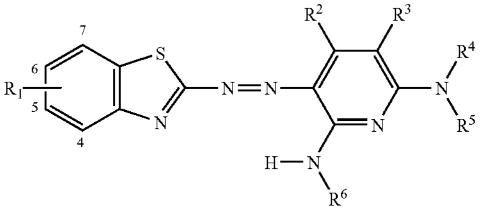
| Dye | $R_1$ | $R_2$ | $R_3$ | $R_4$ | $R_5$ | $R_6$ |
|---|---|---|---|---|---|---|
| e-1 | 5-Cl | $CH_3$ | $CONH_2$ | H | $C_8H_{17}(t)$ | $C_8H_{17}(t)$ |
| e-2 | 5,6-diCl | H | H | 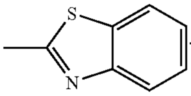 | 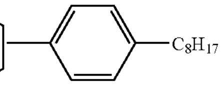 | 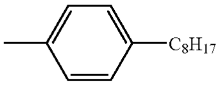 |
| e-3 | 5,6-diCl | $CH_3$ | H | 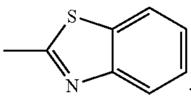 | 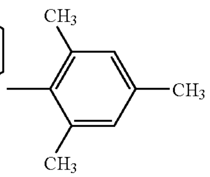 | $COCH_3$ |
| e-4 | 5-$CH_3$ | H | CN | H | 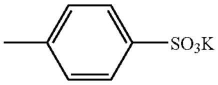 | 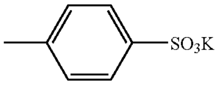 |
| e-5 | 5-$NO_2$ | $CH_3$ | H | $SO_2CH_3$ | 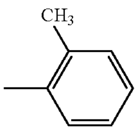 | 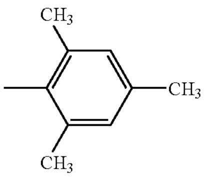 |

TABLE 13-continued

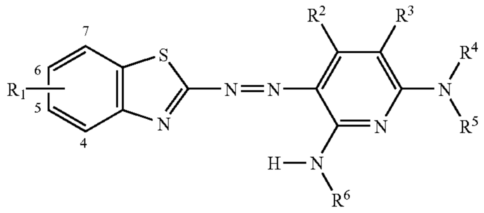

| Dye | $R_1$ | $R_2$ | $R_3$ | $R_4$ | $R_5$ | $R_6$ |
|---|---|---|---|---|---|---|
| f-1 | 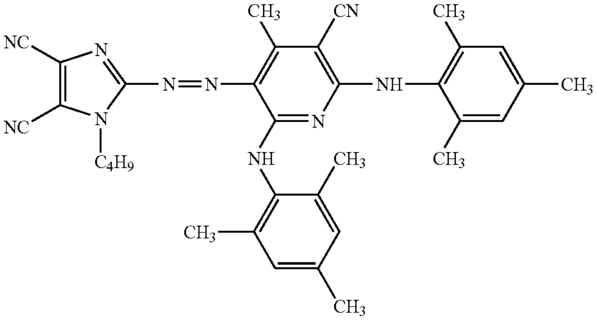 | | | | | |
| f-2 | 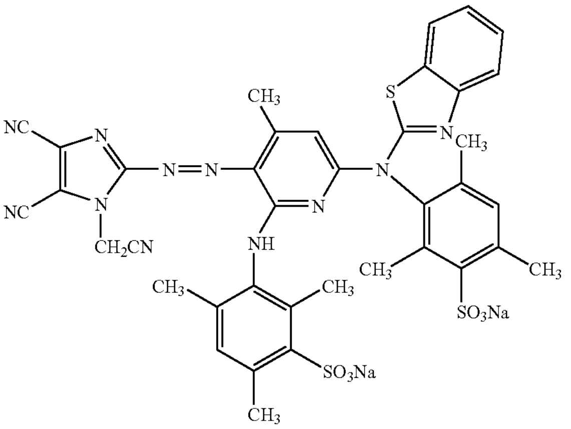 | | | | | |

An ink set in the invention, particularly preferably an ink set for ink jet recording, contains a dye represented by formula (3) in magenta ink in an amount of preferably from 0.2 to 20 mass %, and more preferably from 0.5 to 15 mass %. The solubility of the dye in water of 20° C. (or the degree of dispersion in a stable state) is preferably 5mass % or more, more preferably 10 mass % or more.

Dye Represented by Formula (4):

A dye represented by formula (4) is preferably a black dye.

The dye represented by formula (4) is preferably a dye (L) having wavelength λmax of from 500 to 700 nm, and the half value width of the absorption spectrum of the dilute solution of the dye having normalized absorbance of 1.0 ($W\lambda,_{1/2}$) of 10 nm or more (preferably from 120 to 500 nm, more preferably from 120 to 350 nm).

It is possible to use the dye (L) alone as a dye for black ink where high image quality [(deep) black] can be obtained not dependent upon the light source and black color by which the tone of any of B, G and R is hardly emphasized can be realized alone, but the dye (L) is generally used with a dye covering the region where the dye (L) is low in absorption. In general, it is preferred to use in combination with a dye (S) having main absorption in a yellow region (λmax of from 350 to 500 nm). Further, black ink can be manufactured in combination with other dyes or pigments.

In the present invention, it is preferred to manufacture black ink with the dye alone or as mixture. For the purpose of satisfying the preferred properties as black ink, that is, 1) excellent in weatherability, and/or 2) capable of maintaining the balance of black after discoloration, it is preferred to satisfy the following conditions.

In the first place, a black square mark according to JIS Code 2223 is printed with the black ink and 48 point, and the reflection density ($D_{vis}$) of the printed matter measured through a status A filter (visual filter) is prescribed as the initial density. As reflection density measuring instrument carrying a status A filter, e.g., X-Rite densitometer can be exemplified. When the density of "black" is measured, measuring value by $D_{vis}$ is used as standard observing reflection density. The printed matter is forcedly discolored with an ozone fadeometer capable of emitting 5 ppm of ozone constantly, and a forced discoloration velocity constant ($k_{vis}$) is obtained from the time (t) required for the reflection density ($D_{vis}$) to become 80% of the initial reflection density by the relational expression of $[0.8=\exp(-k_{vis}\cdot t)]$.

In the present invention, the forced discoloration velocity constant ($k_{vis}$) is $5.0\times10^{-2}$ (hour$^{-1}$) or less, preferably $3.0\times10^{-2}$ (hour$^{-1}$) or less, and more preferably $1.0\times10^{-2}$ (hour$^{-1}$) or less.

A black square mark according to JIS Code 2223 is printed with the black ink and 48 point, and the reflection densities of three colors ($D_R$, $D_G$, $D_B$) of C (cyan), M (magenta) and Y (yellow) of the printed matter measured through a status A filter not ($D_{vis}$) are also prescribed as the initial densities. Here, ($D_R$, $D_G$, $D_B$) are reflection density C through a red filter, reflection density M through a green filter, and reflection density Y through a blue filter respectively. The printed matter is forcedly discolored with an ozone fadeometer capable of emitting 5 ppm of ozone constantly according to the above method, and forced discoloration velocity constants ($k_R$, $k_G$, $k_B$) are obtained from the time required for the reflection densities ($D_R$, $D_G$, $D_B$) to become 80% of the initial reflection densities. When the ratio (R) of the maximum value and the minimum value is obtained from the above three velocity constants (for instance, when $k_R$ is the maximum value and $k_G$ is the minimum value, $R=k_R/k_G$), ink can be manufactured so that the ratio (R) becomes 1.2 or less, preferably 1.1 or less, and more preferably 1.05 or less.

"A printed matter of black square mark according to JIS Code 2223 by 48 point" used above was printed in sufficiently large size for covering the aperture of the fadeometer so as to give sufficient size for density measurement.

As a dye to be used in black ink with dye (L) represented by formula (4), dye (S) having λmax of from 350 to 500 nm is exemplified, and dye (S) can also be exemplified as the dye coming under the dye represented by formula (4). In black ink, preferably at least one dye in dye (L) is a dye represented by formula (4), particularly preferably at least one dye in both dye (L) and dye (S) is a dye represented by formula (4), and most preferably a dye represented by formula (4) accounts for 90 mass % of the entire dyes in the ink.

In formula (4), $A_{41}$, $B_{41}$ and $C_{41}$ each represents an aromatic group which may be substituted or a heterocyclic group which may be substituted ($A_{41}$ and $C_{41}$ are monovalent groups and $B_{41}$ is a divalent group).

An azo dye represented by formula (4) (hereinafter sometimes referred to as merely "azo dye") is particularly preferably a dye represented by the following formula (4-A)

Formula (4-A)

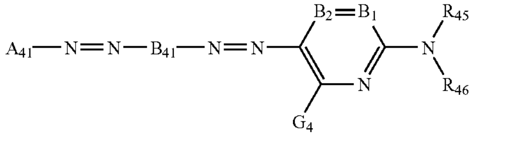

In formula (4-A), $A_{41}$ and $B_{41}$ have the same meaning as in formula (4). $B_1$ and $B_2$ each represents $=CR_{41}-$ or $-CR_{42}=$, or either $B_1$ or $B_2$ represents a nitrogen atom and the other represents $=CR_{41}-$ or $-CR_{42}=$.

$G_4$, $R_{41}$ and $R_{42}$ each represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and each group may further be substituted.

$R_{45}$ and $R_{46}$ each represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and each group may further have a substituent. However $R_{45}$ and $R_{46}$ do not represent a hydrogen atom at the same time.

$R_{41}$ and $R_{45}$, or $R_{45}$ and $R_{46}$ may be bonded to each other to form a 5- or 6-membered ring.

An azo dye represented by formula (4) is preferably an azo dye represented by the following formula (4-B).

Formula (4-B)

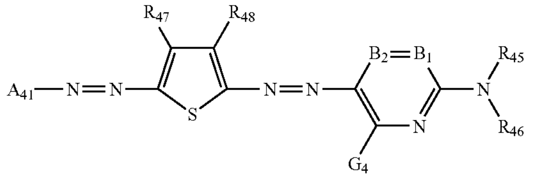

In formula (4-B), $R_{47}$ and $R_{48}$ have the same meaning as $R_{41}$ in formula (4-A).

Halogen atoms include a fluorine atom, a chlorine atom and a bromine atom.

An aliphatic group means an alkyl group, a substituted alkyl group, an alkenyl group, a substituted alkenyl group, an alkynyl group, a substituted alkynyl group, an aralkyl group and a substituted aralkyl group. An aliphatic group may be branched or may form a ring. The carbon atom of an aliphatic group is preferably from 1 to 20, more preferably from 1 to 16. The aryl moiety of an aralkyl group and a substituted aralkyl group is preferably a phenyl group or a naphthyl group, and a phenyl group is particularly preferred. As the examples of aliphatic groups, methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl can be exemplified.

A monovalent aromatic group means an aryl group and a substituted aryl group. An aryl group is preferably phenyl or naphthyl, and phenyl is especially preferred. The carbon atom of an aromatic group is preferably from 6 to 20, and more preferably from 6 to 16. As the examples of monovalent aromatic groups, phenyl, p-tolyl, p-methoxyphenyl, o-chlorophenyl and m-(3-sulfopropylamino)phenyl are included. Divalent aromatic groups are the groups made divalent of these monovalent aromatic-groups. The examples of divalent groups include phenylene, p-tolylene, p-methoxyphenylene, o-chlorophenylene, m-(3-sulfopropylamino)phenylene and naphthylene.

A heterocyclic group having a substituent and an unsubstituted heterocyclic group are included in heterocyclic groups. A heterocyclic ring may be condensed with an aliphatic ring, an aromatic ring or other heterocyclic ring. The heterocyclic group is preferably a 5- or 6-membered heterocyclic group. N, O and S atoms are exemplified as the hetero atoms of heterocyclic rings. The examples of the substituents include an aliphatic group, a halogen atom, an alkylsulfonyl group, an arylsulfonyl group, an acyl group, an acylamino group, a sulfamoyl group, a carbamoyl group and an ionic hydrophilic group. The examples of heterocyclic rings used in monovalent and divalent heterocyclic groups include pyridine, thiophene, thiazole, benzothiazole, benzoxazole and furan rings.

A carbamoyl group includes a carbamoyl group having a substituent and an unsubstituted carbamoyl group. The examples of the substituents include an alkyl group. The examples of the carbamoyl groups include a methylcarbamoyl group and a dimethylcarbamoyl group.

An alkoxycarbonyl group includes an alkoxycarbonyl group having a substituent and an unsubstituted alkoxycarbonyl group. As the alkoxycarbonyl group, an alkoxycarbonyl group having from 2 to 20 carbon atoms is preferred. The examples of the substituents include an ionic hydrophilic group. The examples of alkoxycarbonyl groups include a methoxycarbonyl group and an ethoxycarbonyl group.

An aryloxycarbonyl group includes an aryloxycarbonyl group having a substituent and an unsubstituted aryloxycarbonyl group. As the aryloxycarbonyl group, an aryloxycarbonyl group having from 7 to 20 carbon atoms is preferred. The examples of the substituents include an ionic hydrophilic group. The examples of the aryloxycarbonyl groups include a phenoxycarbonyl group.

A heterocyclic oxycarbonyl group includes a heterocyclic oxycarbonyl group having a substituent and an unsubstituted heterocyclic oxycarbonyl group. As the heterocyclic oxycarbonyl group, a heterocyclic oxycarbonyl group having from 2 to 20 carbon atoms is preferred. The examples of the substituents include an ionic hydrophilic group. The examples of the heterocyclic oxycarbonyl groups include a 2-pyridyl-oxycarbonyl group.

An acyl group includes an acyl group having a substituent and an unsubstituted acyl group. As the acyl group, an acyl group having from 1 to 20 carbon atoms is preferred. The examples of the substituents include an ionic hydrophilic group. The examples of the acyl groups include an acetyl group and a benzoyl group.

An alkoxyl group includes an alkoxyl group having a substituent and an unsubstituted alkoxyl group. As the alkoxyl group, an alkoxyl group having from 1 to 20 carbon atoms is preferred. The examples of the substituents include an alkoxyl group, a hydroxyl group, and an ionic hydrophilic group. The examples of the alkoxyl groups include a methoxy group, an ethoxy group, an isopropoxy group, a methoxyethoxy group, a hydroxyethoxy group and a 3-carboxypropoxy group.

An aryloxy group includes an aryloxy group having a substituent and an unsubstituted aryloxy group. As the aryloxy group, an aryloxy group having from 6 to 20 carbon atoms is preferred. The examples of the substituents include an alkoxyl group and an ionic hydrophilic group. The examples of the aryloxy groups include a phenoxy group, a p-methoxyphenoxy group and an o-methoxyphenoxy group.

A heterocyclic oxy group includes a heterocyclic oxy group having a substituent and an unsubstituted heterocyclic oxy group. As the heterocyclic oxy group, a heterocyclic oxy group having from 2 to 20 carbon atoms is preferred. The examples of the substituents include an alkyl group, an alkoxyl group and an ionic hydrophilic group. The examples of the heterocyclic oxy groups include a 3-pyridyloxy group and a 3-thienyloxy group.

As silyloxy groups, silyloxy groups having from 1 to 20 carbon atoms substituted with an aliphatic group or an aromatic group are preferred. The examples of the silyloxy groups include trimethylsilyloxy and diphenylmethylsilyloxy.

An acyloxy group includes an acyloxy group having a substituent and an unsubstituted acyloxy group. As the acyloxy group, an acyloxy having from 1 to 20 carbon atoms is preferred. The examples of the substituents include an ionic hydrophilic group. The examples of the acyloxy groups include an acetoxy group and a benzoyloxy group.

A carbamoyloxy group includes a carbamoyloxy group having a substituent and an unsubstituted carbamoyloxy group. The examples of the substituents include an alkyl group. The examples of the carbamoyloxy groups include an N-methyl-carbamoyloxy group.

An alkoxycarbonyloxy group includes an alkoxycarbonyloxy group having a substituent and an unsubstituted alkoxycarbonyloxy group. As the alkoxycarbonyloxy group, an alkoxycarbonyloxy group having from 2 to 20 carbon atoms is preferred. The examples of the alkoxycarbonyloxy groups include a methoxycarbonyloxy group and an isopropoxycarbonyloxy group.

An aryloxycarbonyloxy group includes an aryloxycarbonyloxy group having a substituent and an unsubstituted aryloxycarbonyloxy group. As the aryloxycarbonyloxy group, an aryloxycarbonyloxy group having from 7 to 20 carbon atoms is preferred. The examples of the aryloxycarbonyloxy groups include a phenoxycarbonyloxy group.

An amino group includes an amino group substituted with an alkyl group, an aryl group or a heterocyclic group, and the alkyl group, aryl group and heterocyclic group may further have a substituent. As the alkylamino group, an alkylamino group having from 1 to 20 carbon atoms is preferred. The examples of the substituents include an ionic hydrophilic group. The examples of the alkylamino groups include a methylamino group and a diethylamino group.

An arylamino group includes an arylamino group having a substituent and an unsubstituted arylamino group. As the arylamino group, an arylamino group having from 6 to 20 carbon atoms is preferred. The examples of the substituents include a halogen atom and an ionic hydrophilic group. The examples of the arylamino groups include an anilino group and a 2-chlorophenylamino group.

A heterocyclic amino group includes a heterocyclic amino group having a substituent and an unsubstituted heterocyclic amino group. As the heterocyclic amino group, a heterocyclic amino group having from 2 to 20 carbon atoms is preferred. The examples of the substituents include an alkyl group, a halogen atom and an ionic hydrophilic group.

An acylamino group includes an acylamino group having a substituent and an unsubstituted acylamino group. As the acylamino group, an acylamino group having from 2 to 20 carbon atoms is preferred. The examples of the substituents include an ionic hydrophilic group. The examples of the acylamino groups include an acetylamino group, a propionylamino group, a benzoylamino group, an N-phenylacetylamino group and a 3,5-disulfobenzoylamino group.

A ureido group includes a ureido group having a substituent and an unsubstituted ureido group. As the ureido group, a ureido group having from 1 to 20 carbon atoms is preferred. The examples of the substituents include an alkyl group and an aryl group. The examples of the ureido groups include a 3-methylureido group, a 3,3-dimethylureido group and a 3-phenylureido group.

A sulfamoylamino group includes a sulfamoylamino group having a substituent and an unsubstituted sulfamoylamino group. The examples of the substituents include an alkyl group. The examples of the sulfamoylamino groups include an N,N-dipropyl-sulfamoylamino group.

An alkoxycarbonylamino group includes an alkoxycarbonylamino group having a substituent and an unsubstituted alkoxycarbonylamino group. As the alkoxycarbonylamino group, an alkoxycarbonylamino group having from 2 to 20 carbon atoms is preferred. The examples of the substituents include an ionic hydrophilic group. The examples of the alkoxycarbonylamino groups include an ethoxycarbonylamino group.

An aryloxycarbonylamino group includes an aryloxycarbonylamino group having a substituent and an unsubstituted aryloxycarbonylamino group. As the aryloxycarbonylamino group, an aryloxycarbonylamino group having from 7 to 20 carbon atoms is preferred. The examples of the substituents include an ionic hydrophilic group. The examples of the aryloxycarbonylamino groups include a phenoxycarbonylamino group.

An alkylsulfonylamino group and an arylsulfonylamino group include an alkylsulfonylamino group having a substituent and an unsubstituted alkylsulfonylamino group and an arylsulfonylamino group having a substituent and an unsubstituted arylsulfonylamino group. As the sulfonylamino group, a sulfonylamino group having from 1 to 20 carbon atoms is preferred. The examples of the substituents include an ionic hydrophilic group. The examples of these sulfonylamino groups include a methylsulfonylamino group, an N-phenyl-methylsulfonylamino group, a phenylsulfonylamino group and a 3-carboxyphenylsulfonylamino group.

A heterocyclic sulfonylamino group includes a heterocyclic sulfonylamino group having a substituent and an unsubstituted heterocyclic sulfonylamino group. As the heterocyclic sulfonylamino group, a heterocyclic sulfonylamino group having from 1 to 12 carbon atoms is preferred. The examples of the substituents include an ionic hydrophilic group. The examples of the heterocyclic sulfonylamino groups include a 2-thiophenesulfonylamino group and a 3-pyridylsulfonylamino group.

A heterocyclic sulfonyl group includes a heterocyclic sulfonyl group having a substituent and an unsubstituted heterocyclic sulfonyl group. As the heterocyclic sulfonyl group, a heterocyclic sulfonyl group having from 1 to 20 carbon atoms is preferred. The examples of the substituents include an ionic hydrophilic group. The examples of the heterocyclic sulfonyl groups include a 2-thiophenesulfonyl group and a 3-pyridylsulfonyl group.

A heterocyclic sulfinyl group includes a heterocyclic sulfinyl group having a substituent and an unsubstituted heterocyclic sulfinyl group. As the heterocyclic sulfinyl group, a heterocyclic sulfinyl group having from 1 to 20 carbon atoms is preferred. The examples of the substituents include an ionic hydrophilic group. The examples of the heterocyclic sulfinyl groups include a 4-pyridinesulfinyl group.

Alkyl-, aryl- and heterocyclic thio groups include alkyl-, aryl- and heterocyclic thio groups each having a substituent and unsubstituted alkyl-, aryl- and heterocyclic thio groups. As the alkyl-, aryl- and heterocyclic thio groups, alkyl-, aryl- and heterocyclic thio groups having from 1 to 20 carbon atoms are preferred. The examples of the substituents include an ionic hydrophilic group. The examples of the alkyl-, aryl- and heterocyclic thio groups include amethylthio group, a phenylthio group and a 2-pyridylthio group.

An alkylsulfonyl group and an arylsulfonyl group include an alkylsulfonyl group and an arylsulfonyl group each having a substituent and unsubstituted alkylsulfonyl and arylsulfonyl groups. The examples of the alkylsulfonyl group and the arylsulfonyl group include a methylsulfonyl group and a phenylsulfonyl group.

An alkylsulfinyl group and an arylsulfinyl group include an alkylsulfinyl group and an arylsulfinyl group each having a substituent and unsubstituted alkylsulfinyl and arylsulfinyl groups. The examples of the alkylsulfinyl group and the arylsulfinyl group include a methylsulfinyl group and a phenylsulfinyl group.

A sulfamoyl group includes a sulfamoyl group having a substituent and an unsubstituted sulfamoyl group. The examples of the substituents include an alkyl group. The examples of the sulfamoyl groups include a dimethylsulfamoyl group and a di(2-hydroxyethyl)sulfamoyl group.

The compounds represented by formula (4), (4-A) or (4-B) are described below.

In the following, the meanings of groups and substituents are the same as described above.

In formula (4), $A_{41}$, $B_{41}$ and $C_{41}$ each represents an aromatic group which may be substituted ($A_{41}$ and $C_{41}$ are monovalent aromatic groups, e.g., an aryl group; and $B_{41}$ is a divalent aromatic group, e.g., an arylene group), or a heterocyclic group ($A_{41}$ and $C_{41}$ are monovalent heterocyclic groups; and $B_{41}$ is a divalent heterocyclic group) which may be substituted. As the examples of aromatic rings, a benzene ring and a naphthalene ring are exemplified, and as the hetero atoms of the heterocyclic ring, N, O and S atoms are exemplified. An aliphatic ring, an aromatic ring or other heterocyclic rings may be condensed to the heterocyclic ring.

The substituents may be an arylazo group or a heterocyclic azo group.

It is preferred that at least one of $A_{41}$, $B_{41}$ and $C_{41}$ is a heterocyclic group, more preferably at least two of $A_{41}$, $B_{41}$ and $C_{41}$ are heterocyclic groups. Further, all of of $A_{41}$, $B_{41}$ and $C_{41}$ may be heterocyclic groups.

As a preferred heterocyclic group of $C_{41}$, a nitrogen-containing 6-membered aromatic heterocyclic group represented by the following formula (4-C) is exemplified. When $C_{41}$ is a nitrogen-containing 6-membered aromatic heterocyclic group represented by the following formula (4-C), formula (4) corresponds to formula (4-A).

Formula (4-C)

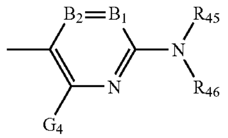

In formula (4-C), $B_1$ and $B_2$ each represents $=CR_{41}-$ or $-CR_{42}=$, or either $B_1$ or $B_2$ represents a nitrogen atom and the other represents $=CR_{41}-$ or $-CR_{42}=$, and more preferably each represents $=CR_{41}-$ or $-CR_{42}=$.

$R_{45}$ and $R_{46}$ each represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and each group may further have a substituent. $R_{45}$ and $R_{46}$ preferably represent a hydrogen atom, an aliphatic group, an aromatic group, a heterocyclic group, an acyl group, an alkylsulfonyl group, or an arylsulfonyl group, more preferably a hydrogen atom, an aromatic group, a heterocyclic group, an acyl group, an alkylsulfonyl group, or an aryl-sulfonyl group, and most preferably a hydrogen atom, an aryl group, or a heterocyclic group. Each group may further have a substituent. However $R_{45}$ and $R_{46}$ do not represent a hydrogen atom at the same time.

$G_4$, $R_{41}$ and $R_{42}$ each represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and each group may further be substituted.

Preferred substituents represented by $G_4$ include a hydrogen atom, a halogen atom, an aliphatic group, an aromatic group, a hydroxyl group, an alkoxyl group, an aryloxy group, an acyloxy group, a heterocyclic oxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylthio group, an arylthio group, and a heterocyclic thio group, more preferably a hydrogen atom, a halogen atom, an alkyl group, a hydroxyl group, an alkoxyl group, an aryloxy group, an acyloxy group, an amino group (including an alkylamino group, an arylamino group and a heterocyclic amino group), and an acylamino group, and most preferably a hydrogen atom, an anilino group and an acylamino group, and each group may further have a substituent.

Preferred substituents represented by $R_{41}$ and $R_{42}$ include a hydrogen atom, an alkyl group, a halogen atom, an alkoxycarbonyl group, a carboxyl group, a carbamoyl group, a hydroxyl group, an alkoxyl group and a cyano group, and each group may further have a substituent.

$R_{41}$ and $R_{45}$, or $R_{45}$ and $R_{46}$ may be bonded to each other to form a 5- or 6-membered ring.

When the substituents represented by $A_{41}$, $R_{41}$, $R_{42}$, $R_{45}$, $R_{46}$ and $G_4$ further have substituents, the substituents described in $G_4$, $R_{41}$ and $R_{42}$ are exemplified. It is preferred to have further an ionic hydrophilic group as the substituent anywhere on $A_{41}$, $R_{41}$, $R_{42}$, $R_{45}$, $R_{46}$ and $G_4$.

Ionic hydrophilic groups as the substituents include a sulfo group, a carboxyl group, a phosphono group and a quaternary ammonium group. As the ionic hydrophilic groups, a carboxyl group, a phosphono group and a sulfo group are preferred, and a carboxyl group and a sulfo group are particularly preferred. The carboxyl group, phosphono group and sulfo group may be in the state of a salt, and the examples of counter ions for forming a salt include an ammonium ion, an alkali metal ion (e.g., a lithium ion, a sodium ion, a potassium ion) and an organic cation (e.g., a tetramethylammonium ion, a tetramethylguanidinium ion, a tetramethylphosphonium ion). Of these ions, a lithium ion is preferred.

When $B_{41}$ has a cyclic structure, a thiophene ring, a thiazole ring, an imidazole ring, a benzothiazole ring, and a thienothiazole ring are exemplified as preferred heterocyclic rings. Each heterocyclic ring may further have a substituent. A thiophene ring, a thiazole ring, an imidazole ring, a benzothiazole ring, and a thienothiazole ring represented by the following formula (a), (b), (c), (d) or (e) are preferred. When $B_{41}$ is a thiophene ring represented by formula (a) and $C_{41}$ has the structure represented by formula (4-C), formula (4) comes to correspond to formula (4-B).

(a)

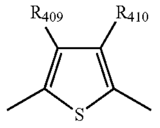

(b)

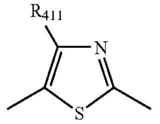

(c)

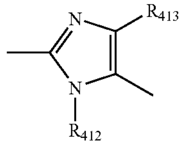

(d)

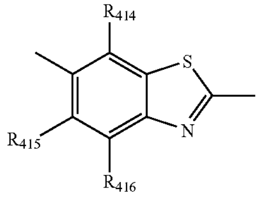

(e)

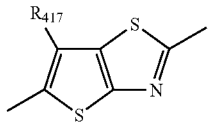

In the above formulae (a) to (e), from $R_{409}$ to $R_{417}$ represent the same substituents as represented by $G_4$, $R_{41}$ and $R_{42}$ in formula (4-A).

A particularly preferred structure is represented by the following formula (4-D).

Formula (4-D)

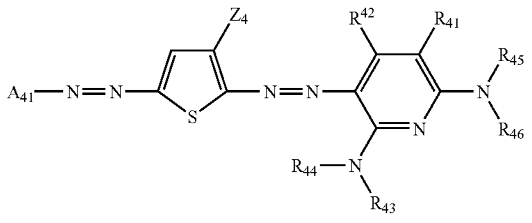

In formula (4-D), $Z_4$ represents an electron attractive group having a σp value of Hammett's substitution constant of 0.20 or more, preferably an electron attractive group having a σp value of 0.30 or more, more preferably an electron attractive group having a σp value of 0.45 or more, and particularly preferably an electron attractive group having a σp value of 0.60 or more, but it is preferred not to exceed 1.0. As the specific examples of the preferred substituents, the later described electron attractive groups can be exemplified, and above all, an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, and alkyl halide group having from 1 to 20 carbon atoms are preferred. A cyano group, an alkylsulfonyl group having from 1 to 20 carbon atoms, and an arylsulfonyl group having from 6 to 20 carbon atoms are particularly preferred, and a cyano group is most preferred.

$R_{41}$, $R_{42}$, $R_{45}$ and $R_{46}$ have the same meanings as in formula (4-A). $R_{43}$ and $R_{44}$ each represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. A hydrogen atom, an aromatic group, a heterocyclic group, an acyl group, an alkylsulfonyl group and an arylsulfonyl group are preferred, and a hydrogen atom, an aromatic group and a heterocyclic group are particularly preferred.

Each group described in formula (4-D) may further have a substituent. When each group further has a substituent, substituents described in formula (4-A), substituents described in $G_4$, $R_{41}$ and $R_{42}$ and ionic hydrophilic groups are exemplified as the substituents.

In the present invention, each substituent is restricted or defined by a σp value of Hammett's substitution constant, but this does not mean that an already known value found in the above literature is limited to only a certain substituent, and even if the value is unknown, a substituent having a value which will be included in the range when measured on the basis of Hammett's rule is of course included. In the compounds represented by formulae (4), (4-A), (4-B), (4-C) and (4-D), compounds not benzene derivatives are included, but a σp value is used as the index showing the electron effect of the substituent irrespective of the substitution position. In the present invention, a σp value is used in such a meaning.

As electron attractive groups having a σp value of Hammett's substitution constant of 0.60 or more, a cyano group, a nitro group, an alkylsulfonyl group (e.g., methylsulfonyl), and an arylsulfonyl group (e.g., phenylsulfonyl) can be exemplified.

As electron attractive groups having a Hammett's σp value of 0.45 or more, in addition to the above groups, an acyl group (e.g., acetyl), an alkoxycarbonyl group (e.g., dodecyloxy-carbonyl), an aryloxycarbonyl group (e.g., m-chlorophenoxy-carbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl), and an alkyl halide (e.g., trifluoromethyl) can be exemplified.

As electron attractive groups having a σp value of Hammett's substitution constant of 0.30 or more, in addition to the above groups, an acyloxy group (e.g., acetoxy), a carbamoyl group (e.g., N-ethylcarbamoyl, N,N-dibutyl-carbamoyl), an alkoxy halide (e.g., trifluoromethyloxy), an aryloxy halide (e.g., pentafluorophenyloxy), a sulfonyloxy group (e.g., methylsulfonyloxy), an alkylthio halide (e.g., difluoromethylthio), an aryl group substituted with two or more electron attractive groups having a σp value of 0.15 or more (e.g., 2,4-dinitrophenyl, pentachlorophenyl), and a heterocyclic group (e.g., 2-benzoxazolyl, 2-benzothiazolyl, 1-phenyl-2-benzimidazolyl) can be exemplified.

As electron attractive groups having a σp value of 0.20 or more, in addition to the above groups, a halogen atom is exemplified.

As the especially preferred combinations of substituents of azo dyes represented by formula (4-B), $R_{45}$ and $R_{46}$ each preferably represents a hydrogen atom, an alkyl group, an aryl group, a heterocyclic group, a sulfonyl group or an acyl group, more preferably a hydrogen atom, an aryl group, a heterocyclic group, or a sulfonyl group, and most preferably a hydrogen atom, an aryl group, or a heterocyclic group. However, $R_{45}$ and $R_{46}$ do not represent a hydrogen atom at the same time.

$G_4$ preferably represents a hydrogen atom, a halogen atom, an alkyl group, a hydroxyl group, an amino group, or an acylamino group, more preferably a hydrogen atom, a halogen atom, an amino group, or an acylamino group, and most preferably a hydrogen atom, an amino group or an acylamino group.

The preferred examples of $A_{41}$ include a pyrazole ring, an imidazole ring, an isothiazole ring, a thiadiazole ring, and a benzothiazole ring, more preferred examples include a pyrazole ring and an isothiazole ring, and a pyrazole ring is most preferred.

$B_1$ and $B_2$ each represents $=CR_{41}-$ or $-CR_{42}=$. $R_{41}$ and $R_{42}$ each preferably represents a hydrogen atom, an alkyl group, a halogen atom, a cyano group, a carbamoyl group, a carboxyl group, a hydroxyl group, an alkoxyl group or an alkoxycarbonyl group, more preferably a hydrogen atom, an alkyl group, a carboxyl group, a cyano group or a carbamoyl group.

With respect to preferred combinations of the substituents of the azo dyes, compounds in which at least one substituent of various substituents is the above preferred group are preferred, compounds in which more substituents are the above preferred groups are more preferred, and compounds in which all the substituents are the above preferred groups are most preferred.

The specific examples of the azo dyes are shown, but the azo dyes used in the invention are not limited thereto. A carboxyl group, a phosphono group and a sulfo group in the following specific examples may be in the state of a salt, and the examples of counter ions for forming a salt include an ammonium ion, an alkali metal ion (e.g., a lithium ion, a sodium ion, a potassium ion) and an organic cation (e.g., a tetramethylammonium ion, a tetramethylguanidinium ion, a tetramethylphosphonium ion). Of these ions, a lithium ion is preferred.

TABLE 14

A—N=N—B—N=N—C

| | A | B | C |
|---|---|---|---|
| (a-1) | 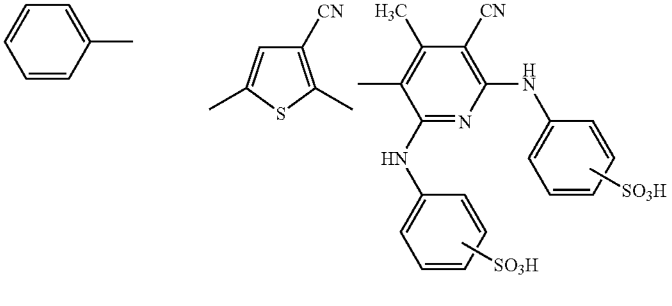 | | |

TABLE 14-continued
A—N=N—B—N=N—C
| | A | B | C |
|---|---|---|---|
| (a-2) | 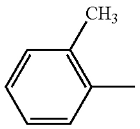 | 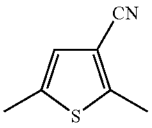 | 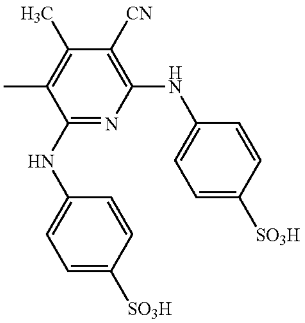 |
| (a-3) | 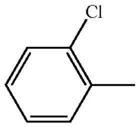 | 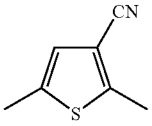 | 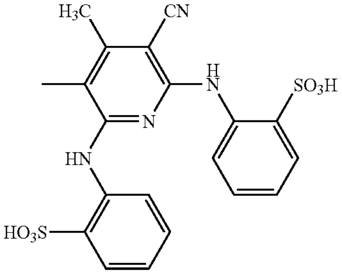 |
| (a-4) | 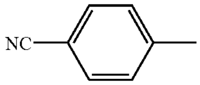 | 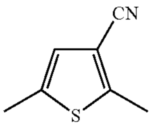 | 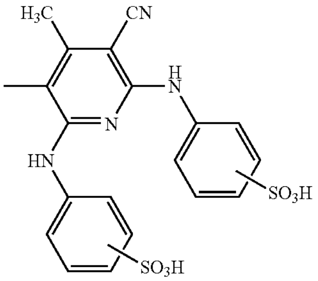 |
| (a-5) | 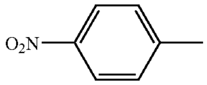 | 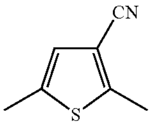 | 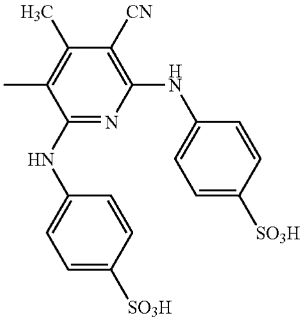 |
| (a-6) | 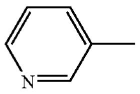 | 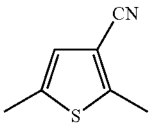 | 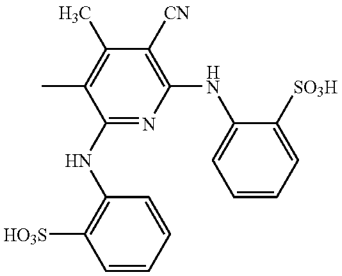 |

TABLE 15
| | A—N=N—B—N=N—C | |
|---|---|---|
| A | B | C |
| (b-1) 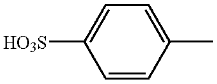 | 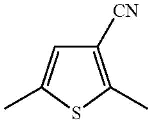 | 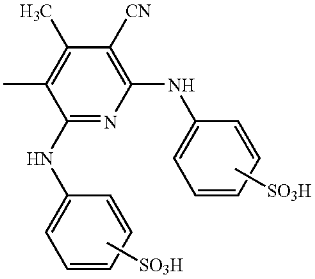 |
| (b-2) 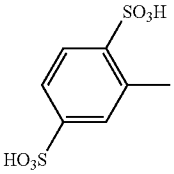 | 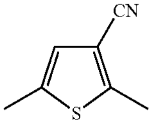 | 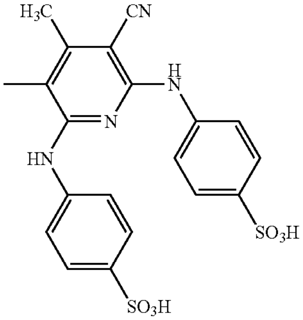 |
| (b-3) 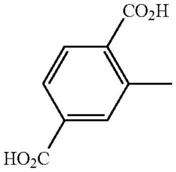 | 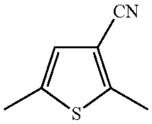 | 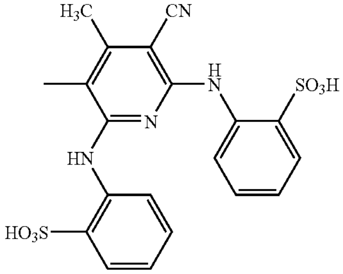 |
| (b-4) 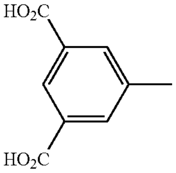 | 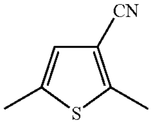 | 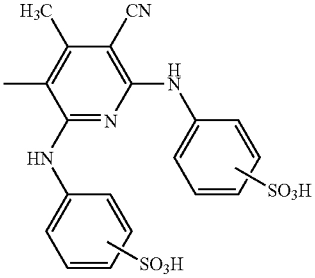 |
| (b-5) 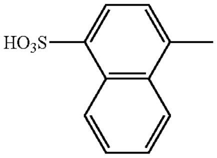 | 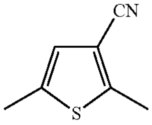 | 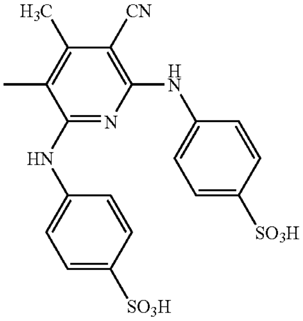 |

TABLE 15-continued
A—N=N—B—N=N—C
| | A | B | C |
|---|---|---|---|
| (b-6) | 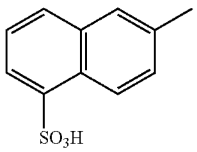 | 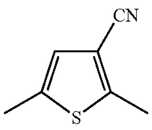 | 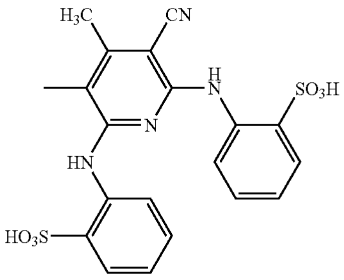 |
| (b-7) | 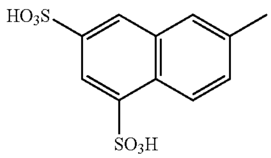 | 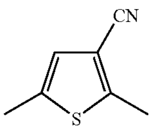 | 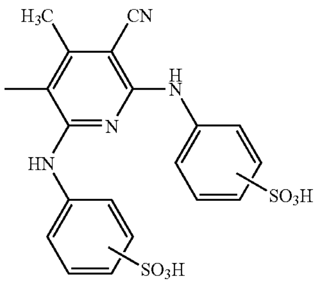 |
TABLE 16
A—N=N—B—N=N—C
| | A | B | C |
|---|---|---|---|
| (c-1) | 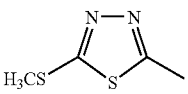 | 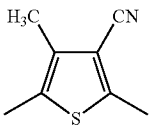 | 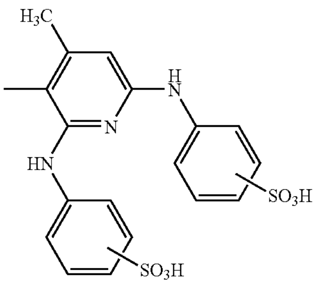 |
| (c-2) | 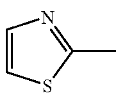 | 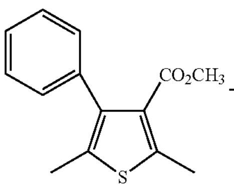 | 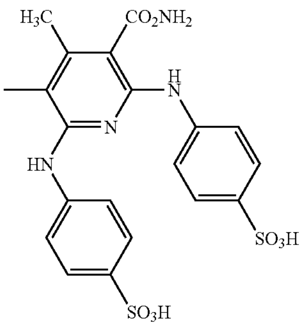 |

TABLE 16-continued
A—N=N—B—N=N—C
| | A | B | C |
|---|---|---|---|
| (c-3) | 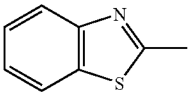 | 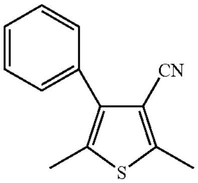 | 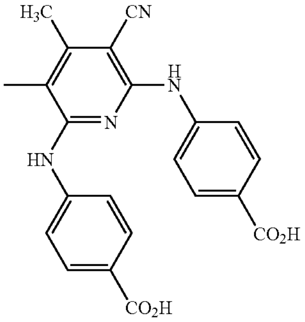 |
| (c-4) | 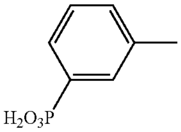 | 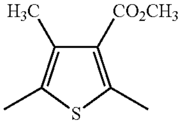 | 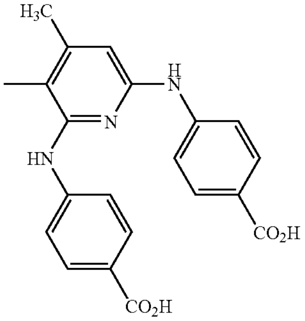 |
| (c-5) | 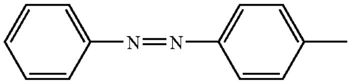 | 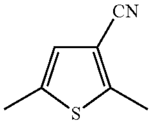 | 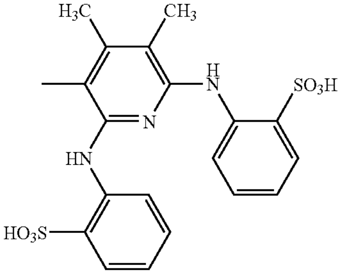 |
TABLE 17
A—N=N—B—N=N—C
| | A | B | C |
|---|---|---|---|
| (d-1) | 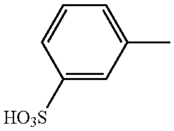 |  | 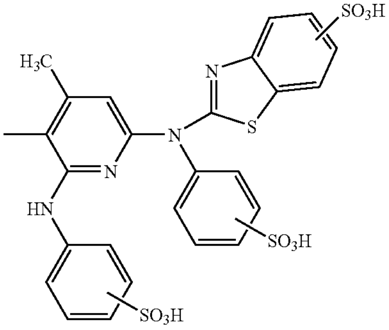 |

TABLE 17-continued
A—N=N—B—N=N—C
| | A | B | C |
|---|---|---|---|
| (d-2) | 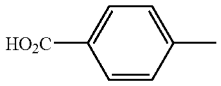 | 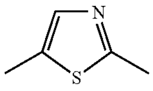 | 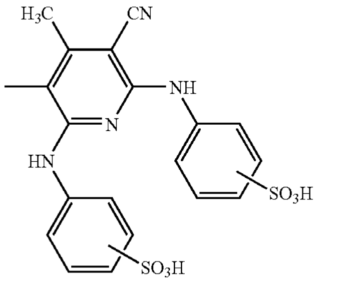 |
| (d-3) | 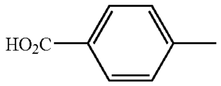 | 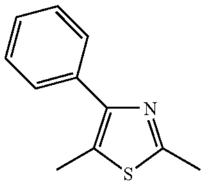 | 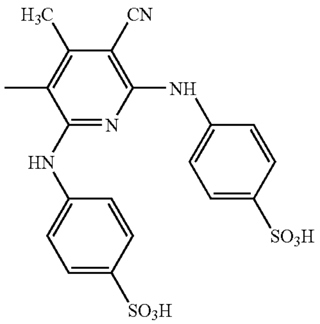 |
| (d-4) | 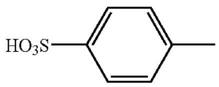 | 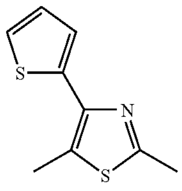 | 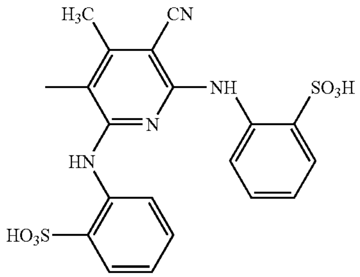 |
| (d-5) | 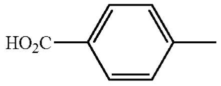 | 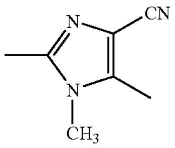 | 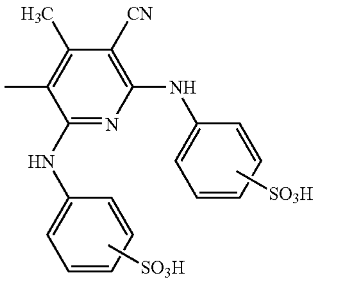 |
| (d-6) | 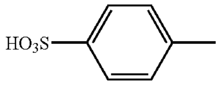 | 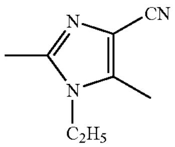 | 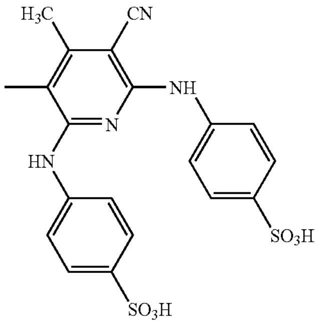 |

TABLE 18
A—N=N—B—N=N—C
| | A | B | C |
|---|---|---|---|
| (e-1) | 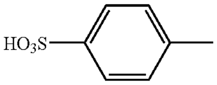 | 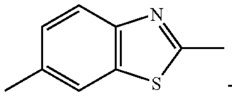 | 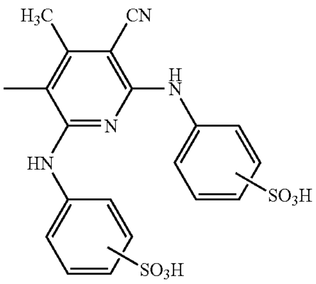 |
| (e-2) | 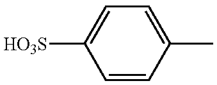 | 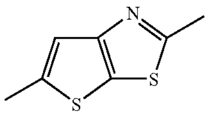 | 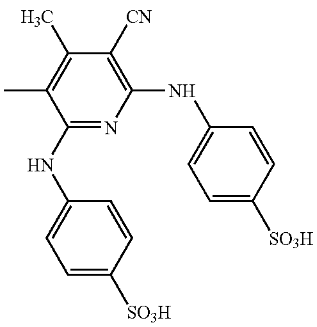 |
TABLE 19
A—N=N—B—N=N—C
| | A | B | C |
|---|---|---|---|
| (f-1) | 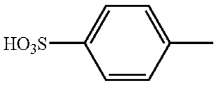 | 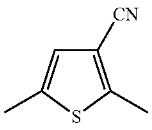 | 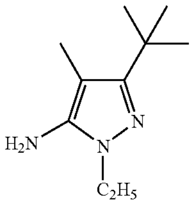 |
| (f-2) | 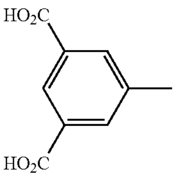 | 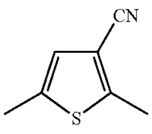 | 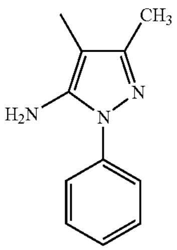 |

TABLE 19-continued

A—N=N—B—N=N—C

| | A | B | C |
|---|---|---|---|
| (f-3) | 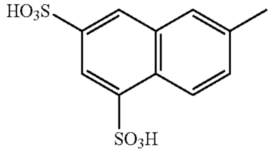 | 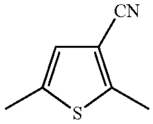 | 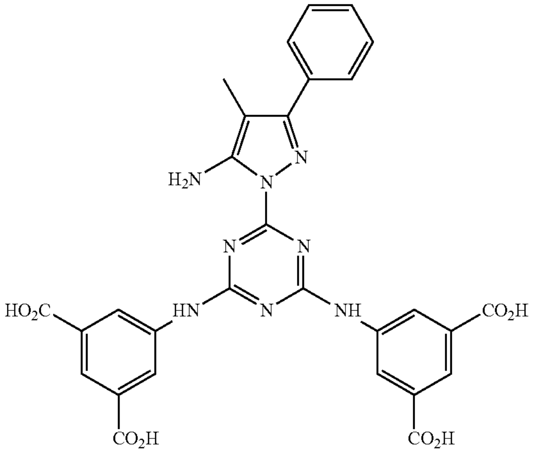 |
| (f-4) | 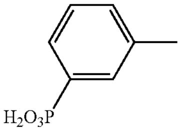 | 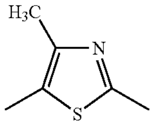 | 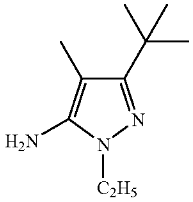 |

Azo dye represented by formulae (4), (4-A), (4-B) and (4-D) can be synthesized by the coupling reaction of a diazo component and a coupler. Main synthesis methods are disclosed in Japanese Patent Application No. 2002-113460.

In black ink, as dye (S) having λmax of from 350 to 500 nm, dyes represented by formula (1) or (4) and the later described yellow dyes and yellow pigments are preferably used. In black ink, these dyes and pigments may be used in combination, or may be used alone.

In the present invention, a dye represented by formula (4) is contained in black ink in an amount of from 0.2 to 20 mass %, more preferably from 0.5 to 15 mass %.

In addition to the dyes exemplified above, the following dyes can be used. A plurality of dyes are used in combination even in a monocolor for adjustine tone. For obtaining a full color image, an ink set comprising a plurality of inks using a plurality of dyes can be used in the present invention.

As yellow dyes, e.g., aryl or heteryl azo dyes having, e.g., phenols, naphthols, anilines, pyrazolones, pyridones or an open chain type active methylene compound as the coupling component; azomethine dyes having, e.g., an open chain type active methylene compound as the coupling component; methine dyes, e.g., benzylidene dyes and monomethine oxonol dyes; and quinone dyes, e.g., naphthoquinone dye and anthraquinone dyes are exemplified. Besides these dyes, quinophthalone dyes, nitro-nitroso dyes, acridine dyes and acridinone dyes are exemplified. These dyes may be dyes that present yellow after a part of the chromophore has been dissociated, and the counter cations in that case may be inorganic cations, e.g., alkali metal and ammonium, or may be organic cations, e.g., pyridinium and quaternary ammonium salt, or the counter cations may be polymer cations having these cations as the partial structure.

As magenta dyes, aryl or heteryl azo dyes having, e.g., phenols, naphthols or anilines as the coupling component; azomethine dyes having, e.g., pyrazolones or pyrazolotriazoles as the coupling component; methine dyes, e.g., arylidene dyes, styryl dyes, merocyanine dyes and oxonol dyes; carbonium dyes, e.g., diphenylmethane dyes, triphenylmethane dyes and xanthene dyes; quinone dyes, e.g., naphthoquinone, anthraquinone and anthrapyridone; and condensation polycyclic dyes, e.g., dioxazine dyes are exemplified. These dyes may be dyes that present magenta after a part of the chromophore has been dissociated, and the counter cations in that case may be inorganic cations, e.g., alkali metal and ammonium, or may be organic cations, e.g., pyridinium and quaternary ammonium salt, or the counter cations may be polymer cations having these cations as the partial structure.

As cyan dyes, azomethine dyes, e.g., indoaniline dyes and indophenol dyes; polymethine dyes, e.g., cyanine dyes, oxonol dyes and merocyanine dyes; carbonium dyes, e.g., diphenylmethane dyes, triphenylmethane dyes and xanthene dyes; phthalocyanine dyes; anthraquinone dyes; aryl or heteryl azo dyes having, e.g.,phenols, naphthols or anilines as the coupling component; and indigo·thioindigo dyes are exemplified. These dyes maybe dyes that present cyan after a part of the chromophore has been dissociated, and the counter cations in that case may be inorganic cations, e.g., alkali metal and ammonium, or may be organic cations, e.g., pyridinium and quaternary ammonium salt, or the counter cations may be polymer cations having these cations as the partial structure.

Water-soluble dyes, e.g., direct dyes, acid dyes, food dyes, basic dyes, and reactive dyes can also be used. Preferred dyes of such dyes are listed below:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247

C.I. Direct Violet 7, 9, 47, 48, 51, 66, 90, 93, 94, 95, 98, 100, 101

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397

C.I. Acid Violet 5, 34, 43, 47, 48, 90, 103, 126

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326

C.I. Acid Black 7, 24, 29, 48, 52:1, 172

C.I. Reactive Red 3, 13, 17, 19, 21, 22, 23, 24, 29, 35, 37, 40, 41, 43, 45, 49, 55

C.I. Reactive Violet 1, 3, 4, 5, 6, 7, 8, 9, 16, 17, 22, 23, 24, 26, 27, 33, 34

C.I. Reactive Yellow 2, 3, 13, 14, 15, 17, 18, 23, 24, 25, 26, 27, 29, 35, 37, 41, 42

C.I. Reactive Blue 2, 3, 5, 8, 10, 13, 14, 15, 17, 18, 19, 21, 25, 26, 27, 28, 29, 38

C.I. Reactive Black 4, 5, 8, 14, 21, 23, 26, 31, 32, 34

C.I. Basic Red 12, 13, 14, 15, 18, 22, 23, 24, 25, 27, 29, 35, 36, 38, 39, 45, 46

C.I. Basic Violet 1, 2, 3, 7, 10, 15, 16, 20, 21, 25, 27, 28, 35, 37, 39, 40, 48

C.I. Basic Yellow 1, 2, 4, 11, 13, 14, 15, 19, 21, 23, 24, 25, 28, 29, 32, 36, 39, 40

C.I. Basic Blue 1, 3, 5, 7, 9, 22, 26, 41, 45, 46, 47, 54, 57, 60, 62, 65, 66, 69, 71

C.I. Basic Black 8

Further, in the present invention, ink in which pigments are used with dyes can be used.

Commercially available products and well-known pigments described in various literatures can be used in the invention. With respect to literatures, compiled by The Society of Dyers and Colourists, *Color Index,* compiled by Nippon Ganryo Gijutsu Kyokai, *Kaitei Shinpan Ganryo Binran* (*Revised Edition, Pigment Handbook*), (1989), *Saishin Ganryo Oyo Gijutsu* (*The Latest Applied Technology of Pigments*, CMC Publishing Co. (1986), *Insatsu Ink Gijutsu* (*Technology of Printing Ink*), CMC Publishing Co. (1984), and W. Herbst and K. Hunger, *Industrial Organic Pigments*, VCH Verlagsgesellschaft (1993) are known. Specifically, as organic pigments, azo pigments (azo lake pigments, insoluble azo pigments, synthesis azo pigments, chelate azo pigments), polycyclic pigments (phthalocyanine pigments, anthraquinone pigments, perylene and perinone pigments, indigo pigments, quinacridone pigments, dioxazine pigments, isoindolinone pigments, quinophthalone pigments, diketopyrrolopyrrole pigments), lake pigments (lake pigments of acid dye or basic dye), and azine pigments; as inorganic pigments, C.I. Pigment Yellow 34, 37, 42, 53, C.I. Pigment Red 101, 108, C.I. Pigment Blue 27, 29, 17:1, C.I. Pigment Black 7, magnetite, C.I. Pigment White 4, 6, 18, 21 are exemplified.

As pigments having preferred tone for image formation, blue or cyan pigments, e.g., phthalocyanine pigments, anthraquinone series indanthrone pigments (e.g., C. I. Pigment Blue 60), lake pigment series triarylcarbonium pigments are preferred, and phthalocyanine pigments (as preferred examples, copper phthalocyanine, monochloro- or low chlorination copper phthalocyanine, such as C.I. Pigment Blue 15:1, 15:2, 15:3, 15:4, 15:6, as aluminum phthalocyanine, pigments disclosed in EP-860475, nonmetal phthalocyanine, i.e., C.I. Pigment Blue 16, phthalocyanine having Zn, Ni or Ti as central metal, and, of these pigments, C.I. Pigment Blue 15:3 and 15:4, and aluminum phthalocyanine are particularly preferred) are most preferred.

As red and violet pigments, azo pigments (as preferred examples, C.I. Pigment Red 3, 5, 11, 22, 38, 48:1, 48:2, 48:3, 48:4, 49:1, 52:1, 53:1, 57:1, 63:2, 144, 146, 184 are exemplified, and C.I. Pigment Red 57:1, 146, 184 are particularly preferred), quinacridone pigments (as preferred examples, C. I. Pigment Red 122, 192, 202, 207, 209, C.I. Pigment Violet 19, 42 are exemplified, and C.I. Pigment Red 122 is particularly preferred), lake pigments series triarylcarbonium pigments (as preferred examples, xanthene series C.I. Pigment Red 81:1, C.I. Pigment Violet 1, 2, 3, 27, 39 are exemplified), dioxazine pigments (e.g., C.I. Pigment Violet 23, 37), diketopyrrolo-pyrrole pigments (e.g., C.I. Pigment Red 254), perylene pigments (e.g., C.I. Pigment Violet 29), anthraquinone pigments (e.g., C.I. Pigment Violet 5:1, 31, 33), and thioindigo pigments (e.g., C.I. Pigment Red 38, 88) are preferably used.

As yellow pigments, azo pigments (as preferred examples, monoazo pigment series C.I. Pigment yellow 1, 3, 74, 98, disazo pigment series C.I. Pigment yellow 12, 13, 14, 16, 17, 83, synthesis azo series C.I. Pigment yellow 93, 94, 95, 128, 155, benzimidazole series C.I. Pigment yellow 120, 151, 154, 156, 180, and particularly preferred pigments are those not using benzidine compounds as materials), isoindoline-isoindolinone pigments (as preferred examples, C.I. Pigment yellow 109, 110, 137, 139), quinophthalone pigments (as preferred examples, C.I. Pigment yellow 138), and flavanthrone pigments (e.g., C.I. Pigment yellow 24) are preferably used.

As black pigments, inorganic pigments (carbon black and magnetite are preferred) and aniline black can be exemplified as preferred examples.

In addition to the above, orange pigments (C.I. Pigment Orange 13, 16) and green pigments (C.I. Pigment Green 7) may be used.

Pigments for use in the invention may be used as naked pigments, or may be subjected to surface-covering treatment. As surface treament methods, a method of surface-coating with resin or wax, a method of adhering a surfactant, and a method of bonding reactive materials (e.g., silane coupling agents, epoxy compounds, polyisocyanate, radicals generated from diazonium salts) on the surface of pigment are used, and these methods are described in the following literatures and patent specifications.

(1) *Kinzoku Sekken no Seishitsu to Oyo* (*Natures and Applications of Metal Soaps*), Saiwai Shobo Co.

(2) *Insatsu Ink Insatsu* (*Printing of Printing Ink*), CMC Publishing Co.

(3) *Saishin Ganryo Oyo Gijutsu* (*The Latest Applied Technology of Pigments*, CMC Publishing Co.

(4) U.S. Pat. Nos. 5,554,739 and 5,571,311

(5) JP-A-9-151342, JP-A-10-140065, JP-A-10-292143 and JP-A-11-166145

In particular, the self-dispersible pigments prepared by reacting carbon black with diazonium salt as disclosed in U.S. patents in (4), and capsulated pigments prepared by the methods as disclosed in Japanese patents disclosed in (5) are effective for capable of achieving dispersion stability without using extra dispersants in ink.

In the present invention, pigments may be further dispersed with a dispersant. Various well-known kinds of dispersants, e.g., low molecular dispersants of a surfactant type and high molecular dispersants can be used. The examples of dispersants are disclosed in JP-A-3-69949and EP-549486 can be used. Further, for accelerating the adsorption of dispersants onto pigments, pigment derivatives called a synergist may be used with pigments.

The particle size of pigments usable in the invention is preferably from 0.01 to 10 μm after dispersion, and more preferably from 0.05 to 1 μm.

For dispersing pigments, well-known dispersing techniques used in manufacturing inks and toners can be used. As dispersers, vertical or horizontal agitator mill, attritor, colloid mill, ball mill, three-roll mill, pearl mill, super mill, impeller, disperser, KD mill, dynatron and pressure kneader are exemplified. The details of dispersing methods are described in *Saishin Ganryo Oyo Gijutsu* (*The Latest Applied Technology of Pigments*, CMC Publishing Co. (1986).

As water-soluble dyes, magenta dyes disclosed in JP-A-2002-371214, phthalocyanine dyes disclosed in JP-A-2002-309118, and water-soluble phthalocyanine dyes disclosed in JP-A-2003-12952 and JP-A-2003-12956 are also preferably used.

The ink of the invention can be manufactured by blending a dye with an aqueous medium. As the means of blending, solution and/or dispersion are preferred. “An aqueous medium” in the invention means water or a solution comprising water and components, such as a solvent, e.g., a water-miscible organic solvent, a wetting agent, a stabilizer and an antiseptic added according to necessity.

Water-miscible organic solvents usable in the invention are materials having the functions of prevention of drying of ink for ink jet recording, acceleration of penetration, and as a wetting agent, and mainly high boiling point water-miscible organic solvents are mainly used. As such compounds, alcohols (e.g., methanol, ethanol, propanol, isopropanol, butanol, isobutanol, sec-butanol, t-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thio-diglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol mono-methyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amine (e.g., ethanolamine, diethanolamine, triethanolamine, N-methyldiethanolamine, N-ethyldiethanolamine, morpholine, N-ethylmorpholine, ethylenediamine, diethylenetriamine, triethyenetetramine, polyethyeneimine, polyethyleneimine, tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrdrolidone, 2-oxazolidone, 1,3-dimethyl-2-imidazolidinone, acetonitrile, acetone) are exemplified. Two or more water-miscible organic solvents may be used in combination.

Of the above water-miscible organic solvents, alcohol-based solvents are preferred. It is preferred for the ink of the invention to contain water-miscible organic solvents having a boiling point of 150° C. or more, e.g., the above-exemplified 2-pyrrolidone is exemplified.

These water-miscible organic solvents are preferably contained in ink from 5 to 60 mass % in total, particularly preferably from 10 to 45 mass %.

In preparing the ink for use in the invention, when the dye is water-soluble, it is preferred to dissolve the dye in water in the first place. Thereafter, various solvents and additives are added and solved, to thereby prepare homogeneous ink.

Dissolution by stirring, dissolution by ultrasonic wave irradiation, and dissolution by shaking can be used at this time for dissolution. Stirring method is particularly preferably used. For dissolution by stirring, various methods well-known in this industry can be utilized, such as fluid stirring, reverse agitation, stirring using shear force by dissolver. On the other hand, a stirring method using the shear force with the base of a vessel such as magnetic stirrer can also be preferably used.

By adding surfactants to the ink of the invention, the physical properties of ink are adjusted, as a result excellent effects can be obtained, such as the improvement of ejection property of the ink, waterproofing property of images, and the prevention of blotting of printed ink.

As surfactants, anionic surfactants, e.g., sodium dodecylbenzenesulfonate, sodium dodecyloxysulfonate, and sodium alkylbenzenesulfonate, cationic surfactants, e.g., cetylpyridinium chloride, trimethylcetylammonium chloride, and tetrabutylammonium chloride, and nonionic surfactants, e.g., polyoxyethylene nonylphenyl ether, polyoxyethylene naphtyl ether, and polyoxyethylene octylphenyl ether are exemplified. Nonionic surfactants are particularly preferably used.

The content of surfactants is from 0.001 to 20 mass % of the ink, preferably from 0.005 to 10 mass %, and more preferably from 0.01 to 5 mass %.

When the dye is oil-soluble, the oil-soluble dye is dissolved in a high boiling point organic solvent, and then emulsion-dispersed in an aqueous medium.

The boiling point of high boiling point organic solvents for use in the invention is 150° C. or more, preferably 170° C. or more.

The examples of high boiling point organic solvents include phthalates (e.g., dibutylphthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl)phthalate), phosphates or phosphonates (e.g., diphenyl phosphate, triphenyl phosphate, tricresyl phosphate, 2-ethyhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoates (e.g., 2-ethylhexyl benzoate, 2,4-dichlorobenzoate, dodecyl benzoate, 2-ethylhexyl-p-hydroxy benzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., butoxyethyl succinate, di-2-ethylhexyl succinate, 2-hexyldecyltetradecanoate, tributylcitrate, diethylazelate, isostearyl lactate, trioctyl citrate), aniline derivatives (e.g., N,N-dibutyl-2-butoxy-5-tert-octyl aniline), chlorinated paraffins (paraffins containing from 10 to 80% of chlorine), trimesates (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid), and alkylphosphoric acids (e.g., di-2-(ethylhexyl)phosphoric acid, diphenylphosphoric acid). High boiling point organic solvents are used in an amount of from 0.01 to 3 time amount in a mass ratio of oil-soluble dyes, preferably from 0.01 to 1.0 time amount.

High boiling point organic solvents may be used alone or may be used as mixture of several kinds (e.g., combination of tricresyl phosphate and dibutyl phthalate, combination of trioctyl phosphate and di (2-ethylhexyl) sebacate, combination of dibutyl phthalate and poly(N-t-butylacrylamide)).

High boiling point organic solvents usable in the present invention other than the above compounds and/or synthesis methods of these high boiling point organic solvents are disclosed in the following patent: U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, EP-A-276319, EP-A-286253, EP-A-289820, EP-A-309158, EP-A-309159, EP-A-309160, EP-A-509311, EP-A-510576, East German Patent Nos. 147,009, 157,147, 159,573, 225,240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

High boiling point organic solvents are used in a mass ratio of from 0.01 to 3.0 time amount of oil-soluble dyes, preferably from 0.01 to 1.0 time amount.

Oil-soluble dyes and high boiling point organic solvents are emulsification dispersed in an aqueous medium. In emulsification dispersion, low boiling point organic solvents can be used in some cases from the point of emulsification properties. Low boiling point organic solvents are organic solvents having a boiling point of about from 30 to 150° C. at normal pressure. As low boiling point organic solvents, esters (e.g., ethyl acetate, butyl acetate, ethyl propionate, β-ethoxyethyl acetate, methyl cellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone), and ethers (e.g. tetrahydrofuran, dioxane) are preferably used, but the present invention is not limited thereto.

Emulsification dispersion is performed to form minute oil droplets by dispersing an oil phase in a water phase mainly comprising water. The oil phase is formed by dissolving a dye in a high boiling point organic solvent, or a mixed solvent of a high boiling point organic solvent and a low boiling point organic solvent according to circumstances. At this time, components, e.g., a surfactant, a wetting agent, a dye stabilizer, an emulsion stabilizer, an antiseptic and an antifungal agent can be added to either a water phase or an oil phase or both, according to necessity.

Emulsification is generally performed by a method of adding an oil phase to a water phase, but a so-called phase reversal emulsification of adding a water phase to an oil phase can also be preferably used. This emulsification method can also be applied to the case where a dye is water-soluble and components are water-soluble.

Various surfactants can be used in emulsification dispersion. For example, anionic surfactants, e.g., fatty acid salt, alkylsulfate, alkylbenzenesulfonate, alkylnaphthalenesulfonate, dialkylsulfosuccinate, alkylphosphate, condensation product of naphthalenesulfonic acid and formalin, and polyoxyethylenealkylsulfate, and nonionic surfactants, e.g., polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerol fatty acid ester, and oxyethyleneoxypropylene block copolymers are preferably used. SURFYNOLS (a product of Air Products & Chemicals Co.), which is an acetylene series polyoxyethylene oxide surfactant, is also preferably used. Further, amine oxide type amphoteric surfactants, e.g., N,N-dimethyl-N-alkylamine oxide are also preferred. Surfactants described in JP-A-59-157636, pp. 37 and 38, *Research Disclosure*, No. 308119 (1989) can also be used.

For the purpose of stabilization just after emulsification, water-soluble polymers can be used in combination with these surfactants. As water-soluble polymers, polyvinyl alcohol, polyvinyl pyrrolidone, polyethylene oxide, polyacrylic acid, polyacrylamide, and copolymers of these polymers are preferably used. It is also preferred to use natural water-soluble polymers, e.g., polysaccharide, casein and gelatin. For stabilizing dispersed solution of dyes, polyvinyl obtained by polymerization of acrylates, methacrylates, vinyl esters, acrylamides, methacrylamides, olefins, styrenes, vinyl ethers and acrylonitriles which are substantially insoluble in an aqueous medium, polyurethane, polyester, polyamide, polyurea and polycarbonate can be used in combination. It is preferred that these polymers contain $—SO_3^-$ and $—COO^-$. When these polymers substantially insoluble in an aqueous medium are used in combination, the content of these polymers is preferably 20 mass % or less of the high boiling point organic solvent, more preferably 10 mass % or less.

When water ink is manufactured by dispersing oil-soluble dyes and a high boiling point organic solvent by emulsification dispersion, controlling of the particle size is very important. It is essential to make an average particle size of ink small for increasing color purity and density in forming images bny ink jet. The particle size is preferably 1 μm or less by volume average particle size, more preferably from 5 to 100 nm.

The volume average particle size and particle size distribution of the dispersed particles can be easily measured by well-known methods, for example, by a static light scattering method, a dynamic light scattering method, a centrifugal precipitation method, and a method described in *Jikken Kagaku Koza* (*Experimental Chemistry*), $4^{th}$ Edition, pp. 417 and 418 can be used. For example, volume average particle size can be easily measured by diluting ink with distilled water so that the particle concentration in the ink becomes from 0.1 to 1 mass % and measuring with commercially available volume average particle size measuring apparatus (e.g., Micro Track UPA (a product of Nikkiso Co.). Further, a dynamic light scattering method utilizing laser Doppler effect can measure even small sizes, thus particularly preferred.

Volume average particle size is an average particle size weighted with particle volume. This is the value obtained by multiplying the diameter of individual particle, in the aggregation of particles, by the volume of the particle, and dividing the sum total of the above obtained values by the total volume of the particles. Volume average particle size is described in Soichi Muroi, *Kobunshi Latex no Kagaku* (*Chemistry of Polymer Latex*), p. 119, published by Kobunshi-kai.

It has been found that coarse particles have a large influence upon printing performance. That is the nozzle of head is clogged with coarse particles, or coarse particles cause ejection failure or unevenness of ink ejection by generating dirt, even if nozzle is not clogged, and greatly affect printing performance. For preventing these things, it is important to suppress the number of particles having a particle size of 5 μm to 10 particles or less in 1 μl of ink, particles of 1 μm to 100 or less.

For removing these coarse particles, well-known centrifugal separation and fine filtration can be used. Separation may be performed just after emulsification dispersion, or may be performed after the addition of various components such as a wetting agent and a surfactant to the emulsified dispersed solution and immediately before being filled in an ink cartridge.

A mechanical emulsifier can be used as an effective means for making average particle size smaller and lessening coarse particles.

As emulsifiers, well-known apparatus such as a simple stirrer and an impeller stirring method, an in-line stirring method, a milling method such as colloidmill, and an ultrasonic system can be used, but a high pressure homogenizer is particularly preferred.

The mechanism of high pressure homogenizers is disclosed in U.S. Pat. No. 4,533,254 and JP-A-6-47264 in detail. As commercially available products, Gaulin Homogenizer (a product of A.P.V. GAULIN INC.), Microfluidizer (a product of MICROFLUIDEX INC.) and Ultimizer (a product of SUGINO MACHINE LIMITED) can be used.

A high pressure homogenizer having mechanism of atomization in super high pressure as disclosed in U.S. Pat. No. 5,720,551 in recent years is particularly effective for the emulsification dispersion in the present invention. As the example of the emulsifier using the super high pressure, DeBEE 2000 (manufactured by BEE INTERNATIONAL LTD.) is exemplified.

Pressure of performing emulsification with a high pressure emulsifier is 50 Mpa or more, preferably 60 Mpa or more, and more preferably 180 Mpa or more.

It is particularly preferred to use two or more kinds of emulsifiers, e.g., by a stirring emulsifier and then a high pressure homogenizer. It is also preferred to perform emulsification once with these emulsifiers, then components such as a wetting agent and a surfactant are added to the emulsion, and the emulsion is again emulsified with a high pressure homogenizer immediately before being filled in an ink cartridge.

When a low boiling point organic solvent is used in addition to a high boiling point organic solvent, it is preferred to remove the low boiling point organic solvent from the point of the stability of the emulsified product and safety and hygiene. A low boiling point organic solvent can be removed by various well-known methods according to the kind of solvent, e.g., evaporation, vacuum evaporation and ultrafiltration. This process of removal of low boiling point organic solvent is preferably performed as soon as possible after the emulsification process.

Manufacturing methods of ink, in particular ink for ink jet recording, are disclosed in detail in JP-A-5-148436, JP-A-5-295312, JP-A-7-97541, JP-A-7-82515 and JP-A-7-118584 and these methods can be used in the invention.

Various functional components can be added to the ink of the invention to give various functions to the ink. As the functional components, e.g., various solvents, a drying inhibitor for inhibiting clogging of ink at nozzles due to drying, a penetration accelerator to accelerate sufficient penetration of ink into paper, an ultraviolet absorber, an antioxidant, a viscosity adjustor, a surface tension adjustor, a dispersant, a dispersion stabilizer, an antifungal agent, a rust preventive, a pH adjustor, a defoaming agent and a chelating agent are exemplified. The ink of the invention can contain these functional components by appropriate selection in appropriate amounts. One compound may have one or two or more functions as the functional component. Accordingly, in the blending ratios of functional components, when a compound has two or more functions, the compound is included in each functional component independently.

As drying inhibitors for use in the present invention, water-soluble organic solvents having lower vapor pressure than water are preferably used. The specific examples of these drying inhibitors include polyhydric alcohols, e.g., ethylene glycol, propylene glycol, diethylene glycol, polyethylene glycol, thiodiglycol, 2-methyl-1,3-propanediol, 1,2,6-hexanetriol, acetylene glycol derivative, glycerol, and trimethylolpropane, lower alkyl ethers of polyhydric alcohols, e.g., ethylene glycol monomethyl (or ethyl) ether, diethylene glycol monomethyl (or ethyl) ether, and triethylene glycol monoethyl (or butyl) ether, heterocyclic rings, e.g., 2-pyrrolidone, N-methyl-2-pyrrolidone, 1,3-dimethyl-2-imidazolidinone, and N-ethylmorpholine, sulfur-containing compounds, e.g., sulfolane, dimethyl sulfoxide and 3-sulfolene, polyfunctional compounds, e.g., diacetone alcohol and diethanolamine, and urea derivatives. Of these compounds, polyhydric alcohols such as glycerol and diethylene glycol are more preferred. These drying inhibitors may be used alone or two or more in combination. Drying inhibitors are preferably contained in ink in an amount of from 10 to 50 mass %.

As penetration accelerators, alcohols, e.g., ethanol, isopropanol, butanol, di(tri)ethylene glycol monobutyl ether, and 1,2-hexanediol, sodium laurylsulfate, sodium oleate, and nonionic surfactants can be used. The amount of from 10 to 30 mass % is sufficient, and it is preferred to use penetration accelerators in the amount not to cause blotting by printing and print through.

As ultraviolet absorbers used in the invention to improve preservation stability of images, benzotriazole compounds as disclosed in JP-A-58-185677, JP-A-61-190537, JP-A-2-782, JP-A-5-197075, and JP-A-9-34057, benzophenone compounds as disclosed in JP-A-46-2784, JP-A-5-194483 and U.S. Pat. No. 3,214,463, cinnamic acid compounds as disclosed in JP-B-48-30492, JP-B-56-21141 and JP-A-10-88106, triazine compounds as disclosed in JP-A-4-298503, JP-A-8-53427, JP-A-8-239368, JP-A-10-182621 and JP-T-8-501291, compounds as described in *Research Disclosure*, No. 24239, and fluorescent whitening agents which absorb stilbene and benzoxazole compounds and emit fluorescence are used.

As antioxidant for improving preservation stability of images, various organic and metal complex discoloration inhibitors can be used in the invention. As organic discoloration inhibitors, hydroquinones, alkoxyphenols, dialkoxyphenols, phenols, anilines, amines, indanes, chromans, alkoxyanilines, and heterocyclic rings are used, and as metal complexes, nickel complexes and zinc complexes are used. Specifically, compounds described in the patents cited in *Research Disclosure,* No. 17643, VII to J, ibid., No. 15162, ibid., No. 18716, p. 650, left column, ibid., No. 36544, p. 527, ibid., No. 307105, p. 872, ibid., No. 15162, and the formulae of representative compounds and exemplified compounds as disclosed in JP-A-62-215272, pp. 127 to 137 can be used.

As an antifungal agent, sodium dehydroacetate, sodium benzoate, sodium pyridinethione-1-oxide, p-hydroxyethylbenzoate, 1,2-benzisothiazolin-3-one and the salt thereof are exemplified. It is preferred to use antifungal agents in an amount of from 0.02 to 5.00 mass % in ink.

Antifungal agents are described in detail in *Bohkin Bohbai Zai Jiten* (*Dictionary of Antibacterial agents and Antifungal Agents*), compiled by Nippon Bohkin Bohbai Gakkai Dictionary Editing Committee.

As rust preventives, e.g., acid sulfite, sodium thiosulfate, ammon thioglycolate, diisopropylammoniumnitrite, pentaerythritol tetranitrate, dicyclohexylammonium nitrite and benzotriazole are exemplified. Rust preventives are prferably used in an amount of from 0.02 to 5.00 mass % in ink.

A pH adjustors can be preferably used in the point of pH adjustment and impartation of dispersion stability. It is preferred that the pH of ink at 25° C. is adjusted to 8 to 11. When pH is less than 8, the solubility of dyes lowers, which is liable to cause clogging of nozzles, while when pH is higher than 11, waterproofing property is liable to lower. As pH adjustors, organic bases and inorganic alkalis as basic compounds, and organic acids and inorganic acids as acid compounds are exemplified.

As basic compounds, inorganic compounds, e.g., sodium hydroxide, potassium hydroxide, sodium carbonate, potassium carbonate, sodium hydrogencarbonate, potassium hydrogen-carbonate, sodium acetate, potassium acetate, sodium phosphate, and sodium monohydrogenphosphate, and organic bases, e.g., aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine can be used.

As acid compounds, inorganic compounds, e.g., chloric acid, sulfuric acid, phosphoric acid, boric acid, sodium hydrogensulfate, potassium hydrogensulfate, potassium dihydrogenphosphate, and sodium dihydrogenphosphate, and organic acids, e.g., acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolinic acid and quinolinic acid can also be used.

Conductivity of ink in the invention is from 0.01 to 10 S/m, and particularly preferably from 0.05 to 5 S/m.

Conductivity of ink can be measured by an electrode method using commercially available saturated potassium chloride.

Conductivity can be controlled primarily by the ion concentration. When salt concentration is high, demineralization is performed through ultrafilter. When conductivity is controlled by the addition of salts, various organic and inorganic salts are effective.

As inorganic salts, inorganic compounds, e.g., potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogenphosphate and sodium dihydrogenphosphate, and organic compounds, e.g., sodium acetate, potassium acetate, potassium tartrate, sodium tartrate, sodium benzoate, potassium benzoate, sodium p-toluenesulfonate, potassium caccharinate, potassium phthalate and sodium picolinate can be used.

Conductivity can also be controlled by the selection of the components of aqueous medium as described later.

The viscosity of the ink in the invention is preferably from 1 to 30 mPa·s at 25° C., more preferably from 2 to 15 mPa·s, and particularly preferably from 2 to 10 mPa·s. When the viscosity exceeds 30 mPa·s, the fixing speed of recorded images becomes slow and ejecting property also lowers. When it is less than 1 mPa·s, recorded image is accompanied by blotting, so that the grade deteriorates.

Viscosity can be arbitrarily controlled by the addition amount of ink solvents. As the ink solvents, e.g., glycerol, diethylene glycol triethanolamine, 2-pyrrolidone, diethylene glycol monobutyl ether, and triethylene glycol monobutyl ether can be used.

A viscosity adjust or may be used. As viscosity adjustors, celluloses, water-soluble polymers, e.g., polyvinyl alcohol, and nonionic surfactants are exemplified. Viscosity adjustors are described in detail in *Nendo Chosei Gijutsu* (*Techniques of Viscosity Adjustment*), Chapter 9, Gijutsu Joho Kyokai (1999), and *Chemicals for Ink Jet Printer* (98 *zoho*)—*Zairyo no Kaihatsu Doko, Tenbo Chosa* (*Chemicals for Ink Jet Printer* (98 *enlargement*)—*Trend of Material Development, Investigation of View*), pp. 162 to 174, CMC Publishing Co. (1997).

A measuring method of the viscosity of liquid is described in detail in JIS Z8803, but it can be measured easily with a commercially available viscometer. For instance, B type viscometer and E type viscometer (manufactured by Tokyo Keiki Co) are known as a rotary type. In the invention, measurement was performed with an oscillating type MV-100A-L type (manufactured by YAMAICHI ELECTRONICS Co., Ltd.) at 25° C. The unit of viscosity is Pascal second (Pa·s) but generally milli Pascal second (mPa·s) is used.

It is preferred in the present invention that the surface tension of ink at 25° C. is from 20 to 50 mN/m, preferably from 20 to 40 mN/m, in both dynamic and static surface tention. When the surface tension is higher than 50 mN/m, ejection stability lowers, blotting occurs at mixing time and the qualities of printed characters conspicuously deteriorate such that whiskers appear. When the surface tension is lower than 20 mN/m, printing failure sometimes occurs due to the adhesion of ink to the surface of hardware.

Various kinds of surfactants such as cationic, anionic, nonionic and betaine surfactants can be used for the purpose of adjusting surface tension. Surfactants can be used in combination of two or more.

As measuring methods of static surface tension, a capillary rise method, a dropping method and a ring method are known. A vertical sheet method is used in measuring static surface tension in the invention.

When a part of a thin sheet of glass or platinum is immersed in a liquid and hung vertically, the surface tension of the liquid works downward along the length where the liquid and the sheet are in contact. Static surface tension can be measured with equilibrating this force by upward force.

As measuring methods of dynamic surface tension, a oscillation jet method, a meniscus dropping method and a maximum bubble pressure method as described in *Shin-Jikken Kagaku Koza* (*New Experimental Chemistry*), Vol. 18, "Kaimen to Colloid (Interface and Colloid)", pp. 69 to 90, Maruzen Co. (1977) are known, further, as disclosed in JP-A-3-2064, a liquid film breaking method is known. In the present invention, a bubble pressure differential pressure method is used for the measurement of dynamic surface tension. The principle of measurement and measuring method are described below.

When bubbles are formed in a stirred and homogenized solution, new air-liquid interface is formed and surfactant molecules in the solution gather on the surface of the solution at a constant velocity. When a bubble rate (generating velocity of bubbles) is changed, if generating velocity slows down, more molecules of the surfactant gather on the surfaces of bubbles, thus the maximum bubble pressure becomes small and the maximum bubble (surface tension) to the bubble rate can be detected. As the preferred measuring method of dynamic surface tension, a method of generating bubbles in a solution with two probes, large and small, and computing the dynamic surface tension by measuring the differential pressure by two probes at the state of maximum pressure, can be exemplified.

It is preferred that nonvolatile components in the ink in the invention be from 10 to 70 mass % of the total amount of the ink from the point of ejection stability, fastness of the printed image quality, and the reduction of the blotting of images after printing and stickiness of the printed surface, and from 20 to 60 mass % is more preferred in view of the stability of ink ejection and the reduction of the blotting of images after printing.

"Nonvolatile components" means liquid and solid components and polymer components having a boiling point of 150° C. or higher under 1 atm. The nonvolatile components of ink, in particular ink for ink jet recording, are dyes, high boiling point solvents, polymer latexes added according to necessity, surfactants, dye stabilizers, antifungal agents and buffers. Many of these nonvolatile components except for dye stabilizers reduce the dispersion stability of ink, and they are present on image-receiving paper after printing, so that they hinder the stabilization of dyes by aggregation on image-receiving paper and deteriorate various image fastness and blotting of images under high humidity conditions.

Polymer compounds can be used in the invention. "Polymer compounds" means all the polymer compounds having number average molecular weight of 5,000 or more contained in ink. As such polymer compounds, water-soluble polymer compounds that are substantially dissolved in aqueous media, water-dispersible polymer compounds such as polymer latexes and polymer emulsions, and alcohol-soluble polymer compounds which are dissolved in polyhydric alcohols used as auxiliary solvents are exemplified, but if they are substantially homogeneously dissolved or dispersed in an ink solution, they are included in the polymer compounds according to the invention.

The specific examples of water-soluble polymer compounds include water-soluble polymer, e.g., polyvinyl alcohol, silanol-modified polyvinyl alcohol, carboxymethyl cellulose, hydroxyethyl cellulose, polyvinyl pyrrolidone, polyalkylene oxide and polyalkylene oxide derivatives, e.g., polyethylene oxide, and polypropylene oxide, natural water-soluble polymer, e.g., polysaccharide, starch, cationic starch, casein and gelatin, aqueous acrylate resin and aqueous alkyd resin, e.g., polyacrylic acid, polyacrylamide and copolymers of these compounds, and water-soluble polymer compounds having an $—SO_3^-$ or $—COO^-$ group in the molecules and water-soluble polymer compounds that are substantially dissolved in aqueous media.

As polymer latexes, styrene-butadiene latexes, styrene-acrylic latexes and polyurethane latexes are exemplified. As polymer emulsions, acryl emulsions are exemplified.

These water-soluble polymer compounds may be used alone or two or more of them may be use in combination.

As has been described, water-soluble polymer compounds are used as viscosity adjustor to adjust ink viscosity to a region of good ink ejection, but when the amount is too much, the viscosity increases and ejection stability of ink solution lowers, as a result nozzles are liable to clog with precipitates with the lapse of time.

Although the addition amount of polymer compound of a viscosity adjustor is dependent upon the molecular weight of the compound to be added (the higher the molecular weight, the less is the addition amount), the addition amount is from 0 to 5 mass % of the total amount of the ink, preferably from 0 to 3 mass %, and more preferably from 0 to 1 mass %.

In the invention, the above cationic, anionic, nonionic and betaine surfactants can be used as dispersants and dispersion stabilizers, and fluorine compounds, silicon compounds and chelating agens represented by EDTA can be used as defoaming agents.

Reflective recording media preferably used in the invention as printing media are further described below. As reflective recording media, recording paper and recording film are exemplified. The supports in recording paper and recording film comprise chemical pulp, e.g., LBKP and NBKP, mechanical pulp, e.g., GP, PGW, RMP, TMP, CTMP, CMP and CGP, and wastepaper pulp, e.g., DIP, and according to necessity, various additions, e.g., a conventionally well-known pigment, a binder, a size, a fixing agent, acationic agent, and a paper strength increasing agent are added thereto, and manufactured by various paper machines, e.g., Fourdrinier machine and cylinder paper machine. Other than these supports, any plastic film sheets can be used as supports. The thickness of a support is preferably from 10 to 250 μm and from 10 to 250 $g/m^2$ in weight.

An image-receiving layer and a back coat layer may be directly provided on a support to make an image receiving material of the ink and ink set of the invention, or an image-receiving layer and a back coat layer may be provided after providing size press or an anchor coat layer with starch and polyvinyl alcohol. A support may be subjected to calendering treatment with calendering apparatus, e.g., machine calender, TG calender or soft calender.

Paper and plastic film both surfaces of which are laminated with polyolefin (e.g., polyethylene, polystyrene, polybutene and copolymers of them) and polyethylene terephthalate are more preferably used as supports. It is preferred to add white pigments (e.g., titanium oxide, zinc oxide) or toning dyes (e.g., cobalt blue, ultramarine, neodymium oxide) to polyolefin.

An image-receiving layer provided on a support contains porous materials and aqueous binders. It is preferred for an image-receiving layer to contain a pigment, preferably a white pigment. The examples of white pigments include inorganic white pigments, e.g., calcium carbonate, kaolin, talc, clay, diatomaceous earth, synthetic amorphous silica, aluminum silicate, magnesium silicate, calcium silicate, aluminum hydroxide, alumina, lithopone, zeolite, bacium sulfate, calcium sulfate, titanium dioxide, zinc sulfide, and zinc carbonate, and organic pigments, e.g., styrene based pigments, acrylic based pigments, urea resins and melamine resins. Porous white inorganic pigments are particularly preferred, and synthetic amorphous silica having a large pore area is especially preferred. Both of silicic anhydride manufactured by a dry manufacturing method (a vapor phase method) and hydrous silicic acid manufactured by a wet manufacturing method can be used.

As recording paper having an image-receiving layer containing these pigments, those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314 can be used.

As aqueous binders contained in an image-receiving layer, water-soluble polymers, e.g., polyvinyl alcohol, silanol-modified polyvinyl alcohol, starch, cationic starch, casein, gelatin, carboxymethyl cellulose, hydroxyethyl cellulose, polyvinyl pyrrolidone, polyalkylene oxide and polyalkylene oxide derivatives, and water-dispersible polymers, e.g., styrene-butadiene latex and acrylic emulsion are exemplified. These aqueous binders may be used alone or in combination of two or more. In the present invention, polyvinyl alcohol and silanol-modified polyvinyl alcohol are particularly preferred of these in the point of adhering property to dyes and peeling resistance of an ink-receiving layer.

In addition to a pigment and an aqueous binder, an image-receiving layer can contain a mordant, a waterproofing agent, a light fastness improver, a gas resistance improver, a surfactant, a hardening agent and other additives.

A mordant to be added to an image-receiving layer is preferably immobilized. Polymer mordants are preferably used for that purpose.

Polymer mordants are disclosed in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A:-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. Image-receiving materials containing polymer mordants disclosed in JP-A-1-161236, pp. 212 to 215 are particularly preferred. By using polymer mordants disclosed in the above patent, images having excellent image quality can be obtained and light fastness of images is improved.

A waterproofing agent is effective for waterproof of images, and cationic resins are particularly preferred. The examples of cationic resins include polyamide polyamine epichlorohydrin, polyethyleneimine, polyaminesulfone, dimethyldiallylammonium chloride, and cationic polyacrylamide. The addition amount of cationic resins is preferably from 1 to 15 mass % of the total solid contents in an ink-receiving layer, and particularly preferably from 3 to 10 mass %.

As light fastness improvers and a gas resistance improvers, phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reduction compounds, organic acids, inorganic acids, hydroxyl group-containing organic acids, benzotriazole compounds, benzophenone compounds, triazine compounds, heterocyclic compounds, water-soluble metal salts, organic metal compounds and metal complexes are exemplified.

The specific examples of these compounds are disclosed in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258, and JP-A-11-321090.

Surfactants function as a coating assistant, a peeling improver, a sliding property improver or an antistatic agent. Surfactants are disclosed in JP-A-62-173463 and JP-A-62-183457.

Organic fluoro compounds may be used in place of surfactants. Organic fluoro compounds are preferably hydrophobic. The examples of organic fluoro compounds include fluorine surfactants, oily fluorine compounds (e.g., fluorine oil) and solid fluorine compounds (e.g., ethylene tetrafluoride resin). Organic fluoro compounds are disclosed in JP-B-57-9053 (columns from 8 to 17), JP-A-61-20994 and JP-A-62-135826.

Materials disclosed in JP-A-1-161236, p. 222, JP-A-9-263036, JP-A-10-119423, and JP-A-2001-310547 can be used as hardening agents.

Other additives to be added to an image-receiving layer include a pigment dispersant, a thickener, a defoaming agent, a dye, a fluorescent whitening agent, an antiseptic, a pH adjustor and a matting agent. An ink-receiving layer may comprise one layer or two layers.

Recording paper and recording film may be provided with a back coat layer, and a back coat layer may contain a white pigment, an aqueous binder and other components.

As white pigments added to a back coat layer, white inorganic pigments, e.g., precipitated calcium carbonate, ground limestone, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate, and magnesium hydroxide, and organic white pigments, e.g., styrene-based plastic pigments, acrylic-based plastic pigments, polyethylene, microcapsules, urea resins and melamine resins are exemplified.

As aqueous binders added to a back coat layer, water-soluble polymers, e.g., styrene/maleate copolymers, styrene/acrylate copolymers, polyvinyl alcohol, silanol-modified polyvinyl alcohol, starch, cationic starch, casein, gelatin, carboxymethyl cellulose, hydroxyethyl cellulose and polyvinyl pyrrolidone, and water-dispersible polymers, e.g., styrene-butadiene latex and acrylic emulsion are exemplified. As other components added to a back coat layer, a defoaming agent, a foam suppressing agent, a dye, a fluorescent whitening agent, an antiseptic and a waterproofing agent are exemplified.

Ink jet recording paper and the constitutional layers of recording film (including a back layer) may contain polymer fine particles. A dispersed product of polymer fine particles is used for the purpose of the improvement of physical properties of a film, e.g., dimensional stability, curling prevention, adhesion prevention, and cracking prevention. Polymer fine particles are disclosed in JP-A-62-245258, JP-A-62-136648 and JP-A-62-110066. When a dispersed product of polymer fine particles having a low glass transition temperature (40° C. or less) is added to a layer containing a mordant, cracking of the layer and curling can be prevented. Further, when a dispersed product of polymer fine particles having a high glass transition temperature is added to a back layer, curling can also be prevented.

The ink of the invention can be used for the use other than ink jet recording. For example, the ink of the invention can be used as materials of images for display, image-forming materials for indoor ornamentation, and image-forming materials for outdoor ornamentation.

Materials of images for display include various kinds of things, e.g., posters, wall paper, small articles for ornamentation (ornaments, dolls), commercial advertisements, packing paper, wrapping materials, plastic bags, packaging materials, signboards, images painted or stuck on the side of the means of traffic (automobiles, buses, streetcars) and clothes with logotypes. When the dyes of the invention are used as the as image-forming materials for display, "image" includes every pattern by dyes that human being can appreciate, e.g., abstract designs, characters and geometrical patterns besides an image in a narrow sense.

Materials for indoor ornamentation include wall paper, small articles for ornamentation (ornaments, dolls), members of lighting equipment, members of furniture, and designed members of floor and ceiling. When the dyes of the invention are used as the as image-forming materials, "image" includes every pattern by dyes that human being can appreciate, e.g., abstract designs, characters and geometrical patterns besides an image in a narrow sense.

Materials for outdoor ornamentation include wall materials, roofing materials, signboards, materials for gardening such as small articles for outdoor ornamentation (ornaments, dolls), and members of outdoor lighting equipment. When the dyes of the invention are used as the as image-forming materials, "image" includes every pattern by dyes that human being can appreciate, e.g., abstract designs, characters and geometrical patterns besides an image in a narrow sense.

In the above uses, as the media on which patterns are formed, various kinds of things can be exemplified, e.g., paper, fiber, fabric (including nonwoven fabric), plastics, metals and ceramics. As the dyeing forms, mordanting, textile printing, and fixing dyes in the form of reactive dyes where reactive groups are introduced can be possible. Of these mordanting is a preferred form of dyeing.

In the manufacture of ink, ultrasonic oscillation can be utilized in a dissoving process of additives; e.g., dyes.

For the purpose of preventing ink from generating bubbles by the pressure applied to a recording head, ultrasonic oscillation is applied to give ultrasonic energy equal to or higher than the energy received by a recording head to the manufacturing process of ink in advance to remove bubbles.

Ultrasonic oscillation is ultrasonic wave of frequency of generally 20 kHz or more, preferably 40 kHz or more, and more preferably 50 kHz or more. The energy given to the liquid by ultrasonic oscillation is generally $2\times10^7$ J/m$^3$ or more, preferably $5\times10^7$ J/m$^3$ or more, more preferably $1\times10^8$ J/m$^3$ or more. The time of impartation of ultrasonic oscillation is generally from 10 minutes to 1 hour.

Ultrasonic oscillation may be applied anytime so long as it is after the introduction of dyes to a medium. It is also effective to give ultrasonic oscillation to finished ink after it has been once preserved. However, giving ultrasonic oscillation during dissolving and/or dispersing dyes in a medium is greater in the effect of removing bubbles, and the dissolution and/or dispersion of dyes in a medium is acclerated, so that this method is preferred.

That is, a process of at least applying ultrasonic oscillation can be performed in a process of dissolving and/or dispersing dyes in a medium and after the process. In other words, the process of at least applying ultrasonic oscillation can be arbitrarily performed one or more times after manufacturing ink until the ink becomes a product.

As the mode for carrying out ultrasonic oscillation, it is preferred that the process of dissolution and/or dispersion of dyes in a medium comprise a process of dissolving dyes in a part of the entire medium, and a process of blending the remaining medium. It is preferred to give ultrasonic oscillation at least in either case of the above processes, and it is more preferred to give ultrasonic oscillation at least in the process of dissolving dyes in a part of the entire medium.

The process of blending the remaining solvent may comprise a single process or two or more processes.

It is preferred to use heating deaeration and vacuum deaeration in combination in the manufacture of the ink in the invention to increase the effect of removing bubbles in the ink. Heating deaeration or vacuum deaeration is preferably performed at the same time with or after the process of blending the remaining medium.

As the means of generating ultrasonic oscillation in the process of applying ultrasonic oscillation, well-known apparatus such as ultrasonic disperser is exemplified.

In manufacturing the ink of the invention, a process of removing contaminants performed after ink solution has been prepared is important. A filter is used in this process, and the filter used at this time has an effective size of 1 μm or less, preferably from 0.05 to 0.3 μm, and particularly preferably from 0.25 to 0.3 μm. Various materials can be used as the material of the filter, but it is preferred to use filters manufactured for water-based solvent in the case of inks comprising water-soluble dyes. Filters made of polymer materials hardly generating contaminants are particularly preferred. Filtration can be performed by any of a method of passing a solution through a filter by feeding, pressure filtration and vacuum filtration.

In many cases air is taken into a solution after filtration. Since foams due to the aeration cause the unevenness of images in many cases in ink jet recording, it is preferred to provide a defoaming process separately. As the method of defoaming, various methods can be utilized, e.g., a solution after filtration may be stand, or methods of ultrasonic defoaming and vacuum defoaming by commercially available apparatus can be used. In the case of ultrasonic defoaming, time required for defoaming is preferably from 30 seconds to 2 hours, more preferably from 5 minutes to 1 hour.

It is preferred to perform operations in a clean room or to work by making use of a space such as a clean bench for preventing the contamination of dusts at working time. In the invention, it is particularly preferred to carry out operations in a space with the degree of cleanliness of class 1,000 or lower. "The degree of cleanliness" used here indicates the value measured by a dust counter.

The volume of ink droplet ejected on an ink-recording material in the invention is from 0.1 to 100 pl. The preferred range of the volume of ejected ink droplet is from 0.5 to 50 pl, particularly preferably from 2 to 50 pl.

In the present invention, methods of ink jet recording are not restricted so long as the method used is a method of performing image recording by an ink jet printer with the ink or ink set of the invention and well-known methods can be used. For example, the ink or ink set of the invention is used in an electrical charge controlling method of ejecting ink droplets by making use of electrostatic induction force, a drop on demand method (a pressure pulse method) of ejecting ink droplets by making use of vibratory pressure of piezo-elements, an acoustic ink jet method of ejecting ink droplets by converting electric signal to acoustic beam and irradiating ink, and making use of the radiation pressure, and a thermal ink jet method (bubble jet method) of ejecting ink droplets by heating ink to thereby generate bubbles, and making use of generated pressure.

Ink jet recording method includes a method of ejecting a great number of minute sizes of ink droplets of so-called photo-ink of low concentration, a method of improving image quality by using a plurality of inks having substantially the same hue and different densities, and a method of using colorless and transparent ink. The control of the volume of ejected ink droplet is mainly performed by a print head.

For example, it is possible to control the volume of ejected ink droplet by the structure of a printing head in the case of thermal ink jet recording system. That is, desired the volume of ejected ink droplet can be obtained by changing the sizes of an ink chamber, a heating part and nozzles. It is also possible even in a thermal ink jet method to realize a plurality of volumes of ejected ink droplets by mounting a plurality of print heads respectively different in sizes of heating parts and nozzles.

In the case of a drop on demand method using piezo-elements, the volume of ejected ink droplet can be changed from the viewpoint of the structure of the print head as in the case of a thermal ink jet method, but it is possible to perform recording with a plurality of sizes of the volumes of ejected ink droplets with the print head of the same structure by controlling the wave form of the driving signal of the piezo-elements, as described below.

The ejection frequency of the ink of the invention in ejecting is preferably 1 KHz or more.

For recording an image of high quality as a photograph, it is necessary that droplet density be 600 dpi (dot per inch) or more to realize a sharp image of high quality with small ink droplets.

On the other hand, in ejecting inks with heads having a plurality of nozzles, in a type of a printer of recording in a manner that a recording paper and heads move in the perpendicular direction to each other, the number of heads that can be driven at the same time is limited to several tens to 200 or so. A type of fixed heads called line head is also limited to several hundreds. The reason is that a number of heads cannot be driven at the same time, since the driving power is limited and the generation of heat at heads has an influence on images.

It is possible to increase recording speed by elevating driving frequency.

In the case of a thermal ink jet method, ink ejection frequency can be controlled by the control of the frequency of head driving signals for heating the heads.

In the case of a piezo method, ink ejection frequency can be controlled by the control of the frequency of the signal for driving piezo.

Driving of piezo headi are described. The signals of images to be printed, i.e., the size of ink droplet to be ejected, the ejection speed and the frequency of ejection, are decided by the printer control part, thereby signals for driving print heads are formed. Driving signals are supplied to print heads. The size of ink droplet to be ejected, the ejection speed and the frequency of ejection are controlled by the signal driving piezo. The size of ink droplet to be ejected and the ejecting speed are decided by the form and amplitude of the wave driving the heads, and the frequency is decided by the repeating cycle of signals.

When the frequency of ejection is set at 10 KHz, heads are driven every 100 micro seconds, and recording of one line finishes in 400 micro seconds. By setting recording paper to move 1/600 inch, i.e., about 42 μm, every 400 micro seconds, one sheet can be printed in 1.2 seconds.

The modes disclosed in JP-A-11-170527 are preferably applied to the constitution of the printer for use in the invention. With respect to the ink cartridge, those disclosed in JP-A-5-229133 are preferably used. Regarding suction and the constitution of the caps covering the printing heads at that time, those disclosed in JP-A-7-276671 are preferably used. It is also preferred to provide a filter for excluding foams as disclosed in JP-A-9-277552 in the vicinity of heads.

It is preferred that the surfaces of nozzles be subjected to water repellent treatment as disclosed in JP-A-2002-292878. The ink and ink set of the invention may be used for a printer connected with a computer, or may be specified to a printer of photographs.

In the ink jet recording method applicable to the invention, the average ejecting speed of ink droplet on a recording material is 2 m/sec or more, preferably 5 m/sec or more.

The ejection speed of ink droplets is controlled by the control of the form and amplitude of the wave driving the heads.

By properly using a plurality of driving waves, ink droplets of a plurality of sizes can be ejected with the same heads.

EXAMPLE

The present invention is described with reference to specific examples below, but it should not be construed as the present invention is limited thereto.

The following components were added to super pure water (resistance value: 18 MΩ or more) to make 1 liter, and the solution was stirred by heating at 30 to 40° C. for 1 hour. The solution was then vacuum filtered through a microfilter having an average pore size of 0.25 μm, thereby Light Magenta Ink LM-01 was prepared.

| Prescription of Light Magenta Ink LM-01: | |
|---|---|
| Magenta dye (a-36) | 10.2 g |
| Glycerol | 120.0 g |
| Triethylene glycol | 100.0 g |
| Triethylene glycol monobutyl ether | 90.0 g |
| 2-Pyrrolidone | 10.0 g |
| Triethanolamine | 5.0 g |
| Urea | 24.0 g |
| PROXEL XL2 (manufactured by Zeneca Co., Ltd.) | 5.0 g |
| Benzotriazole | 0.07 g |
| Olfin E1010 (manufactured by Nisshin Chemical Industry Co., Ltd.) | 6.0 g |

Light magenta ink, magenta ink, light cyan ink and cyan ink shown in Table 20 were prepared in the same manner as in the preparation of LM-01 except for changing the kinds and amounts of dyes and the amounts of additives.

As cyan dye, C.I. Direct Blue 199 (DB-199) was used in LC-02 and C-02.

TABLE 20

| | Light Magenta Ink | | | Magenta Ink | |
|---|---|---|---|---|---|
| | LM-01 | LM-02 | LM-03 | M-01 | M-02 |
| Dye | a-36 | a-36 | B-1 | a-36 | B-1 |
| Amount | 10.2 g/L | 10.2 g/L | 10.2 g/L | 30.8 g/L | 30.8 g/L |
| Glycerol | 120 | 120 | 120 | 120 | 120 |
| Triethylene glycol | 100 | 20 | 20 | 20 | 20 |
| Triethylene glycol monobutyl ether | 90 | 120 | 120 | 120 | 120 |
| 1,2-Hexanediol | — | 10 | 10 | 10 | 10 |
| 2-Pyrrolidone | 10 | 30 | 30 | 30 | 30 |
| Triethanolamine | 5 | 5 | 5 | 5 | 5 |
| Urea | 24 | 24 | 24 | 24 | 24 |
| PROXEL XL II | 5.0 | 5.0 | 5.0 | 5.0 | 5.0 |
| Benzotriazole | 0.07 | 0.07 | 0.07 | 0.07 | 0.07 |
| Olfin E1010 | 6 | 6 | 6 | 12 | 12 |
| | **Light cyan Ink** | | | **Cyan Ink** | |
| | LC-01 | LC-02 | LC-03 | C-01 | C-02 |
| Dye | 154 | 154 | DB-199 | 154 | DB-199 |
| Amount | 17.5 g/L | 17.5 g/L | 17.5 g/L | 68.0 g/L | 68.0 g/L |
| Glycerol | 110 | 120 | 120 | 120 | 120 |
| Triethylene glycol | 80 | 100 | 100 | 100 | 100 |
| Triethylene glycol monobutyl ether | 70 | 100 | 100 | 100 | 100 |
| 1,2-Hexanediol | 30 | 30 | 30 | 30 | 30 |
| 2-Pyrrolidone | — | 35 | 35 | 35 | 35 |
| Triethanolamine | 5 | 5 | 5 | 5 | 5 |
| Urea | 24 | 24 | 24 | 24 | 24 |
| PROXEL XL II | 5.0 | 5.0 | 5.0 | 5.0 | 5.0 |
| Benzotriazole | 0.07 | 0.07 | 0.07 | 0.07 | 0.07 |
| Olfin E1010 | 5 | 5 | 5 | 5 | 5 |

Super pure water is added to make 1 liter

Dye B-1 has the structure shown below. Dye B-1 is a metal chelate dye comprising an azo compound and a metal element.

B-1

B-1

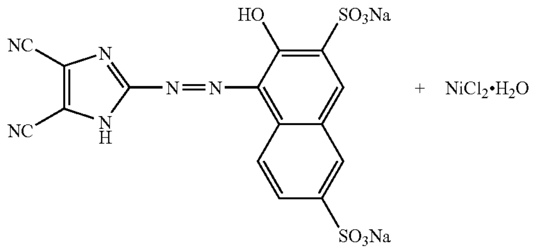

Each of these inks was filled in a cartridge corresponding color ink of ink jet printer PM-950C (manufactured by Epson) and a stepwise color patch image of monocolor was printed.

Ink jet paper photographic glossy paper(Gasai) was used as a recording medium. After 24 hours from printing, each density region of the stepwise patch part was measured with. X-Rite 310 TR densitometer carrying a status A filter.

In the measurement, density (Di) by status A filter light corresponding to the absorbance region of each patch of from 0.9 to 1.1 was selected. Each test sample was subjected to discoloration test by preserving each sample in an ozone fadeometer capable of emitting 5 mg/liter of ozone constantly. As the ozonizer, commercially available 5 kV alternating voltage high pressure charging apparatus was used. The ozone gas concentration was set and controlled with an ozone gas monitor (model OZG-EM-01, manufactured by APPLICS Co.). The same measurement of density was performed every one day. The density after storage (Da) was obtained, and the time required for the residual rate of dye (%)=(Da/Di)×100 became 80% was obtained. From this time, discoloration velocity constant k ($Hr^{-1}$) was obtained on the assumption the relationship of discoloration density and time follows the velocity expression of first order. The results obtained are shown in Table 21.

TABLE 21

| | | Oxidation | | Physical Properties of Ink | | |
|---|---|---|---|---|---|---|
| Ink | Dye | Potential of Dye (V) (vs SCE) | k ($Hr^{-1}$) | Viscosity (mPa · s) | Surface Tension (mN/m) | Conductivity (mS/cm) |
| LM-01 | a-36 | 1.07 | $2.8 \times 10^{-3}$ | 4.65 | 32.4 | 0.69 |
| LM-02 | a-36 | 1.07 | $4.7 \times 10^{-3}$ | 4.18 | 32.1 | 0.72 |
| LM-03 | B-1 | 0.86 | $1.8 \times 10^{-2}$ | 4.15 | 32.3 | 1.37 |
| M-01 | a-36 | 1.07 | $2.9 \times 10^{-3}$ | 4.68 | 32.2 | 3.18 |
| M-02 | B-1 | 0.86 | $1.1 \times 10^{-2}$ | 4.62 | 32.4 | 6.18 |
| LC-01 | 154 | 1.20 | $2.5 \times 10^{-3}$ | 4.51 | 31.8 | 0.60 |
| LC-02 | 154 | 1.20 | $3.6 \times 10^{-3}$ | 4.07 | 32.2 | 0.58 |
| LC-03 | DB-199 | 0.86 | $1.6 \times 10^{-2}$ | 4.11 | 32.0 | 0.42 |
| C-01 | 154 | 1.20 | $2.4 \times 10^{-3}$ | 4.64 | 32.2 | 1.42 |
| C-02 | DB-199 | 0.86 | $1.0 \times 10^{-2}$ | 4.66 | 31.5 | 1.09 |

Each ink set as shown in Table 22 below was prepared by combining these inks. Genuine ink of PM-950C was used for each of yellow ink, dark yellow ink and black ink.

TABLE 22

| | | $k_{min}/k_{max}$ | |
|---|---|---|---|
| Ink Set | Content | Magenta | Cyan |
| IS-01 (Invention) | LM-01, M-01, LC-01, C-01 | 0.97 | 0.96 |
| IS-02 (Comparison) | LM-2, M-01, LC-02, C-01 | 0.60 | 0.66 |
| IS-03 (Comparison) | LM-03, M-02, LC-03, C-02 | 0.61 | 0.63 |

An image of the portrait of a human being was printed with each of these ink set, the printed image was The image was preserved for 24 hours at room temperature, and subjected to discoloration test by being preserved in an ozone fadeometer capable of emitting 5 mg/liter of ozone constantly. Evaluation of each image was performed for three days after preservation and fifth days.

By visual observation, an image of a portrait in good color balance was graded A, an image whose color balance was confirmed to be lost was graded B, and an image conspicuously deteriorated in image quality was graded C. The results obtained are shown in Table 23.

TABLE 23

| Ink Set | Before Discoloration Test | After Three Days | After Five Days |
|---|---|---|---|
| IS-01 (Invention) | A | A | A |
| IS-02 (Comparison) | A | B | C |
| IS-03 (Comparison) | A | C | C |

It can be seen from the results in Table 23 that when the ink set according to the invention is used, image in excellent color balance is maintained even after forced discoloration test in an ozone gas atmosphere. When the recording medium is replaced with Photo Paper (manufactured by SEIKO EPSON CORPORATION) or PR101 (manufactured by CANON Inc.), the same effects were obtained.

When the ink and ink set according to the invention were used in a thermal type ink jet printer, the same effects were obtained.

The present invention is characterized in that when inks having different hues are mixed and printed, the discoloration velocities of the images having the same hue and different densities do not greatly differ, accordingly the present invention can provide an ink set, particularly preferably an ink set for ink jet recording, excellent in the durability of an image inclusive of image quality and excellent in color balance with the lapse of time.

The entire disclosure of each and every foreign patent application from which the benefit of foreign priority has been claimed in the present application is incorporated herein by reference, as if fully set forth.

What is claimed is:

1. An ink set comprising:

at least two kinds of inks, each of the at least two kinds of inks comprising triethyleneglycol and having a common hue and different densities, and containing an aqueous medium and a dye, wherein each of the at least two kinds of inks has a corresponding discoloration velocity constant (k) for an image printed with each one of the at least two kinds of inks, a ratio defined by a minimum value ($k_{min}$) selected from among said corresponding constants divided by a maximum value ($k_{max}$) selected from among the corresponding constants, is within a range of 0.7 to 1.0, and in inks having the same hue, the content of a specific water-soluble organic solvent in the ink having a low concentration of dye is less than the content of the specific water-soluble organic solvent in the ink having a high concentration of dye.

2. The ink set as claimed in claim 1, wherein each of the inks having a common hue and different densities includes at least one kind of dye having an oxidation potential nobler than 1.0 V (Vs SCE).

3. The ink set as claimed in claim 1, wherein the dye is at least one of an azo dye and a phthalocyanine dye each having a heterocyclic group.

4. The ink set as claimed in claim 1, wherein the aqueous medium contains at least a water-soluble glycol derivative.

5. The ink set as claimed in claim 1 is an ink set for ink jet recording.

6. An ink jet recording method of performing image-recording by an ink jet printer with the ink set as claimed in claim 1.

7. The ink set as claimed in claim 1, wherein the specific water-soluble organic solvent is a water-soluble glycol derivative organic solvent.

8. The ink set as claimed in claim 1, wherein the dye is selected from the group consisting of dyes represented by formula (1), formula (2), formula (3) and formula (4):

$$(A\text{-}N{=}N\text{—}B)_n\text{-}L \qquad (1)$$

wherein A and B each represents a heterocyclic group which may be substituted; L represents a hydrogen atom, a single bond, or a divalent linking group; and n represents 1 or 2, provided that when n represents 1, L represents a hydrogen atom, and A and B both represent a monovalent heterocyclic group; and when n represents 2, L represents a single bond or a divalent linking group, and either A or B represents a monovalent heterocyclic group and the other represents a divalent heterocyclic group; and further provided that when n represents 2, the two A groups may be the same or different and the two B groups may also be the same or different;

(2)

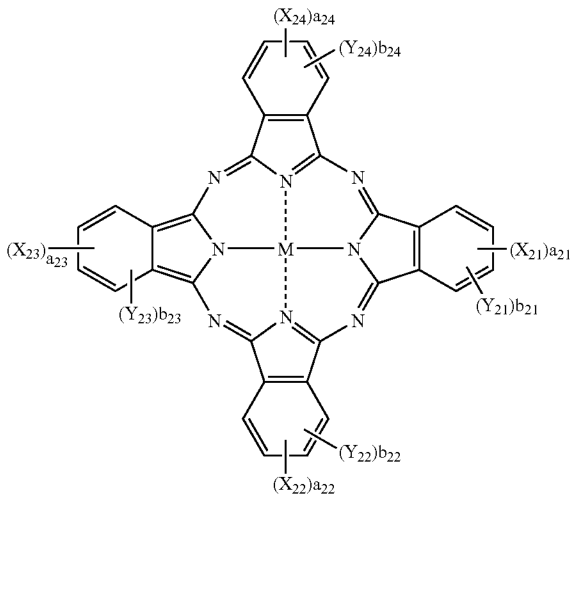

wherein $X_{21}$, $X_{22}$, $X_{23}$ and $X_{24}$ each represents —SO-$Z_2$, —$SO_2$-$Z_2$, —$SO_2NR_{21}R_{22}$, a sulfo group, —$CONR_{21}R_{22}$ or —$COOR_{21}$;

$Z_2$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$R_{21}$ and $R_{22}$ each represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$Y_{21}$, $Y_{22}$, $Y_{23}$ and $Y_{24}$ each represents a monovalent substituent;

$a_{21}$ to $a_{24}$, and $b_{21}$ to $b_{24}$ respectively represent the number of the substituents of $X_{21}$ to $X_{24}$ and $Y_{21}$ to $Y_{24}$; $a_{21}$ to $a_{24}$ each represents a number of from 0 to 4, provided that $a_{21}$ to $a_{24}$ do not represent 0 at the same time; $b_{21}$ to $b_{24}$ each represents a number of from 0 to 4; when $a_{21}$ to $a_{24}$ and $b_{21}$ to $b_{24}$ represent a number of 2 or higher, a plurality of $X_{21}$ to $X_{24}$ and $Y_{21}$ to $Y_{24}$ may be the same or different;

and M represents a hydrogen atom, a metal atom, oxide or hydroxide of the metal atom, or halide;

(3)

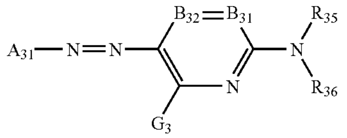

wherein $A_{31}$ represents a residue of 5-membered heterocyclic diazo component $A_{31}$-$N_2$—;

$B_{31}$ and $B_{32}$ each represents =$CR_{31}$— or —$CR_{32}$=, or either $B_{31}$ or $B_{32}$ represents a nitrogen atom and the other represents =$CR_{31}$— or —$CR_{32}$=; $R_{35}$ and $R_{36}$ each represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, or a sulfamoyl group, and each group may further have a substituent;

$G_3$, $R_{31}$ and $R_{32}$ each represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (including an arylamino group and a heterocyclic amino group), an acylamino group, a ureido group, a sulfamoyl-amino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfinyl group, a heterocyclic sulfinyl group, a sulfamoyl group, a sulfo group, or a heterocyclic thio group, and each group may further be substituted; and $R_{31}$ and $R_{35}$, or $R_{35}$ and $R_{36}$ may be bonded to each other to form a 5- or 6-membered ring;

$$A_{41}\text{-}N{=}N\text{—}B_{41}\text{—}N{=}N\text{—}C_{41} \qquad (4)$$

wherein $A_{41}$, $B_{41}$ and $C_{41}$ each represents an aromatic group which may be substituted or a heterocyclic group which may be substituted.

9. The ink set as claimed in claim 8, wherein the dye of formula (1) is selected from the group consisting of dyes represented by formulae (1-A), (1-B) and (1-C), the dye of formula (2) is represented by formula (5), the dye of formula (3) is represented by formula (3-A), and the dye of formula (4) is limited to formula (4-A) or (4-B):

(1-A)

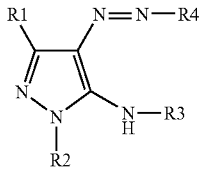

wherein $R_1$ and $R_3$ each represents a hydrogen atom, a cyano group, an alkyl group, a cycloalkyl group, an aralkyl group, an alkoxyl group, an alkylthio group, an arylthio group, an aryl group, or an ionic hydrophilic group; R2 represents a hydrogen atom, an alkyl group, a cycloalkyl group, an aralkyl group, a carbamoyl group, an acyl group, an aryl group or a heterocyclic group; and R4 represents a heterocyclic group;

(1-B)

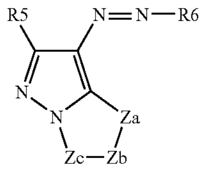

wherein R5 represents a hydrogen atom, a cyano group, an alkyl group, a cycloalkyl group, an aralkyl group, an alkoxyl group, an alkylthio group, an arylthio group, an aryl group or an ionic hydrophilic group; Za represents —N=, —NH— or —C(R11)=; Zb and Zc each represents —N= or —C(R11)=; R11 represents a hydrogen atom or a nonmetallic substituent; and R6 represents a heterocyclic group;

(1-C)

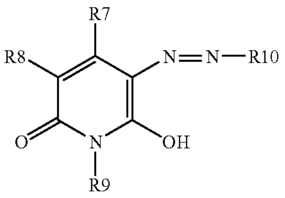

wherein R7 and R9 each represents a hydrogen atom, a cyano group, an alkyl group, a cycloalkyl group, an aralkyl group, an aryl group, an alkylthio group, an arylthio group, an alkoxycarbonyl group, a carbamoyl group or an ionic hydrophilic group; R8 represents a hydrogen atom, a halogen atom, an alkyl group, an alkoxyl group, an aryl group, an aryloxy group, a cyano group, an acylamino group, a sulfonyl-amino group, an alkoxycarbonylamino group, a ureido group, an alkylthio group, an arylthio group, an alkoxycarbonyl group, a carbamoyl group a sulfamoyl group, a sulfonyl group, an acyl group, an alkylamino group, an arylamino group, a hydroxyl group or an ionic hydrophilic group; and R10 represents a heterocyclic group;

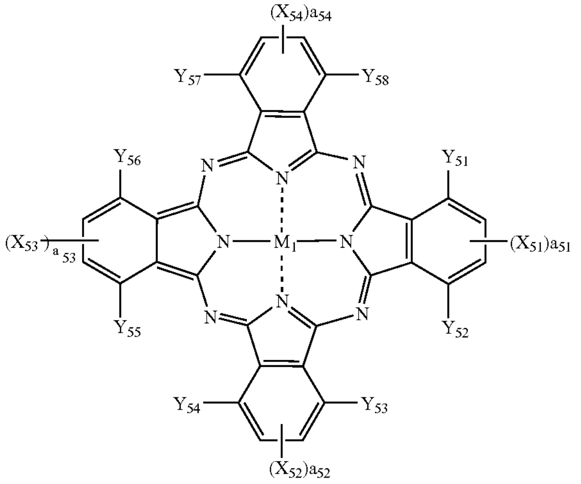

wherein, $X_{51}$ to $X_{54}$, $Y_{51}$ to $Y_{58}$ and $M_1$ have the same meaning as $X_{21}$ to $X_{24}$, $Y_{21}$ to $Y_{24}$ and M in formula (2) in claim 8, respectively; $a_{51}$ to $a_{54}$ each represents an integer of 1 or 2;

(3-A)

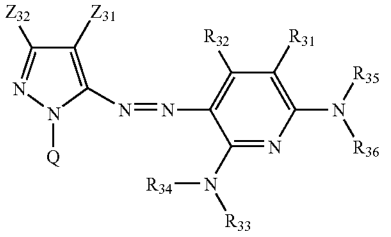

wherein $R_{31}$, $R_{32}$, $R_{35}$ and $R_{36}$ have the same meaning as in formula (3) in claim 8, respectively; $R_{33}$ and $R_{34}$ each represents a hydrogen atom or a substituent; $Z_{31}$ represents an electron attractive group having a σp value of Hammett's substitution constant of 0.20 or more; $Z_{32}$ represents a hydrogen atom or a substituent; and Q represents a hydrogen atom or a substituent;

Formula (4-A)

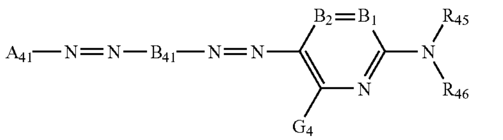

wherein $A_{41}$ and $B_{41}$ have the same meaning as in formula (4) in claim 8, respectively; $B_1$ and $B_2$ each represents $=CR_{41}-$ or $-CR_{42}=$, or either $B_1$ or $B_2$ represents a nitrogen atom and the other represents $=CR_{41}-$ or $-CR_{42}=$;

$G_4$, $R_{41}$ and $R_{42}$ each represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an allcylthio group, an arylthio group, a heterocyclic thio group, an alkylsulfonyl group, an aryl-sulfonyl group, a heterocyclic sulfonyl group, an alkyl-sulfinyl group, an arylsulfinyl group, a heterocyclic sulfinyl group, a sulfamoyl group, or a sulfo group, and each group may further be substituted;

$R_{45}$ and $R_{46}$ each represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and each group may further have a substituent; provided however that $R_{45}$ and $R_{46}$ do not represent a hydrogen atom at the same time; and $R_{41}$ and $R_{45}$, or $R_{45}$ and $R_{46}$ may be bonded to each other to form a 5- or 6-membered ring;

Formula (4-B)

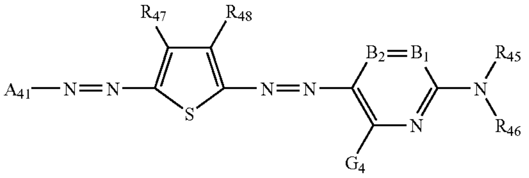

wherein $A_{41}$ has the same meaning as $A_{41}$ in formula (4) in claim 8; $B_1$, $B_2$, $G_4$, $R_{45}$ and $R_{46}$ have the same meaning as $B_1$, $B_2$, $G_4$, $R_{45}$ and $R_{46}$ in formula (4-A), respectively; and $R_{47}$ and $R_{48}$ have the same meaning as $R_{41}$ in formula (4-A).

* * * * *